United States Patent
Ishikawa

(10) Patent No.: US 9,376,317 B2
(45) Date of Patent: Jun. 28, 2016

(54) METHOD OF GENERATING HYDROGEN

(71) Applicant: Yasuo Ishikawa, Chigasaki (JP)

(72) Inventor: Yasuo Ishikawa, Chigasaki (JP)

( * ) Notice: Subject to any disclaimer, the term of this patent is extended or adjusted under 35 U.S.C. 154(b) by 0 days.

(21) Appl. No.: 14/465,274

(22) Filed: Aug. 21, 2014

(65) Prior Publication Data

US 2014/0363370 A1    Dec. 11, 2014

Related U.S. Application Data

(62) Division of application No. 13/145,281, filed as application No. PCT/JP2010/050050 on Jan. 6, 2010, now Pat. No. 8,845,998.

(51) Int. Cl.
*C01B 3/10*      (2006.01)
*C01B 3/04*      (2006.01)

(52) U.S. Cl.
CPC . *C01B 3/10* (2013.01); *C01B 3/045* (2013.01); *C01B 2203/0805* (2013.01); *Y02E 60/364* (2013.01)

(58) Field of Classification Search
None
See application file for complete search history.

(56) References Cited

U.S. PATENT DOCUMENTS

| | | | | |
|---|---|---|---|---|
| 2,660,517 | A | * | 11/1953 | Padgitt ............ C01B 3/061 423/641 |
| 2,721,789 | A | | 10/1955 | Gill |
| 3,784,485 | A | | 1/1974 | Tomezsko |
| 4,588,577 | A | | 5/1986 | Cardinal |
| 5,367,098 | A | | 11/1994 | Fushimi et al. |
| 5,690,902 | A | | 11/1997 | Werth |
| 5,898,012 | A | | 4/1999 | Stinn et al. |
| 6,630,119 | B1 | | 10/2003 | Sigie et al. |
| 2004/0115125 | A1 | | 6/2004 | Andersen |
| 2006/0140850 | A1 | | 6/2006 | Juda |
| 2006/0216227 | A1 | * | 9/2006 | Idem .................... B01J 21/066 423/651 |
| 2007/0203020 | A1 | | 8/2007 | Brooks et al. |

(Continued)

FOREIGN PATENT DOCUMENTS

| | | |
|---|---|---|
| JP | 54-6821 | 1/1979 |
| JP | 54-127891 | 10/1979 |

(Continued)

OTHER PUBLICATIONS

Decomposition kinetics of titanium slag in sodium hydroxide system Tianyan Xue et al. Hydrometallurgy Vo. 95, pp. 22-27, 2009.*

(Continued)

*Primary Examiner* — Melvin C Mayes
*Assistant Examiner* — Douglas Call
(74) *Attorney, Agent, or Firm* — Young & Thompson

(57) ABSTRACT

A catalyst has a long life span and efficiently separates hydrogen from water. A first metal element (Ni, Pd, Pt) for cutting the combination of hydrogen and oxygen and a second metal element (Cr, Mo, W, Fe) for helping the function of the first metal element are melted in alkaline metal hydroxide or alkaline earth metal hydroxide to make a mixture heated at a temperature above the melting point of the hydroxide to eject fine particles from the liquid surface, bringing steam into contact with the fine particles. Instead of this, a mixture of alkaline metal hydroxide and metal oxide is heated at a temperature above the melting point of the alkaline metal hydroxide to make metal compound in which at least two kinds of metal elements are melted, and fine particles are ejected from the surface of the metal compound to be brought into contact with steam.

7 Claims, 39 Drawing Sheets

(56) References Cited

U.S. PATENT DOCUMENTS

| | | | |
|---|---|---|---|
| 2008/0230380 A1 | 9/2008 | Ohsaka et al. | |
| 2009/0266717 A1 | 10/2009 | Grimes et al. | |
| 2009/0301897 A1* | 12/2009 | Martin | C22B 3/20 205/704 |
| 2010/0015477 A1* | 1/2010 | McGill | B01J 4/001 429/409 |

FOREIGN PATENT DOCUMENTS

| | | |
|---|---|---|
| JP | 62-52102 | 3/1987 |
| JP | 10-121278 | 5/1998 |
| JP | 10-212101 | 8/1998 |
| JP | 2002-69558 | 3/2002 |
| JP | 2004-298946 | 10/2004 |
| JP | 2005-112704 | 4/2005 |
| JP | 2008-240001 | 10/2008 |
| JP | 2009-155195 | 7/2009 |
| JP | 2009-247961 | 10/2009 |
| JP | 2010-006677 | 1/2010 |
| WO | WO 01/87769 | 11/2001 |
| WO | WO 2007/002503 | 1/2007 |
| WO | WO2011/141413 | * 11/2011 |

OTHER PUBLICATIONS

Supplementary European Search Report dated Sep. 26, 2012 in corresponding European Patent Application No. 10733397.3.
International Search Report, PCT/JP2010/050050, Apr. 20, 2010.
Masayoshi Hasehawa, Stainless-ko Binran, 3rd edition, The Nikkan Kogyo Shinbun, Ltd., Dec. 25, 1974, pp. 315 to 316.

\* cited by examiner

METHOD OF GENERATING HYDROGEN

TECHNICAL FIELD

This invention relates to catalyst for taking hydrogen out of water, a method of generating hydrogen by using the catalyst, and an apparatus for generating hydrogen by using the method.

BACKGROUND OF THE INVENTION

As a method of taking hydrogen out of water, there is known a method of heat-resolving pure water into hydrogen and oxygen through a catalyst (Japanese Laid Open Publication Hei10-212101). In this method, a silicon oxide as catalyst is put into a rotatable furnace to evacuate the inside of the furnace.

After the evacuation, pure water is put into the furnace which is heated at a temperature of 350° C. to 700° C. gradually to generate hydrogen and oxygen.

Further, there is known another method of generating hydrogen in which metal catalyst such as finely crushed platinum or palladium is brought into contact with water containing chelating agent kept at a temperature of approximately 60° C. to 150° C. (Japanese Laid Open Publication Sho 62-52102).

PRIOR ART

Patent Publication

Patent Publication 1: Japanese Laid Open Publication Hei10-212101
Patent Publication 2: Japanese Laid Open Publication Sho 62-52102

SUMMARY OF THE INVENTION

Subject to be Solved by the Invention

In the above Patent Publication 1, the technology has a fault that pure water is necessary and long time is necessary to take hydrogen out of water because the furnace is heated gradually.

In the above Patent Publication 2, there is a fault that chelating agent is necessary and the amount of hydrogen generation is little.

Accordingly, this invention can provide catalyst for taking hydrogen out of water, a method of generating hydrogen by using the catalyst, and a hydrogen generating apparatus for using the method which can solve those problems in the prior art.

Furthermore, this invention can provide hydrogen generating catalyst having a long life span and an ability for resolving effectively water into hydrogen and oxygen at a low temperature, a method of generating hydrogen by using the catalyst and an apparatus for generating hydrogen by using the method.

Means for Solving the Subject

The subject of this invention is solved by catalyst for generating hydrogen from water, which comprising:
alkaline metal hydroxide and/or alkaline earth metal hydroxide; and
a metal element supply body for supplying a metal element to the metal hydroxide,
the metal hydroxide being heated at a temperature of a melting point or more thereof so as to melt the metal element of the metal element supply body in the metal hydroxide thereby to make molten salt, from a liquid surface of which fine particles are dispersed.

The alkaline metal hydroxide and/or the alkarine earth metal hydroxide includes at least one or a mixture of sodium hydroxide (NaOH), potassium hydroxide (KOH), barium hydroxide ($Ba(OH)_2$) and strontium hydroxide ($Sr(OH)_2$).

The metal element supply body includes at least one of nickel (Ni), palladium (Pd) and platinum (Pt), and at least one of chromium (Cr), molybdenum (Mo), cobalt (Co), copper (Cu), rhodium (Rh) and tungsten (W).

The metal element supply body further includes iron (Fe).

The subject of this invention is also solved by catalyst for generating hydrogen from water, wherein a mixture of alkaline metal hydroxide and metal oxide is heated at a temperature of a melting point or more of the alkaline metal hydroxide to make metal compound in which at least two kinds of metal elements are melted, and fine particles are ejected from a surface of the metal compound.

The alkaline metal hydroxide includes potassium hydroxide (KOH) or sodium hydroxide (NaOH), the metal oxide including at least one of titanium oxide ($TiO_2$), zinc oxide (ZnO), zirconium oxide ($ZrO_2$), nickel oxide (NiO), tin oxide ($SnO_2$), bismuth oxide ($Bi_2O3$), calcium oxide (CaO), copper oxide (CuO), tungsten oxide ($WO_3$), magnesium oxide (MgO), chromium oxide ($Or_2O_3$), molybdenum oxide ($MoO_3$), aluminum oxide ($Al_2O_3$) and barium oxide (BaO).

The metal elements include nickel (Ni), chromium (Cr) and iron (Fe).

Further, the subject of this invention is solved by a method of generating hydrogen from water, wherein a first metal element for cutting a combination of hydrogen and oxygen and a second metal element for helping a function of the first metal element are melted in absorbent molten salt having a metal ion, hydroxide ion or carbonic acid ion so that many electrons are ejected from the first and second metal elements, the molten salt being heated at a temperature a melting point or more thereof to eject fine particles therefrom with which superheated steam is brought into contact to ionize the superheated steam thereby to produce hydrogen, and oxygen separated therefrom is combined with metal ions of the molten salt to make oxide, a part of which is discharged outward together with fine particles.

The molten salt comprises at least one or a mixture of sodium hydroxide (NaOH), potassium hydroxide (KOH), lithium hydroxide ($Li(OH)_2$) and potassium carbonate ($K_2CO_3$), the first metal element comprises one of nickel (Ni), palladium (Pd) and platinum (Pt), and the second metal element comprises at least one or a mixture of chromium (Cr), iron (Fe), molybdenum (Mo), cobalt (Co), copper (Cu), rhodium (Rh) and tungsten (W).

Furthermore, the subject of this invention is solved by an apparatus for producing hydrogen, comprising:
a catalyst cell having corrosion resistance for accommodating liquid catalyst or solid catalyst therein, a steam producing portion for producing steam to be supplied to a surface of catalyst; a metal element supply body for supplying a metal element in the catalyst in contact therewith; a heating device for heating the catalyst in the catalyst cell, and an air inflow prevention device for preventing air from flowing into the catalyst cell.

The steam producing portion is formed in the catalyst cell so that water supplied to the steam producing portion is heated to produce steam.

The metal element supply body comprises at least one of finlike, lumplike and powderlike bodies, the catalyst cell is made of metal material so as to have a function as the metal element supply body.

The air inflow prevention device comprises a first water tank connected to the steam producing portion and a second water tank for catching steam flowing out together with hydrogen produced in the catalyst cell and fine particles of the catalyst.

The catalyst cell is vertically disposed so as to accommodate catalyst at a bottom portion thereof and to form a reaction space above the catalyst, which is full of fine particles of catalyst, the heating device comprising a plate-shaped heater covering the catalyst cell therewith.

The catalyst cell is vertically disposed to be mounted on a furnace cylinder as the heating device, which has a burner for producing hot air to heat a circumferential wall of the catalyst cell, the steam producing portion comprising a heat exchanger which is wound around a circumferential wall of the catalyst cell and to which water is supplied.

The catalyst cell accommodates molten salt as the catalyst, and has a liquid surface detecting device for detecting a liquid surface of the molten salt and a catalyst supplementing device for making up for the catalyst at a time of lack of the catalyst.

The catalyst supplementing device comprises a water tank for catching fine particles of the catalyst flowing out of the catalyst cell together with hydrogen and a line for returning solution including the fine particles to the catalyst cell.

The catalyst supplementing device comprises a cylinder for accommodating the catalyst therein, disposed on an upper wall of the catalyst cell.

The catalyst cell comprises a lateral cylinder in which a furnace cylinder is disposed to have a burner at one end thereof, a plurality of hot air pipes are disposed so as to pass hot air produced in the furnace cylinder therethrough, water is supplied into a catalyst room having catalyst therein through one end portion of the catalyst cell to produce steam, and hydrogen is collected from the other end portion of the catalyst cell.

The catalyst cell is divided into two portions of a fine particle generation portion accommodating catalyst therein for generating fine particles of the catalyst and a reaction portion for accommodating the fine particles supplied from the fine particle generation portion to react on steam.

The apparatus is further comprises with a chlorine elimination device for eliminating chlorine from water supplied into the steam producing portion.

Effect of the Invention

The Molten salt of this invention as catalyst comprises alkaline metal hydroxide such as NaOH and KOH or alkaline earth metal hydroxide such as $Ba(OH)_2$ and $Sr(OH)_2$, a first metal element (Ni, Pd or Pt) for cutting the combination of hydrogen and oxygen and a second metal element (Cr, Mo, W, Fe, Co, Cu or Rh) for helping the function of the first metal element. The mixture of the hydroxide and the first and second metal elements is heated at a temperature above the melting point of the hydroxide to separate hydrogen from oxygen. That is, the catalyst can operate at a temperature above 300° C. and, however, a continuous operation needs at approximately 500° C. The catalyst does not cause a simple oxidizing reaction but an electrical and chemical reaction or an ionizing reaction. In addition, a main reaction is caused by fine particles ejected from the liquid surface of the catalyst to enlarge remarkably a reaction surface area, and the life span of the catalyst is long (over 3 months). Further, much water can be divided into hydrogen and oxygen at a low temperature.

In the case of solid catalyst, a reaction for resolving water is the same as that of the liquid catalyst, its reaction temperature is slightly higher than that of liquid catalyst. It is preferable to use solid catalyst in case that a catalyst unit is swung in ships and automobiles.

In the method of generating hydrogen according to this invention, molten salt itself is ionized together with a metal element for cutting the combination of hydrogen, and there are a lot of electrons in the molten salt. Therefore, the fine particles dispersed from the liquid surface react on steam to ionize it thereby to produce a lot of hydrogen at a low temperature because of a remarkable largeness of reaction surface area. In addition, oxygen separated from hydrogen makes oxide, a part of which can make up for the catalyst after reacting on steam and its remains flow out. Therefore, the catalyst cell is not full of oxide to extend the life span of the catalyst.

In the apparatus for generating hydrogen according to this invention, there are provided the catalyst cell having corrosion resistance, the steam producing portion, the metal element supply body including the case of the catalyst cell, the heating device for heating the catalyst, and the air inflow prevention device for preventing air from flowing into the catalyst cell, and, therefore, the catalyst can have a long life span with a simple structure. Further, since the steam producing portion is formed in the catalyst cell, the portion and the catalyst can be heated by a single heating device to make the structure of the apparatus simple. And if the catalyst cell itself has the same function as that of the metal element supply body, the fins are unnecessary.

A water tank as the steam elimination device has a function as the air inflow prevention device, and, therefore, the numbers of necessary members can be decreased.

Further, a vertical type of catalyst cell is, at its circumferential wall, heated by the plate-shaped heater, and, therefore, the reaction space formed at the upper portion of the catalyst cell can be effectively heated.

The catalyst cell is heated by the heating furnace having a burner without the electric heater, the hydrogen having been produced can be effectively made use of to provide a self-burning heating device.

Furthermore, the apparatus is provided with a catalyst supplementing device, and, therefore, the catalyst cell can be used, without opening the catalyst cell, for a long time.

Finally, the catalyst cell is divided into the catalyst accommodating part and the upper reaction part, and, therefore, the catalyst cell can have a high corrosion resistance with a simple structure.

EMBODIMENT OF THE INVENTION

The embodiments of this invention will be explained below with reference to the drawings.

Figure 1:
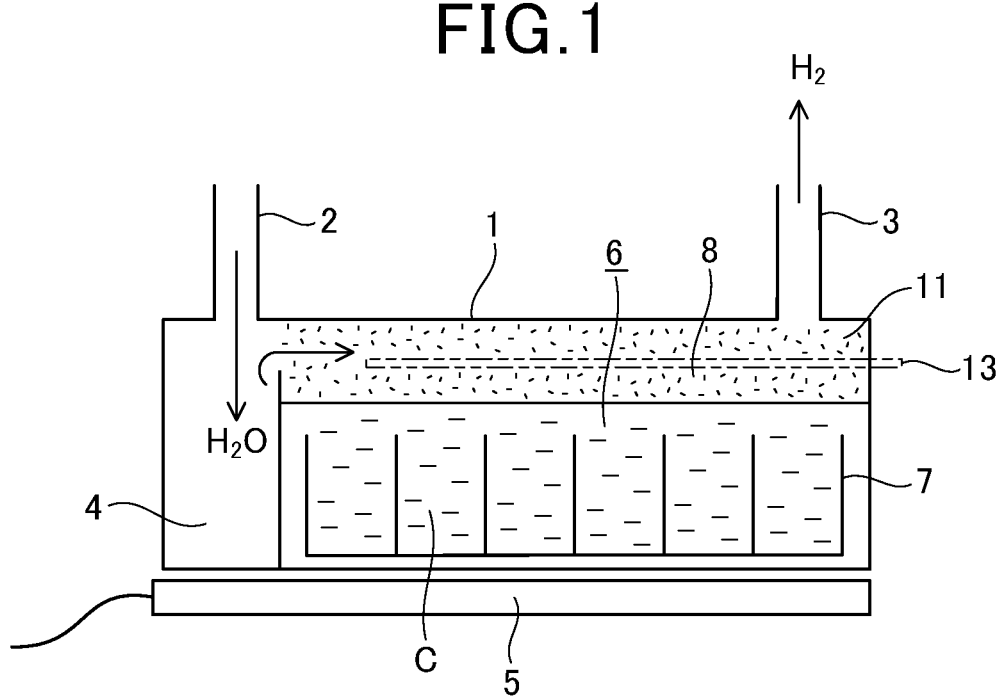
FIG. 1 shows a basic structure of a lateral type of hydrogen generating apparatus.

FIG. 1 shows a basic structure, as one embodiment of this invention, for a hydrogen generation apparatus. A casing 1 (catalyst cylinder or cell) made of e.g. SUS304 has an inlet 2 for water and an outlet 3 for hydrogen, and water is put into a steam room 4 in the casing 1. An integral formation of the steam room 4 and the casing 1 can make simple the structure of the apparatus and can make unnecessary the provision of a heater for only the steam room 4. A heater 5 heats the lower surface of the casing 1 so that the temperature of the inside of the casing 1 goes up at a temperature of 300° C. to 600° C. The casing 1 is provided with a catalyst room 6 in which a catalyst C is accommodated. A metal element supply body (fin) 7 is also accommodated therein and the supply body 7 is a plate of SUS304 consisting of Cr—Ni—Fe. The upper portion of the catalyst room 6 forms a steam path 8 in which steam water vapor flows and also forms a reaction space. Steam generated in the steam room 4 is heated at a temperature of 120° C. to 130° C., and the steam is resolved, in the steam path 8, into oxygen and hydrogen. The hydrogen is discharged from the outlet 3.

The catalyst C ejects a large number of fine (nanometer largeness) particles into the steam path 8 to form a reaction fine particle group 11.

Figure 2:
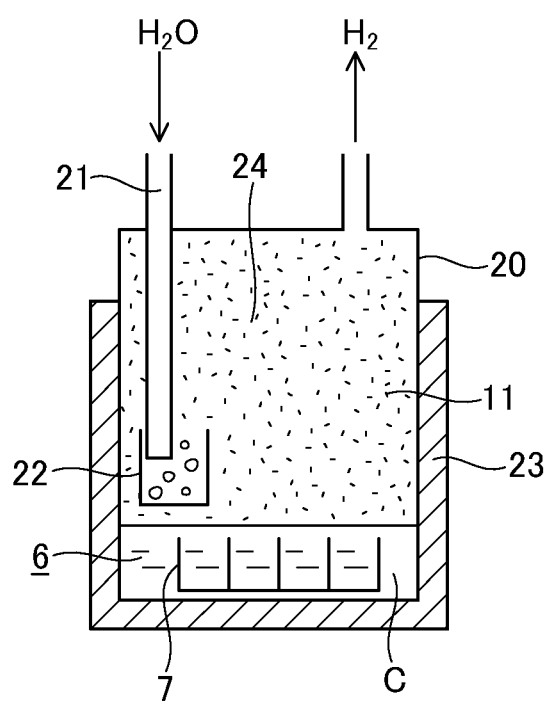
FIG. 2 shows a basic structure of a vertical type of hydrogen generating apparatus.

FIG. 2 shows a basic structure of a vertical type of catalyst cell. It is preferable to form the cell so that the fine particles are much ejected because the resolution reaction of water is mainly carried out between the steam and the reaction fine particle group 11 ejected from the catalyst C. That is, a cylindrical casing 20 (catalyst cell) has catalyst C, at its bottom, in which a metal element supply body 7 (fin) is set, and the catalyst C ejects upward the reaction fine particles. A water pipe 21 extends downward in the casing 20, and the lower end of the water pipe 21 is opposed to a cylindrical water pot (steam generation part). Water dropping down from the water pipe 21 abuts against the bottom surface of the pot to generate steam at a temperature of 120° C. to 150° C., and the steam and the reaction fine particles are reacted with each other in a reaction space 24. The outer surface of the casing 20 is heated, by a plate-shaped heater 23 (heating device), at a temperature of 300° C. to 600° C.

The advantages of a lateral type of apparatus as shown in FIG. 1 are that the area of the liquid surface of the catalyst C is large, that is, the area where the reaction fine particles are ejected is large to increase the density of the reaction fine particles in the reaction space. On the contrary, the advantages of the vertical type of catalyst cell are that the volume of the reaction space is large and welding portions for the water pipe 21 and a hydrogen pipe can be formed at a portion far from the liquid surface of the catalyst C to prevent the welding portions from corrosion. The plate-shaped heater can evenly heat the reaction space 24 and the bottom portion of the casing 20 accommodating the catalyst C, and especially it can prevent the temperature of the reaction space 24 from going down.

Each element with respect to a reaction for generating hydrogen will now be explained below.

1. Regarding Water to be Supplied

Normal city water can be supplied and a small amount of chlorine (Cl) contained in the city water does not have a harm-full effect on the reaction for generating hydrogen. Even hard water does not have a harm-full effect on the reaction because mineral ingredient is left in the steam room 4 or the water pot 22 when a drop of water is supplied thereinto to be changed into steam at a temperature of 120° C. to 150° C., and the harmless steam without mineral ingredient is supplied into the reaction space 8. In the case of sea water, salt (NaCl) is left in the steam room 4 or the water pot 22, and must be eliminated therefrom if the amount of salt becomes large. Accordingly, in the case of sea water or hard water, the steam room may be separated from the casing 1 so as to facilitate elimination of salt or mineral.

2. Regarding Catalyst

1) Molten Salt (Liquid Catalyst)

Sodium hydroxide (NaOH) and Potassium hydroxide (KOH) each of which is alkaline metal oxide and has a large absorbency are suitable for catalyst. Further, barium hydroxide ($Ba(OH)_2$) and strontium hydroxide ($Sr(OH)_2$) each of which is alkaline earth metal and also has a large absorbency have a function for catalyst. In addition, at least one of those substances or mixture of those substances can be used. The alkali metal hydroxide and the alkali earth metal hydroxide are melt at a temperature of 300° C. to 600° C. to form molten salt. However, calcium hydroxide ($Ca(OH)_2$) is solid and does not form molten salt at the range of the above temperature, and magnesium hydroxide ($Mg(OH)_2$) is resolved at a high temperature not to form molten salt. Lithium hydroxide ($Li(UH)_2$) forms molten salt, and, however, could not generate hydrogen in our experiment. Sodium carbonate ($Na_2CO_3$) forms a molten salt, and, however must be heated at a temperature above 850° C. to form molten salt. Therefore, it is not practical. On the contrary, lithium carbonate ($Li_2CO_3$) and potassium carbonate ($K_2CO_3$) form molten salt at a temperature under 700° C. to generate hydrogen, respectively.

The catalyst is heated at a temperature of 300° C. to 600° C. and used in a state of molten salt. Therefore, when it is heated at the temperature, fine particles are ejected from the surface of the molten salt, and each of fine particles has a largeness of nanometer not to be visible. The catalyst must have a large absorbency to catch steam (water drop) reliably.

2. Solid Catalyst

Catalyst is not necessarily limited to the molten salt, and catalyst of solid state can be used. That is, alkali metal hydroxide (NaOH, KOH, etc.) is mixed with e.g. metal oxide (its melting point is much higher than that of the alkali metal hydroxide) (titanium oxide ($TiO_2$), magnesium oxide (MgO), etc.) to form a mixture of particle state which is put into the casing 1 and 20 as shown in FIGS. 1 and 2 to be simply heated at 500° C. At that time, the metal hydroxide melts to react to the solid metal oxide thereby to make a compound. In this case, the weight ratio of the alkali metal hydroxide and the metal oxide is preferably approximately 3:1. Also in these compounds, the reaction fine particle group 11 is ejected from the surface of the catalyst to generate hydrogen by the reaction between the particle group 11 and the steam.

In more details, at least one of metal hydroxides each having a low melting point (250° C. to 450° C.) (such as sodium hydroxide (NaOH), potassium hydroxide (KOH), barium hydroxide ($Ba(OH)_2$) (melting point 480° C.) and strontium hydroxide ($Sr(OH)_2$) is evenly mixed with at least one of metal oxides of powder or particle state (such as titanium oxide ($TiO_2$), zinc oxide (ZnO), zirconium oxide ($ZrO_2$), nickel oxide (NiO), tin oxide ($SnO_2$), bismuth oxide ($Bi_2O_3$), calcium oxide (CaO), copper oxide (CuO), tungsten oxide ($WO_3$), chromium oxide ($Cr_2O_3$), magnesium oxide (MgO), molybdenum oxide ($MoO_3$), aluminium oxide ($Al_2O_3$) and barium oxide (BaO). Its mixture is heated in the casing 1 or 20. In the case of the mixture of potassium hydroxide (KOH) and titanium oxide ($TiO_2$), while it is heated, the following reaction occurs.

$$2KOH + 2TiO_2 \rightarrow K_2Ti_2O_5 + H_2O \quad (a)$$

At this time, dehydration occurs to produce potassium titanate.

While zirconium oxide as well as the potassium titanate makes a compound with potassium hydroxide, the following reaction occurs.

$$2KOH + 2ZrO_2 \rightarrow K_2Zr_2O_5 + H_2O \quad (b)$$

At this time, potassium zirconate ($K_2Zr_2O_5$) is produced and has the same function as the potassium titanate ($K_2Ti_2O_5$).

In the same manner, magnesium oxide (MgO) acts upon sodium hydroxide (NaOH) as mentioned below.

$$MgO + 2NaOH \rightarrow Na_2MgO_2 + H_2O \quad (c)$$

At this time, sodium magnesium oxide is obtained. The property of sodium hydroxide (NaOH) is similar to that of potassium hydroxide (KOH). Therefore, in the above formulas (a)(b)(c), either one of KOH and NaOH can be used, and a mixture of KOH and NaOH can be also used.

3. Metal Element Supply Body

As the first metal which is added to the liquid catalyst of the alkali metal molten salt or the solid catalyst comprising the metal compound of the alkali metal hydroxide and the metal oxide and which has a function for separating hydrogen from water to eject electrons, nickel (Ni), palladium (Pd) or platinum (Pt) is preferable. Further, as the second metal which promotes the function of the first metal, chromium (Cr), iron (Fe), tungsten (W), copper (Cu), cobalt (Co), rhodium (Rh) or molybdenum (Mo) is preferable. If titanium (Ti) or magnesium (Mg) instead of the above elements is singly used, its reaction is too active to use it as the metal element supply body. Accordingly, in such a case, it is preferable to make an alloy with other metals, which is used as the metal element supply body. As metal material containing the above metal elements, stainless steel 304 (18% Cr-8% Ni-remains Fe) is the most suitable. An alloy containing a small amount of molybdenum such as SUS 316 makes the reaction active. In the case that nickel is singly used without other metals, hydrogen is not generated. Both alloys of Fe—Ni and Ni—Cr are suitable for generating hydrogen. However, alloy of Cr—Fe without Ni, Pd and Pt such as SUS 430 is, in reaction, inferior to SUS 304. The metal element supply body can be used in the shape of fin, lump or powder.

The combination of NaOH, a nickel casing and SUS 304 as a fin does not generate hydrogen.

The above casing 1 or 20 has a function as the metal element supply body, and the combination of the material of the casing, the kind of the catalyst and the kind of the metal element supply body exerts an influence on the generation of hydrogen. The combination and the effect are shown in the following table.

shown in No. 6, if only Ni exists without Fe and Cr, hydrogen is not generated. Pd (palladium) can be used instead of Ni (No. 13). Accordingly, it is supposed that Pt (platinum) belonging to the same group as Pd can be used.

However, as shown in Nos. 10 and 11, the combination of the nickel casing and the fin of SUS 304 or 430 does not generate hydrogen.

4. Mechanism for Generating Hydrogen

1) Preparation a) Molten Salt Catalyst

At least one of sodium hydroxide (NaOH) or potassium hydroxide (KOH) which contains alkaline metal and barium hydroxide ($Ba(OH)_2$) or strontium hydroxide ($Sr(OH)_2$) which contains alkaline earth metal is put into the catalyst room. In the above catalysts, the single sodium hydroxide (NaOH) is the best, and the potassium hydroxide (KOH) is the second best. The barium hydroxide or strontium hydroxide does not generate much hydrogen. Compound of over two kinds of the above hydroxides can generate hydrogen, and however, the amount of generated hydrogen is less than that of the single sodium hydroxide.

Next, the heater 5 or 23 is operated to heat the catalyst at a temperature over its melting point. The melting point of pure sodium hydroxide is approximately 340° C., and however, sodium hydroxide sold in the market contains impurity to be melted at a temperature of 280° C. to 300° C. The melting point of pure potassium hydroxide is approximately 360° C., and however, potassium hydroxide sold in the market is melted at a temperature of 320° C. to 340° C. Accordingly, when the catalyst is used, it must be heated at a temperature over 300° C. At the first stage before water is put into the steam room, it is preferable to heat the casing with the catalyst therein at a temperature of 500° C. to 600° C. for several hours. SUS 304 (18% Cr-8% Ni-remains Fe) is suitable for both materials of the casing 1 or 20 and the metal element

TABLE 1

| No. | material of case | material of fin and its weight | NaOH weight | results | others |
|---|---|---|---|---|---|
| 1 | SUS304 | SUS304 55 g | 100 g | ◎ | stable |
| 2 | SUS316L | SUS304 55 g | 100 g | ◎ | stable |
| 3 | SUS316L | Fe•Ni alloy 55 g | 100 g | ○ | reaction for 8 days |
| 4 | SUS316L | Ni•Cr alloy 50 g | 100 g | ◎ | stable |
| 5 | SUS430 | SUS430 81 g | 100 g | X | small amount of hydrogen |
| 6 | Ni201 | Ni201 31 g | 60 g | X | no reaction |
| 7 | Ni201 | Ni•Cr alloy 30 g | 60 g | ○ | slightly unstable |
| 8 | Ni201 | Fe 50 g | 40 g | X | no reaction |
| 9 | Ni201 | Mo 25 g | 40 g | ○ | 1.5 l hydrogen |
| 10 | Ni201 | SUS304 55 g | 100 g | X | no reaction |
| 11 | Ni201 | SUS430 55 g | 40 g | X | no reaction |
| 12 | SUS430 | SUS430 81 g | 100 g | ○ | unstable |
| 13 | SUS430 | Pd | small amount (below 1 g) | ○ | stable |
| 14 | Ni201 | W | 100 g | ○ | unstable |
| 15 | SUS430 | Ni•Cr alloy 25 g | 40 g | Δ | unstable |
| 16 | SUS316L | Ni201 53 g | 100 g | X | no reaction |
| 17 | SUS316L | duralmin (Al 95% Cu 4% Mg 0.5% Mn 0.4%) | 100 g | X | abnormal combustion |
| 18 | SUS316L | inconel 53 g | 100 g | X | no reaction |
| 19 | SUS304 | SUS316 55 g | 100 g | ◎ | stable |

In the above Table 1, the combination of the molten salt (NaOH), the material of the casing and the material of the fin is shown, and however, even if the solid catalyst is used instead of the molten salt, the same effect is expected. The best combinations are Nos. 1, 2, 4 and 19 in the Table 1. If Ni, Cr, and Fe exist in the molten salt, hydrogen is generated stably, and if Mo is added (No. 19), the reaction becomes more active. However, as shown in No. 5, if Ni does not exist, the amount of generation of hydrogen is little. Further, as supply body. If SUS 316L (18% Cr-12% Ni-2.5% MO-under 0.03% C-remains Fe) is used instead of SUS 304 as the fin, the reaction becomes more active (No. 19).

b) Solid Catalyst

As solid catalyst, the particles of alkaline metal hydroxide such as KOH and NaOH are evenly mixed with a metal oxide (particle or powder) such as $TiO_2$ and MgO at the ratio (weight) of approximately 3:1 to form a mixture of those substances which is put into the casing 1 or 20 to be heated at a temperature of approximately 450° C. to 550° C. Then, the metal hydroxide is melted to react to the metal oxide to form solid compound (e.g. $K_2Ti_2O_5$, $K_2MgO_2$) at approximately 500° C. while dehydrating.

2) Initial Generation of Hydrogen a) Molten Salt Catalyst

Figure 3:
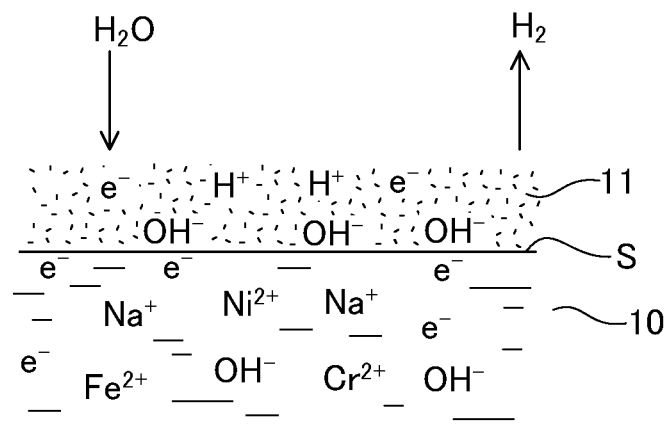
FIG. 3 shows an operational view of a first molten salt catalyst.

When the catalyst room is sufficiently heated, in the case of SUS 304, Ni, Fe and Cr elements are melt into the molten salt (NaOH or KOH) to be ionized ($Ni^{2+}$, $Fe^{2+}$, $Cr^{2+}$) and to eject electrons ($e^-$) thereinto (FIG. 3). On the contrary, the molten salt is also ionized to be divided into sodium or potassium ion ($Na^+$ or $K^+$) and hydroxide ion ($OH^-$), and the fine reaction particle group 11 of the molten salt is ejected from its surface.

Before water is supplied into the casing 1, the electrons ($e^-$) ejected from each metal element react to the hydroxide ions ($OH^-$) to generate hydrogen ($H_2$) and oxygen of $-2$ valence ($O^{2-}$) as shown in the following formula.

$$OH^- + e^- \rightarrow 1/2 H_2 + O^{2-} \quad (1)$$

The oxygen of $-2$ valence reacts to ionized sodium or potassium to generate sodium or potassium oxide ($Na_2O$ or $K_2O$)

$$2Na^+(K^+) + O^{2-} \rightarrow Na_2O(K_2O) \quad (2)$$

The sodium or potassium oxide reacts to steam ($H_2O$) supplied thereafter to generate sodium or potassium oxide (NaOH or KOH).

$$Na_2O(K_2O) + H_2O \rightarrow 2NaOH(KOH) \quad (3)$$

The sodium or potassium hydroxide is ionized to be divided into sodium or potassium ion ($Na^+$, $K^+$) and hydroxide ion ($OH^-$)

In this manner, even before water is supplied into the catalyst room, hydrogen ($H_2$) can be generated after the metal elements are melt into the molten salt. In the formula (1), the nickel ion ($Ni^{2+}$) has a function as a catalyst for dividing hydroxide ion ($OH^-$) into hydrogen (H) and oxygen (O). Chromium and iron ions ($Cr^{2+}$, $Fe^{2+}$) help the above function of nickel ion. Further, sodium or potassium hydroxide generated in the formula (3) can make up for the decrease of the hydroxide ion ($OH^-$) after water is put into the catalyst room.

b) Solid Catalyst

In the case of potassium hydroxide and titanium oxide, the following reaction occurs.

$$2KOH + 2TiO_2 \rightarrow K_2Ti_2O_5 + H_2O \uparrow \quad (4)$$

In the above formula (4), water is generated. Before water is supplied into the catalyst room, potassium (KOH) is melt at a temperature of above 300° C. to react to the particles of titanium oxide ($TiO_2$). At the same time, potassium hydroxide is ionized to have the same function as the molten salt.

That is, each metal element melts into the molten salt (KOH) to eject electrons ($e^-$) which react to the hydroxide ion ($OH^-$) in the following manner.

$$OH^- + e^- \rightarrow 1/2 H_2 + O^{2-} \quad (5)$$

At this time, hydrogen gas ($H_2$) is generated. In the same manner as the formulas (2) and (3), the following reactions occur.

$$2K^+ + O^{2-} \rightarrow K_2O \quad (6)$$

$$K_2O + H_2O \rightarrow KOH \quad (7)$$

The above potassium hydroxide (the formula (7)) makes up for the potassium hydroxide in the formula (4).

3) Main Reaction a) Molten Salt Catalyst

Separation of hydrogen ($H_2$) from steam ($H_2O$) is mainly done by the fine reaction particle group (FIG. 3) which is dispersed upward from the surface S of the molten salt to fill the steam path 8 therewith, and, furthermore, the separation is done at the surface S of the molten salt.

Figure 4:
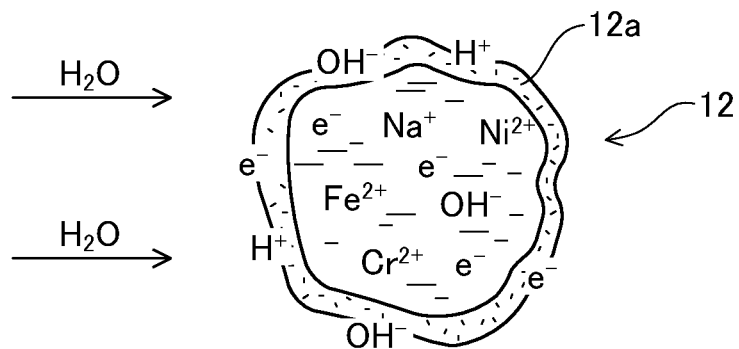
FIG. 4 shows an operational view of fine particles dispersed from the liquid surface of the first molten salt catalyst.

In FIG. 4, the fine reaction particle group 11 comprises a great number of fine particles 12 which has a largeness of nanometer and the same ingredient as that of the molten salt, that is, ionized sodium ions ($Na^+$), hydroxide ions ($OH^-$), nickel ions ($Ni^{2+}$), chromium ions ($Cr^{2+}$), iron ions ($Fe^{2+}$) and electrons ($e^-$) ejected from each metal element. When the fine particles 12 abut against the particles of the steam (120 to 150° C.), the circumferential part of each fine particle 12 gets wet because of its large absorbency, so that the steam generates hydrogen ($H_2$) and hydroxide ion ($OH^-$) by a function of electrons ($e^-$) existing at the circumferential part of the particle 12 in the following manner.

$$2H_2O + 2e^- \rightarrow H_2 + 2OH^- \quad (8)$$

In addition, the fine particle 12 has a certain amount of hydroxide ion ($OH^-$) therein so as to keep equilibrium to sodium irons ($Na^+$), and, therefore, it does not need the extra hydroxide ions ($OH^-$) generated in the above formula (8). The extra hydroxide iron ($OH^-$) unites with each other to generate steam and oxygen ions ($O^{2-}$) of $-2$ valence in the following manner.

$$2OH^- \rightarrow O^{2-} + H_2O \uparrow \quad (9)$$

The above water ($H_2O$) generates hydrogen again in an atmosphere of many electrons in accordance with the formula (8). In this manner, hydrogen is generated gradually.

The oxygen ions ($O^{2-}$) of the formula (9) react to sodium ions ($Na^+$) to generate sodium oxide ($Na_2O$) in the following manner.

$$2Na^+ + O^{2-} \rightarrow Na_2O \quad (10)$$

The above sodium oxide ($Na_2O$) generates sodium hydrogen with water ($H_2O$) newly supplied in the following manner.

$$Na_2O + H_2O \rightarrow 2NaOH \quad (11)$$

The above sodium hydroxide (NaOH) is ionized to make sodium ions ($Na^+$) and hydroxide ions ($OH^-$), and, the sodium irons ($Na^+$) can make up for the sodium ions ($Na^+$) of the formula (10). Therefore, there is no decrease of the sodium ions ($Na^+$).

In this reaction cycle, hydrogen gas is generated gradually, and, in accordance with the generation of hydrogen, oxygen separated from water remains gradually while forming oxide with each metal element (Na, Cr and Fe). These fine particles of sodium hydroxide and residual oxide are discharged from the catalyst room with hydrogen gas to be trapped in a water tank as a steam elimination room. This sodium hydroxide solution can be returned to the catalyst room 6 in order to make up for the catalyst in the catalyst room 6. This system forms a catalyst supplementing device.

The nickel ion ($Ni^{2+}$) in the fine particle can make more active the reactions of the formulas (8) and (9) and the chromium and iron ion ($Cr^{2+}$ and $Fe^{2+}$) help the function of the nickel ion ($Ni^{2+}$).

b) Solid Catalyst

Solid catalyst comprises compound of metal hydroxide (e.g. NaOH, KOH) and metal oxide (e.g. $TiO_2$, MgO). In the case of $K_2Ti_2O_5$ or $K_2MgO_2$, when water is supplied into the catalyst room, the following reversible reaction occurs to generate potassium hydroxide.

$$K_2Ti_2O_5(K_2MgO_2) + H_2 \rightleftharpoons 2KOH + 2TiO_2(MgO) \quad (12)$$

Figure 5:
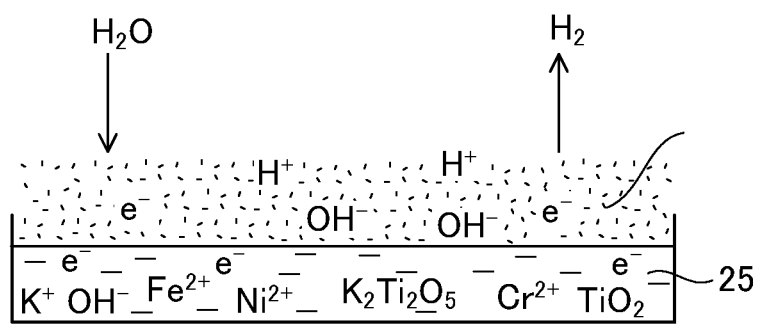
FIG. 5 shows an operational view of a second solid catalyst.
Figure 6:
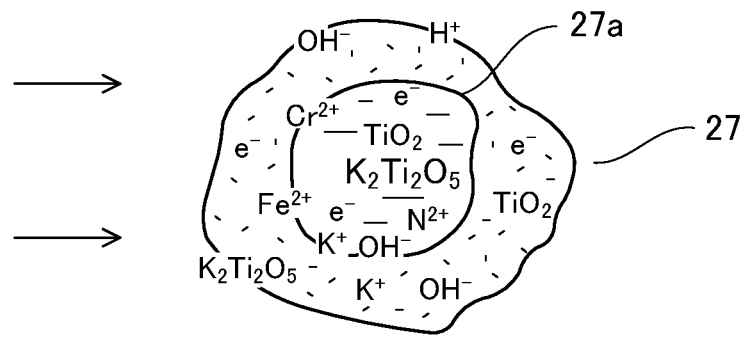
FIG. 6 shows an operational view of fine particles dispersed from the solid surface of the second solid catalyst.

As shown in FIGS. 5 and 6, the fine reaction particle group 26 is ejected from the solid catalyst 25 which comprises compound of potassium titanate ($K_2Ti_2O_5$), potassium hydroxide (KOH) and titanium oxide (TiO2). The fine reaction particle group 26 comprises a great many of fine particles each of which has a circumferential surface 27a melt with water. The surface 27a has $K_2Ti_2O_5$, KOH, TiO2 and sufficient electrons ($e^-$). Therefore, when water is supplied thereinto, the same reactions as those shown in the formulas (8) to (11) occurs.

$$2H_2O + 2e^- \rightarrow H_2 + 2OH \quad (13)$$

$$2OH^- \rightarrow H_2O\uparrow + O^{2-} \quad (14)$$

$$2K^+ + O^{2-} \rightarrow K_2O \quad (15)$$

$$K_2O + H_2O \rightarrow 2KOH \quad (16)$$

KOH of the formula (16) can make up for the catalyst.

4) Features of Catalyst

As mentioned above, the catalyst for separating efficiently hydrogen from water has the following characteristic features.

(a) The catalyst has a high absorbency to catch promptly water.

(b) When the molten salt is heated at a temperature of 300° C. to 600° C., or solid catalyst is heated at approximately 500° C., the fine reaction particle group is ejected to enlarge the whole surface area of the group so as to be able to catch steam effectively. That is, the reaction area is remarkably large.

(c) The metal element supply body comprises a first metal element (Ni, Pd or Pt) for cutting O—H combination and a second metal element for promoting the function of the first metal element (Transition metals such as chromium (Cr), iron (Fe), tungsten (W), molybdenum (Mo), cobalt (Co), copper (Cu) and rhodium (Rh) are preferable)

(d) A reaction cycle for cutting O—H combination of water is formed so that hydrogen in supplied water is partially separated therefrom in one cycle.

Therefore, even when water supply is stopped, the generation of hydrogen is continued for a predetermined time.

(e) In the reaction cycle, oxygen gradually remains in the catalyst room.

A part of the residual oxygen makes up for the catalyst (see the formulas (2), (3), (10), (11) and (15), (16)) and the remains are discharged outward as oxide with hydrogen.

(f) According to the experiments, the temperature of the catalyst room goes up gradually (2 to 3° C. per hour).

The temperature of generated hydrogen is slightly higher than a room temperature. This is because when water is ionized by the function of the fine reaction particle group 11 or 26, endothermic reaction occurs while hydrogen is produced in an atmosphere of high temperature. Therefore, the temperature of hydrogen separated from water does not go up instantly and the hydrogen is discharged outward at a room temperature.

Since endothermic reaction occurs in the reaction space 8 or 24, it is desirable that the reaction space 8 or 24 is provided with a heater 13 (FIG. 1).

Figure 22:
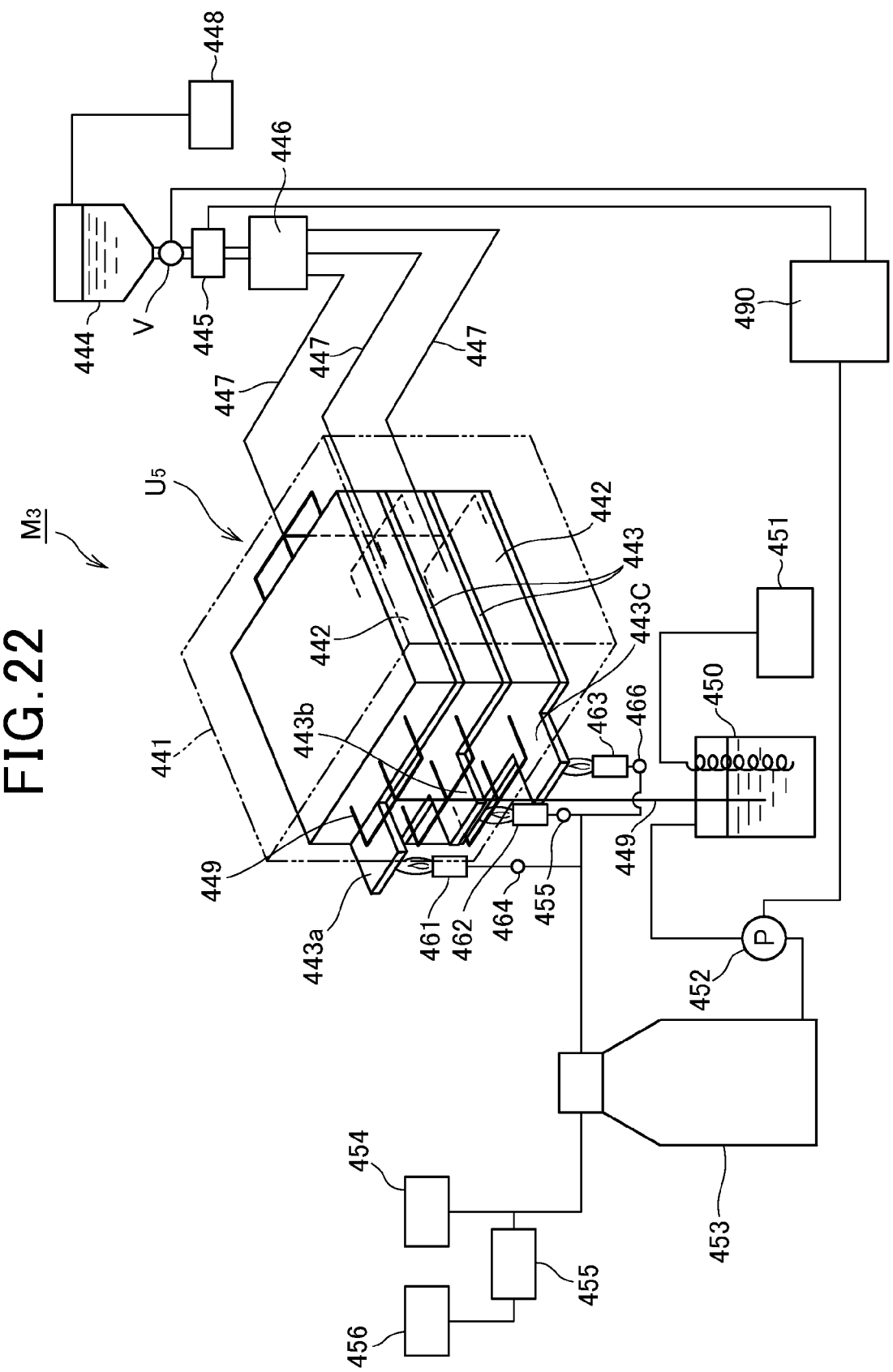
FIG. 22 shows a systematic view of a third hydrogen generating apparatus $M_3$.

In the above reaction cycle, in case that the casing 1 is broken to form a hole through which air flows into the casing 1, potassium ion ($Na^+$), chromium ion ($Cr^{2+}$) and iron ion ($Fe^{2+}$) react on oxygen to make oxides ($Na_2O$, $Cr_2O_3$ and $Fe_2O_3$) which destroy the reaction cycle. Therefore, it is necessary to provide an air inflow prevention device in a hydrogen generation system, which comprises a water tank, a sealed water pipe and a steam elimination device (FIG. 22). In addition, a nickel ion ($Ni^{2+}$) makes an oxide hardly.

5) Experimental Example

Next, experimental examples in which the hydrogen generating apparatus shown in FIG. 1 is used will now be explained. The existence of hydrogen was made sure by combustion tests of hydrogen.

1. The First Experimental Example 0.2 cc of water was supplied every 10 minutes into the casing 1 (width: 50 mm, length: 200 mm, height: 15 mm) without any catalyst therein. At this time, hydrogen is generated at a temperature of approximately 700° C., and however, the generation of hydrogen was stopped after 4 to 6 hours.

The material of the casing 1 was 18-8 stainless steel containing 18% Cr, 8% Ni and remains Fe.

In case that approximately 20 g of scrap stainless steel was put into the casing 1, hydrogen were generated for two days. Instead of the scrap stainless steel, scrap copper of approximately 10 g was put into the casing 1. At this time, the generation of hydrogen was stopped after one day. Further, when 96 g of scrap iron was input into the casing 1, the generation of hydrogen continued at 200° C. for two days. It seems to be simple oxidation reaction. Copper and aluminum did not contribute to the generation of hydrogen.

2. The Second Experimental Example

When 100 g of sodium hydroxide (NaOH) was put into the casing 1 to heat it at a temperature of 600° C. to 700° C., the generation of hydrogen continued for one week.

The sodium hydroxide was in a liquid condition at a temperature of 600° C. to 700° C. and the inner wall of the casing 1 has a function as a metal element supply body.

After that, 98 g of 18-8 stainless steel with respect to 100 g of NaOH was put into the casing, that is, the amount of stainless steel was increased with respect to the amount of NaOH.

At this time, the generation of hydrogen occurred at a temperature of 300° C. to 400° C., and the life span of the catalyst was extended for 10 days.

When both of NaOH 50 g and KOH 50 g were supplied into the casing 1 to heat it at a temperature of 600° C. to 700° C., the life span of the catalyst was 4 days. Therefore, single NaOH of 100 g was better than the combination of NaOH 50 g and KOH 50 g.

In addition, in case that 100 g of stainless steel was added to the mixture of NaOH 50 g and KOH 50 g, the life span of the catalyst was extended for 7 days. That is, the combination of single NaOH and stainless steel as the metal element supply body was the best.

Furthermore, in case that 30 g of titanium alloy was added to NaOH 100 g or KOH 100 g, active reaction occurred at a temperature of 300° C. to 400° C. and the liquid catalyst itself burned to change into solid catalyst. This solid catalyst was sodium titanate ($Na_2Ti_2O_5$) and had a function for catalyst at a temperature of 600° C. to 700° C.

3. The Third Experimental Example

The following metal hydroxide and oxide were well mixed to be supplied into the casing 1 which was then heated at a temperature of 450° C. to 700° C. Various combinations were done in the following manner. Those life spans were generally 3 to 5 days.

1) KOH 100 g
$TiO_2$ 10 g

In this case, potassium titanate ($Na_2Ti_2O_5$) was generated through dehydration reaction and hydrogen was generated at approximately 500° C.

2) KOH 100 g
$TiO_2$ 30 g

The amount of hydrogen generation was increased in accordance with the increase of the amount of titanium oxide. Hydrogen was generated at approximately 500° C.
3) KOH 100 g
$Cr_2O_3$ 10 g
Hydrogen was generated at approximately 700° C.
4) KOH 100 g
MgO 20 g
The life span were long (one week). In this case, potassium magnesium oxide ($K_2MgO_2$) was generated.
5) KOH 100 g
$MoO_3$ 34 g
In this case, potassium molybdenum oxide ($K_2MoO_4$) was generated.
6) NaOH 100 g
ZnO 40 g
In this case, sodium zinc oxide ($Na_2ZnO_2$) was generated.
7) NaOH 100 g
$ZrO_2$ 20 g
In this case, sodium zirconate ($Na_2ZnO_2$) was generated.
8) NaOH 100 g
$SnO_2$ 70 g
In this case, sodium stannate ($Na_2SnO_3$) was generated.
9) NaOH 100 g
$WO_3$ 140 g
In this case, sodium tungstate ($Na_2WO_4$) was generated.
10) NaOH 100 g
CaO 45 g
In this case, sodium calcium oxide ($Na_2CaO_2$) was generated.
11) NaOH 100 g
$Tio_2$ 34 g
In this case, sodium titanate ($Na_2TiO_2$) was generated.

4. The Fourth Experimental Example

In the combinations of two metal hydroxides, the combination of NaOH 100 g and $Ca(OH)_2$ 8 g only generated some amount of hydrogen, and, however, the combination of KOH 100 g and $Ba(OH)_2.8H_2O$ 100 g and the combination of KOH 50 g and NaOH 50 g generated slightly hydrogen.

5. The Fifth Experimental Example

In the combination of metal hydrate and nonmetal oxide, the combination of NaOH 100 g and $SiO_2$ 24 g could generate slightly hydrogen. In the case that a lump of iron was added to the catalyst, much hydrogen was generated, and the life span of the catalyst was 10 days.

In the case that KOH 200 g was added to $SiO_2$ 35 g, those were not combined with each other not to generate hydrogen.

In the case that a lump of iron was added to the combination of NaOH 100 g, $SiO_2$ 17 g and $Al_2O_3$ 12 g, pretty much hydrogen was obtained. That is, the combination of NaOH, $SiO_2$, $Al_2O_3$ and iron in addition to a stainless vessel produces a good catalyst.

6. The Sixth Experimental Example

The following combinations did not generate hydrogen at a temperature of 600° C. to 700° C. even if iron was added.
1) KOH 200 g
$Al_2O_3$ 60 g
2) KOH 100 g
$MnO_2$ 40 g
3) KOH 100 g
$V_2O_5$ 20 g
4) KOH 100 g
$Ba(OH)_2.8H_2O$ 100 g
5) NaOH 200 g
MgO 20 g
$Al_2O_3$ 20 g
6) NaOH 100 g
$Ca(OH)_2$ 7 g
7) NaOH 100 g
$Ca(OH)_2$ 50 g
In the case that the amount of $Ca(OH)_2$ was increased, hydrogen was generated.
8) NaOH 100 g
NiO 140 g
9) NaOH 100 g
$Bi_2O_3$ 25 g
10) NaOH 100 g
$Al_2O_3$ 60 g
11) NaOH 100 g
$SiO_2$ 25 g
$MnO_2$ 15 g
12) NaOH 100 g
$SiO_2$ 20 g
$TiO_2$ 4 g
MgO 2 g Next, the structure of catalyst cells will now be explained.

Figure 7:
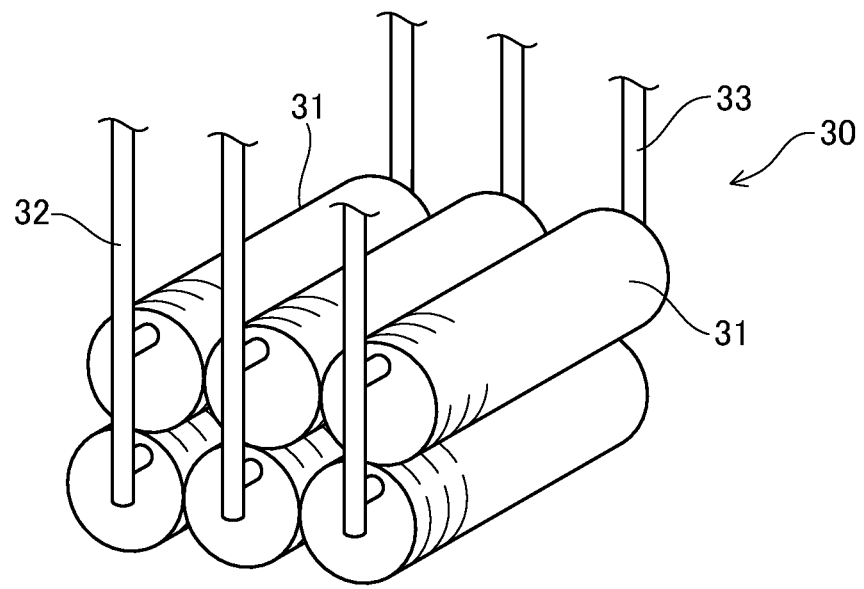
FIG. 7 shows a perspective view of a catalyst unit.
Figure 8:
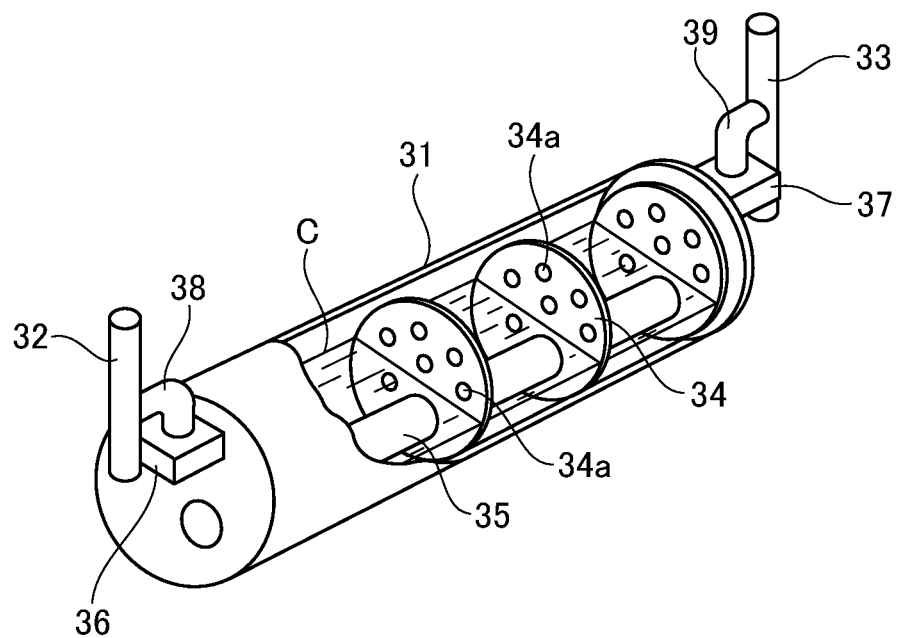
FIG. 8 shows an inner structural view of a catalyst cell which is a member of the catalyst unit.
Figure 9:
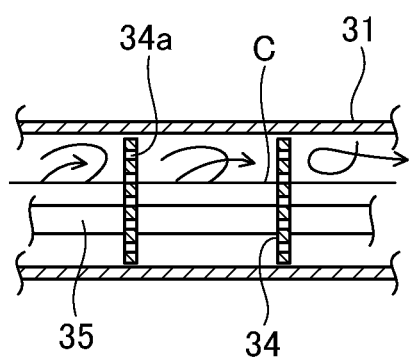
FIG. 9 shows a view for explaining the flow of steam in the catalyst cell.

In FIG. 7, a catalyst cell 30 has a plurality of catalyst cylinders each of which is made of SUS 304 (stainless steel: 18% Cr-8% Ni-remains Fe) and has a steam supply pipe 32 and a hydrogen supply pipe 33. A plurality of circular fins 34 are provided on a heating pipe 35 through which heated air flows at a predetermined interval. Each circular fin 34 has a number of small openings 34a. Alkaline molten salt such as sodium hydroxide is accommodated in the catalyst cylinder. The alkaline molten salt as catalyst C is liquid at a temperature of 300° C. to 500° C. The amount of the catalyst C is adjusted so that its liquid surface positions above the center of the catalyst cylinder. The catalyst C can move freely through the small openings 34a of the circular fin 34. Nickel, chromium and iron ions are supplied to the catalyst C from the fin 34.

At both ends of the catalyst cylinder are provided with guide boxes 36 and 37 which are connected to a steam supply pipe 32 and a hydrogen supply pipe 33 through L-shaped pipes 38 and 39, respectively, and this connecting structure can prevent the catalyst C from entering the steam supply pipe 32 and the hydrogen supply pipe 33. That is, when the catalyst C is dispersed by the reaction between the catalyst C and steam supplied to the catalyst cylinder 31 to enter the guide boxes 36 and 37, it drops along the vertical portions of the L-shaped pipes 32 and 33, respectively, thereby to prevent each of the pipes 32 and 33 from clogging with catalyst.

The steam supplied in catalyst cylinder 31 abuts against the fin 34 to form turbulent flow over the liquid surface of the catalyst C. Thus, the steam can be brought into sufficient contact with the liquid surface of the catalyst and a fine reaction particle group ejected therefrom to increase resoluble efficiency of steam or water. Further, the vessel for the catalyst is formed in the shape of cylinder, the strength of the structure is increased in comparison with a rectangular box and its endurance is increased because welding portions are limited to both end faces of the catalyst cylinder 31 to decrease the number of welding portions.

Figure 10:
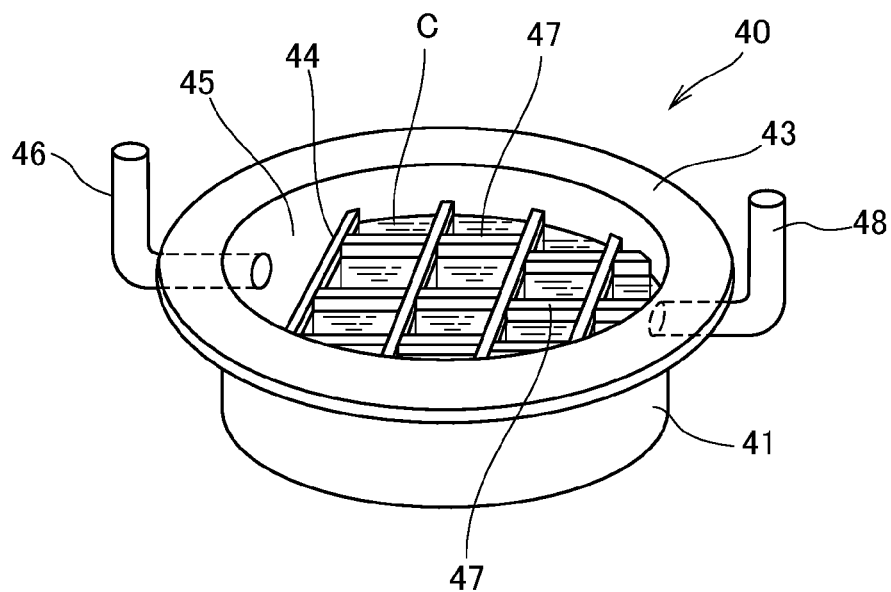
FIG. 10 shows a perspective view of a catalyst cell which is one of other embodiments.
Figure 11:
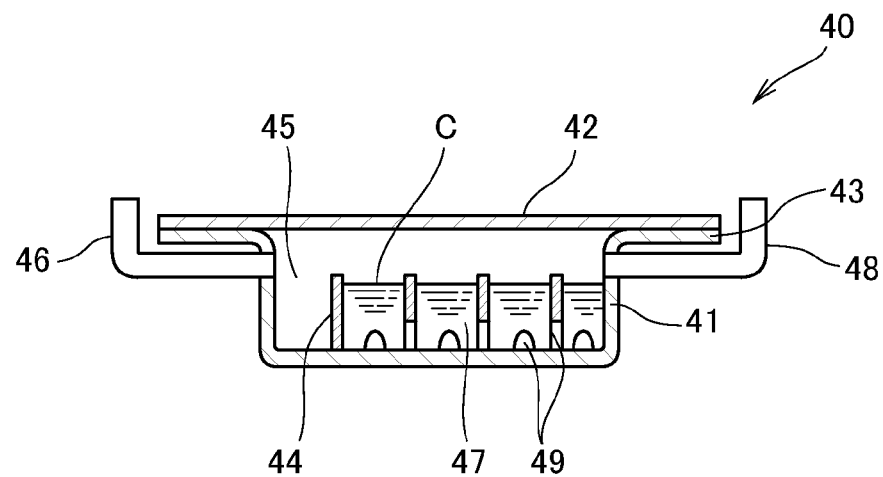
FIG. 11 shows a longitudinal sectional view of the catalyst cell in FIG. 10.

FIGS. 10 and 11 show another embodiment of a catalyst cell. A catalyst cell 40 is formed in the shape of disk as a whole, and has a main body 41 with a shallow bottom and a lid 42 which are welded to a flange 43 formed at the circumferential portion of the main body 41 which has a steam room 45 formed by a partition plate 44 at the end portion of its inside. Water is supplied into the steam room 45 through a water supply pipe 46, and, further, the main body 41 is provided with a plurality of fins 47 of stainless steel (SUS 304) which are brought into contact with the catalyst C. Each fin 47 has a plurality of openings 49 at its lower portion so that the catalyst C can move freely in the main body 41. Hydrogen generated in the main body 41 is taken out of a hydrogen discharging pipe 48 which is provided at a portion opposite to the water supply pipe 46 in the diametrical direction of the main body 41. The disklike main body 41 may be formed by squeezing process so as to have a high strength and to be suitable for mass production.

Figure 12:
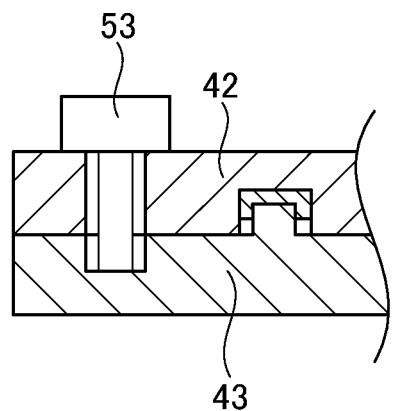
FIG. 12 shows a longitudinal sectional view of the flange of the catalyst cell shown in FIG. 11.
Figure 13:
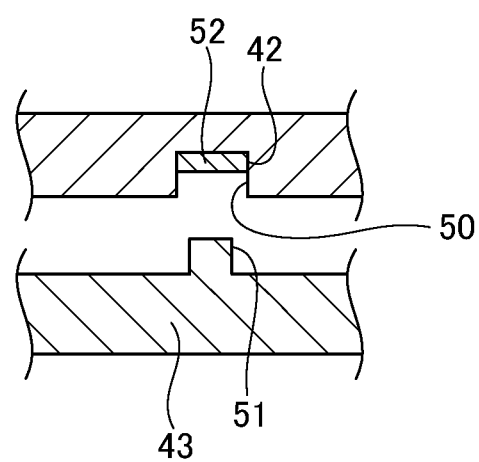
FIG. 13 shows a longitudinal sectional view of a sealing structure of the flange shown in FIG. 12.

Further, when the lid 42 is fastened to the flange 43 by bolts, as shown in FIGS. 12 and 13, the lid 42 is provided, at its lower surface, with a circular concave 50 which is opposed to a circular convex 51 formed on the flange 43. In addition, a copper ring 52 is put into the concave 50 and a bolt 53 is rotated so as to push the copper ring 52 by the convex 51.

Next, a hydrogen generating apparatus containing the catalyst cell mentioned above will now be explained.

Figure 14:
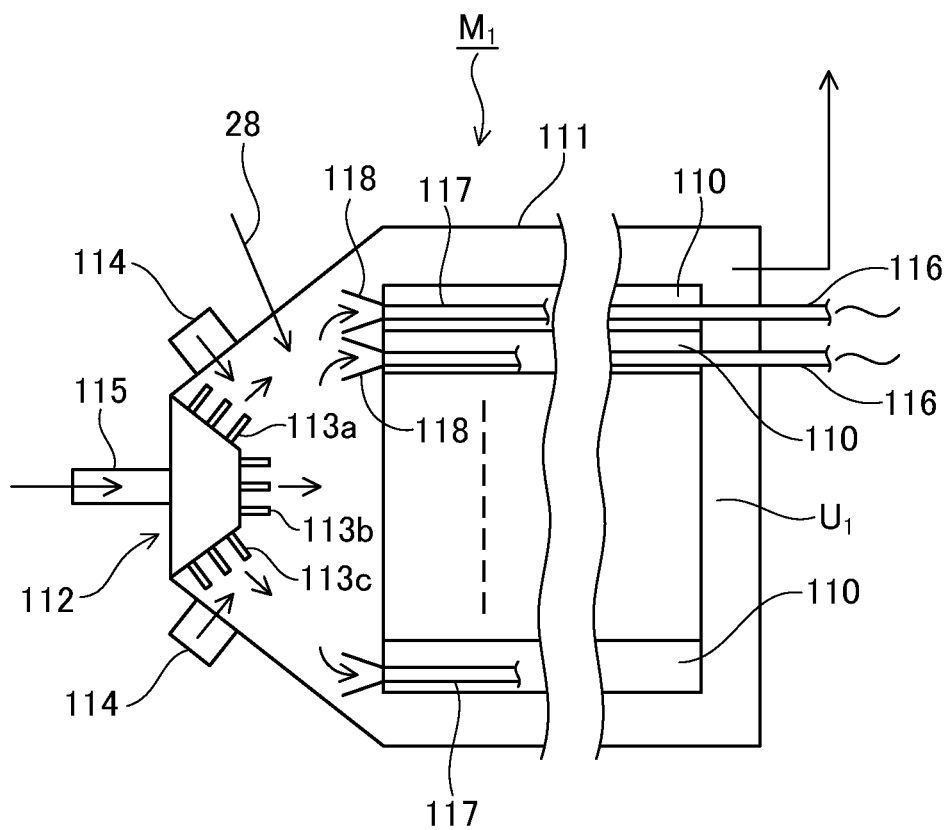
FIG. 14 shows a schematic structural view of a catalyst unit $U_1$ disposed in a first hydrogen generating apparatus $M_1$.
Figure 15:
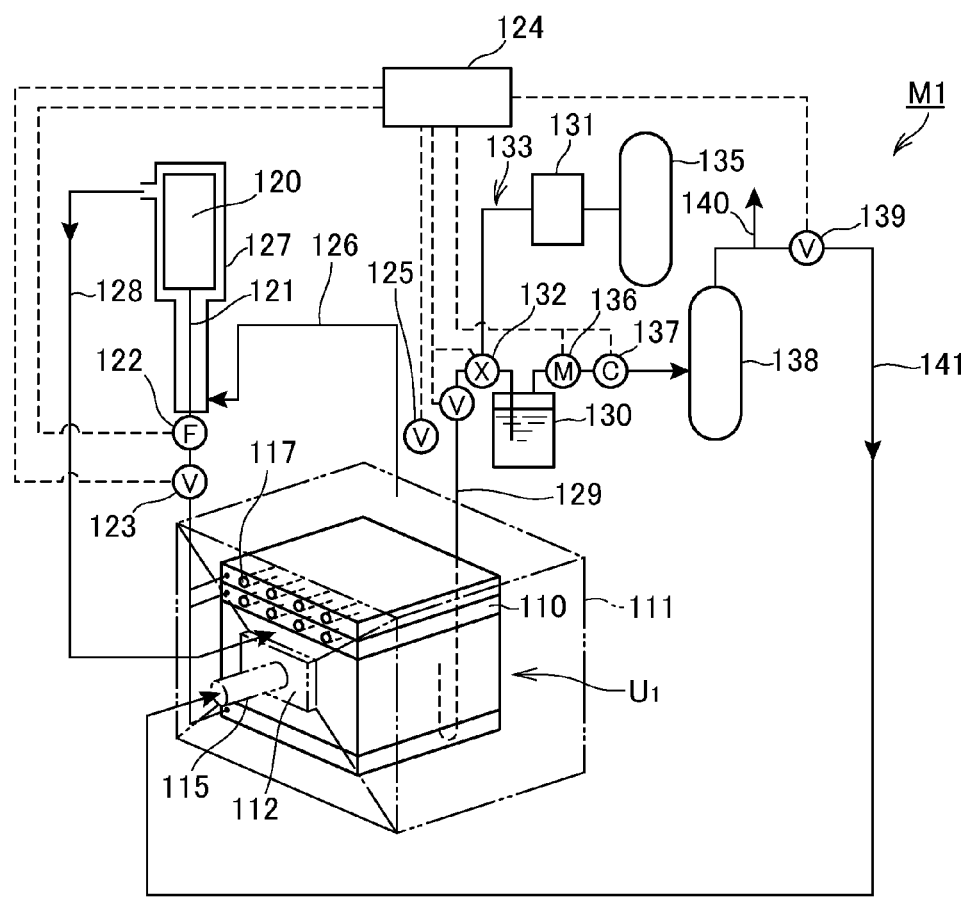
FIG. 15 shows a systematic view of the first hydrogen generating apparatus $M_1$.

In FIGS. 14 and 15, a hydrogen generating apparatus $M_1$ of this invention comprises a catalyst unit $U_1$ which has a plurality of rectangular catalyst rooms 110. The catalyst unit $U_1$ is accommodated in a sealed casing 111 so as to be heated by hot air supplied from a heating device which comprises a hydrogen burner 112 having nozzles 113a, 113b and 113c directed respectively in different directions to supply the hot air to the whole portions in the catalyst unit $U_1$. Clean air is also supplied near the nozzles 113a, 113b and 113c through an air supply pipe 114 in the shape of hollow ring and hydrogen is fed to the hydrogen burner 112 through the hydrogen supply pipe 15 projected from the back surface of the hydrogen burner 112.

Each catalyst room 110 is provided with a plurality of guide pipes 117 for feeding hot air therethrough and guiding auxiliary heaters 116, and on the side of the hydrogen burner 112 of the catalyst room 110, a plurality of guide plates 118 are fitted in order to feed the hot air into the guide pipes 117. Each auxiliary heater 116 is inserted into the guide pipe 117 from behind of the catalyst unit $U_1$ and its rear end projects outward of the sealed casing 111. A predetermined number of auxiliary heaters 116 are inserted into the guide pipes 117 to help the hot air, and the guide pipes 117 have functions as paths for the hot air and support pipes for the auxiliary heaters 116.

Figure 17:
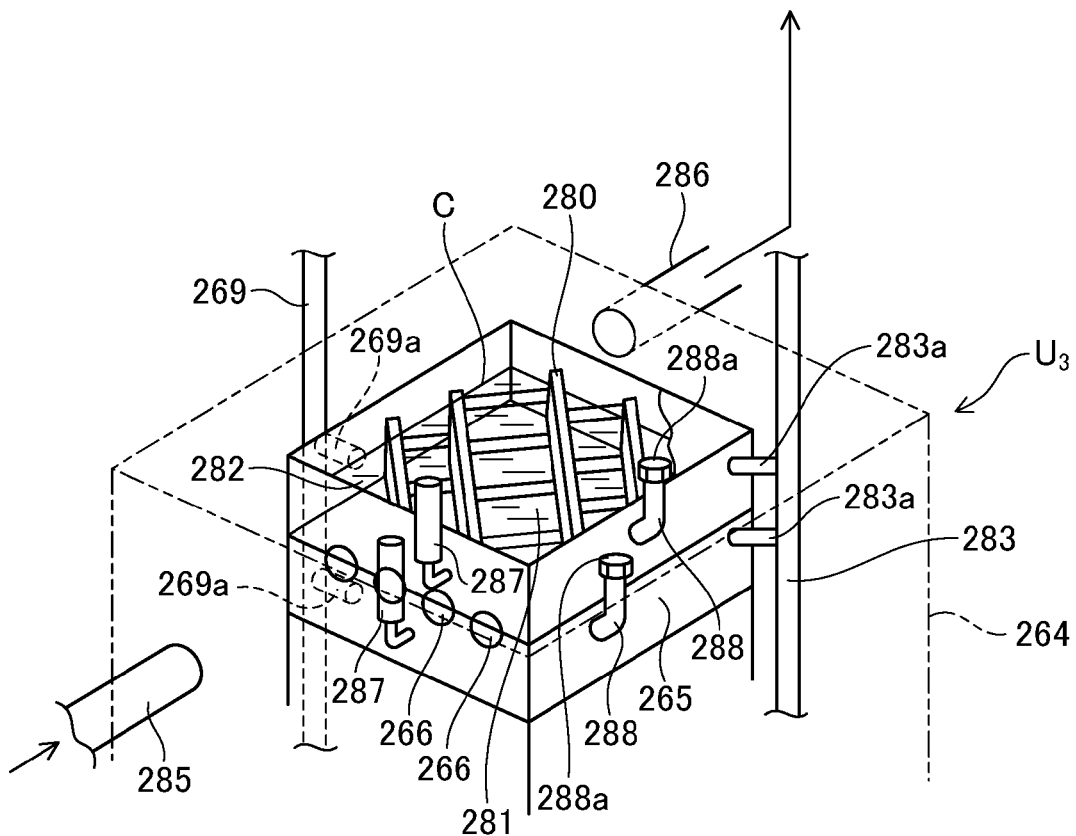
FIG. 17 shows a perspective view of a catalyst unit $U_3$ which is one of other embodiments.

The catalyst room 110 has a structure as roughly shown in FIG. 17 and, in FIG. 15, water supplied from a water tank 120 is fed into a steam room of each catalyst room 110 through a water pipe 121 which is provided with a flowmeter 122 and a flow rate adjusting valve 123, both of which are connected to a controller 124, respectively, which adjusts the flow adjusting valve 123 in accordance with data of the flowmeter 122. A thermometer 125 detects the temperature of the catalyst room 110 so that the flow rate of water supplied to the catalyst room 110 can be adjusted in accordance with the data of the thermometer 125.

The hot air generated in the hydrogen burner 112 heats first the catalyst unit $U_1$, and, thereafter, enters a casing 127 for covering a water tank 120 and a water pipe 121 therewith through a hot air path 126 in order to heat those parts. Then, the hot air is fed to a portion near the hydrogen burner 112 of the sealed casing 111 through a hot air path 128.

On the back surface of the catalyst unit $U_1$ is provided a discharging path 129 for feeding hydrogen generated in the catalyst room 110 and the remaining steam which cannot be changed into hydrogen and oxygen. The discharging path 129 has a steam elimination device 130, and it has also a closing valve 131 and a path changing valve 132 between the steam elimination device 130 and the catalyst room 111. A catalyst oxidation prevention device (air inflow prevention device) 133 is connected to the path changing valve 132 to prevent the catalyst in the catalyst room 110 from oxidizing, and it has an accumulator 134 and an inactive gas tank 135 for e.g. argon gas. The closing valve 131 and the path changing valve 132 are also connected to the controller 124.

And hydrogen separated from the remaining steam is compressed to be stored in the hydrogen tank 138 through the flowmeter 136 and the compressor 137, and the compressed hydrogen is supplied to a hydrogen device (not shown) through a pipe 140 and the hydrogen burner 112 through a burner path 141. The flow rate of the hydrogen is adjusted by a flow rate adjusting valve 139. The flowmeter 136, the compressor 137 and the flow rate adjusting valve 139 are also connected to the controller 124.

The controller operates each member in the following manner.

1. The flow rate adjusting valve 123 is adjusted by the controller 124 to control the amount of water supplied to the catalyst room 110 in accordance with the separating power of the catalyst on the basis of data for showing the temperature of the catalyst room by the thermometer 125. At this time, the flow rate adjusting valve 123 is controlled on the basis of feedback data from the flowmeter 122.

2. The controller 124 detects the amount of the generated hydrogen on the basis of data from the hydrogen flowmeter 136 on the discharging path 129 to recognize the level of the separating power of the catalyst while considering the increase of the temperature based on the temperature information thereby to operate the temperature of the catalyst unit $U_1$ in cooperation with a timer (not shown) set in the controller 124.

3. The controller 124 obtains the temperature data of the catalyst from the thermometer 125 to control the amount of hydrogen fed to the hydrogen burner 112 by adjusting the flow rate adjusting valve 139 set on the burner path 141.

4. The controller 124 controls the catalyst oxidation prevention device 133. That is, the closing valve 131 is normally opened, and the catalyst oxidation prevention device 133 is operated at the time when the operation of the apparatus $M_1$ is finished. The path changing valve 132 is so driven that the argon gas in the gas tank 135 is fed into the catalyst room 110. The argon gas is adjusted at approximately one atmospheric pressure through the accumulator 134, and the argon gas is fed into the catalyst room 110 in accordance with the decrease of the pressure in the catalyst room 110 at the time of the heating device being stopped. This causes the oxidation of the catalyst to be effectively prevented at a high temperature of the catalyst to extend its life span.

Conventionally, a valve (not shown) installed near the steam elimination device 130 on the discharging path 129 is opened so that air is fed into the discharging path 129 thereby to prevent water in the steam elimination device 130 from flowing into the catalyst room 110 because of its pressure decrease.

5. Instead of the provision of the catalyst oxidation prevention device 133, the closing valve 131 may be controlled in the following manner. The controller 124 is provided with a memory device (not shown) which memorizes the temperature of the catalyst room 110 at the time of the apparatus $M_1$ being stopped and the valve 131 is closed to maintain the catalyst room under a decompressed condition. After the apparatus starts its operation, when the catalyst unit $U_1$ is heated at the memorized temperature, the valve 131 is opened to prevent the water in the steam elimination device 130 from flowing into the catalyst room 110. In this case, since air is not fed into the catalyst room 110, the catalyst is not oxidized.

Figure 16:
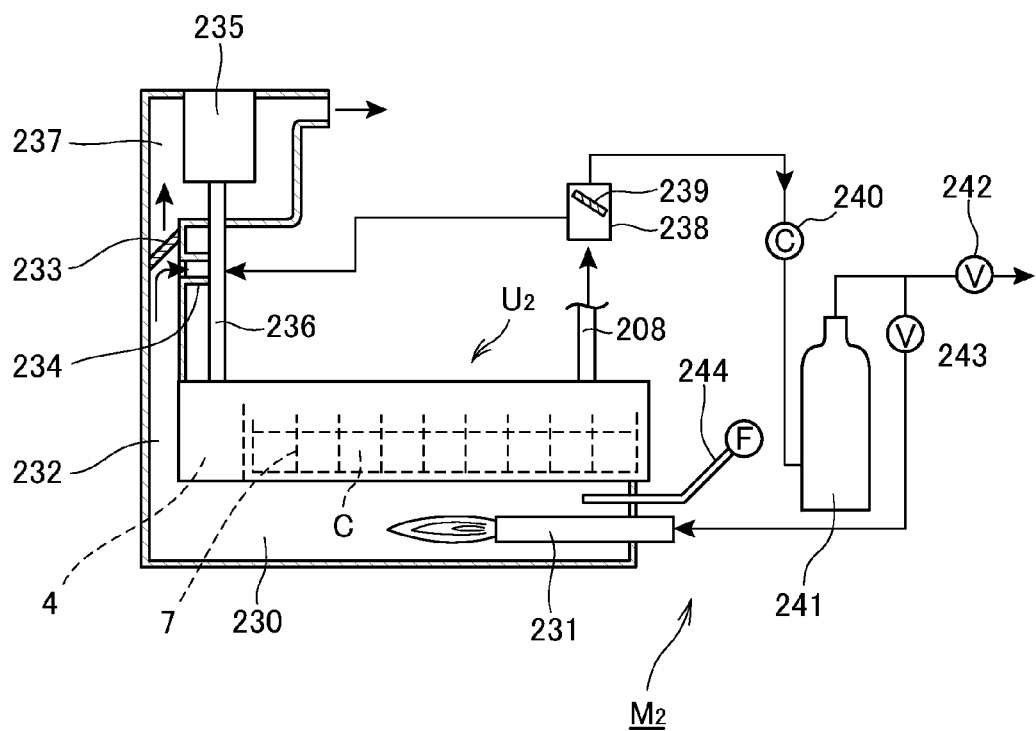
FIG. 16 shows a systematic view of a second hydrogen generating apparatus $M_2$.

FIG. 16 shows a second hydrogen generating apparatus $M_2$ in which the catalyst for the apparatus is heated by the hydrogen obtained therein and which has a catalyst unit $U_2$ similar to that in FIG. 1. At the lower portion of the catalyst unit $U_2$ is formed a combustion room 230 which has a hydrogen burner 231 therein. The combustion room 230 is connected to a guide pipe 232 which has a slanted separation film 233 of palladium alloy at its upper portion to separate hot steam produced by combustion in the hydrogen burner 231 from the remaining air in the hydrogen burner 231. The hot steam passes through a horizontal pipe 234 to enter a water pipe 236 which is extended downward from a water tank 235 and has a function for a water supply path. The remaining air having passed through the separation film 233 flows into a heat exchanging part 237 formed around the water tank 235 to be discharged outward. The hydrogen produced in the catalyst unit $U_2$ and the remaining steam not having been divided into hydrogen and oxygen yet pass through a discharging pipe 208 to enter a separation vessel 238 having a palladium alloy film 239 therein to separate the remaining steam from hydrogen. The remaining steam returns to the water pipe 236 and enters the catalyst unit $U_2$ again. The hydrogen having passed through the separation film 239 is compressed by a compressor 240 to be stored once in a storage tank 241 at a predetermined pressure to be fed outward through a valve 242 or to the burner 231 through a valve 243. In addition, a predetermined amount of air is fed into the combustion room 230 through an air supply pipe 244 so that the hydrogen in the hydrogen burner 231 burns completely.

Figure 18:
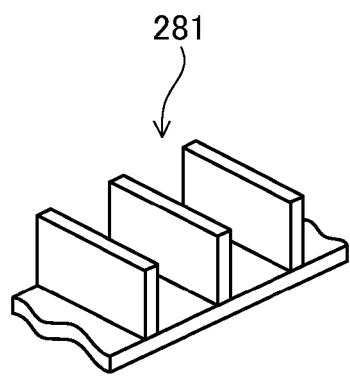
FIG. 18 shows a perspective view of a metal element supply body which is used in the catalyst unit $U_3$ shown in FIG. 17.

Further, a catalyst unit $U_3$ as one of other embodiments will now be explained. In FIG. 17, the unit $U_3$ has a plurality of rectangular catalyst cells 265 piled up in a sealed casing 264 in which catalyst C of alkaline metal compound is accommodated. The catalyst cell 265 is divided by a plurality of partition plates 280 extended obliquely with respect to its casing, and metal element supply bodies 281, as shown in FIG. 18, are disposed between two partition plates 280.

At the corner of the catalyst cell 265 is formed a steam room 282 into which water is dropped through a branch pipe 269a of a water supply line 269.

Hydrogen produced in the catalyst cell 265 and the remaining steam flow into a discharging pipe 283 through a plurality of discharging branch pipes 283a disposed diagonally of the steam room 282. The discharging pipe 283 has a separation vessel corresponding to the steam elimination device 130 in FIG. 15 for separating the remaining steam from hydrogen. The separated remaining steam returns to the water supply line 269 and then flows into the catalyst cell 265 again. The sealed casing 264 is equipped with a guide pipe 285 for guiding hot air and an outlet pipe 286 is disposed on the opposite side of the guide pipe 285. A safety valve 287 for releasing a high pressure gas and a catalyst supplementing cylinder 288 for supplementing catalyst are disposed on the side surface of each catalyst cell 265 and preliminary catalyst is supplied to the catalyst cell 265 through a closing lid 288a at the time of lack of catalyst. A plurality of semi-circular concaves 266 are formed between the bottom surface of the upper catalyst cell 265 and the upper surface of the lower catalyst cell 265 so that the hot air passes therethrough.

Figure 19:
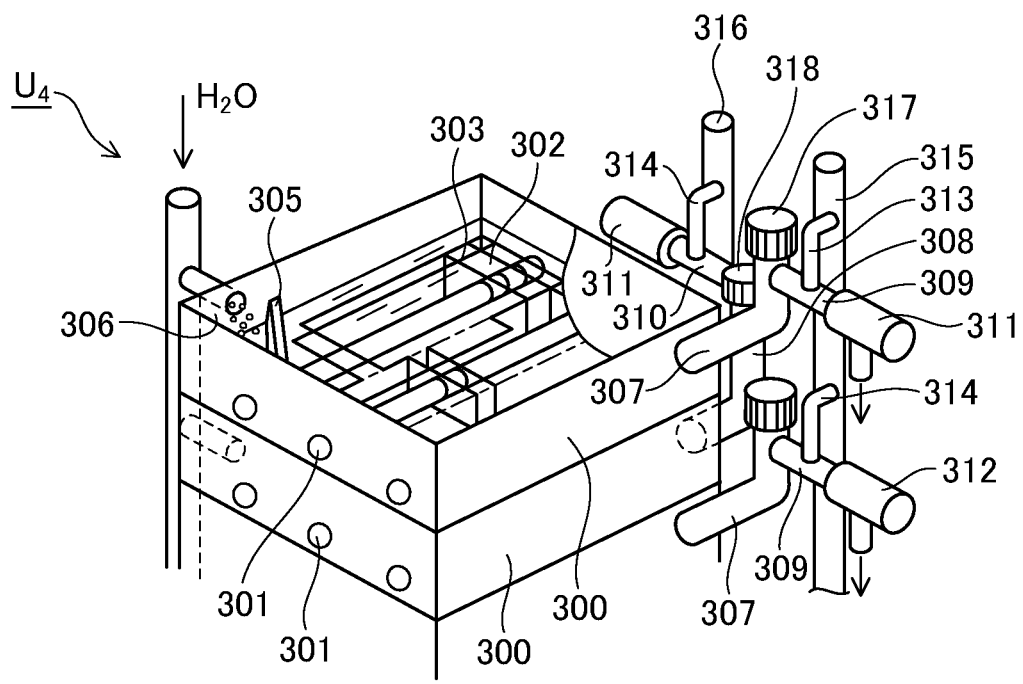
FIG. 19 shows a perspective view of a catalyst unit $U_4$ which is one of other embodiments.
Figure 20:
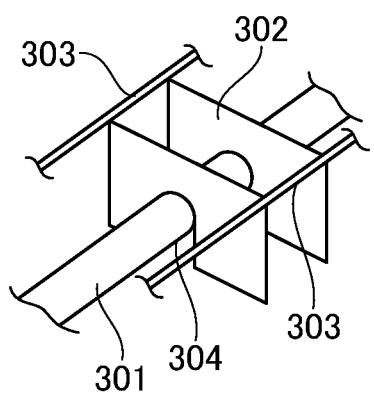
FIG. 20 shows a perspective view of a metal element supply body which is used in the catalyst unit $U_4$ shown in FIG. 19.
Figure 21:
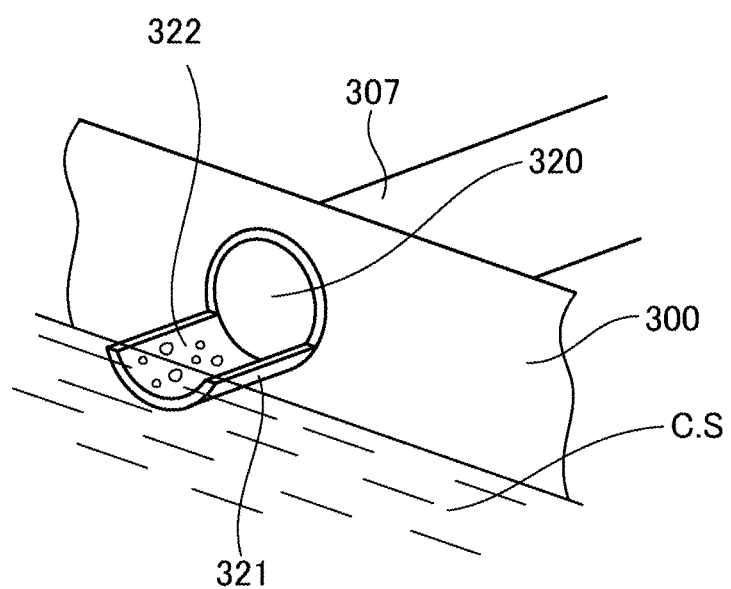
FIG. 21 shows a perspective view of the opening portion of a collective pipe which is disposed in the catalyst unit $U_4$ and has functions for the exhaust of hydrogen gas and the supplement of catalyst.

FIGS. 19, 20 and 21 show one of other embodiments for catalyst cells. A plurality of catalyst cells 300 are piled up and each catalyst cell has a plurality of pipes 301 for making hot air pass therethough. Each pipe 301 supports finlike metal element supply bodies 302 which are fastened by two bars 303, and each body 302 has an engagement hole 304 for being engaged with the pipe 301. A steam room 306 is formed at the corner portion of the catalyst cell 300 and a plurality of rather thick discharging pipes 307 are disposed every other catalyst cells 300 on its side walls at the opposite corner portions. Further, a plurality of rather thick discharging pipes 308 are also disposed every other catalyst cells 300 on the other side walls of the catalyst cell 300, and those discharging pipes 307 and 308 are disposed so as not to cross each other. Each pipe 307 or 308 has a horizontal pipe 309 or 310 which is equipped with a relief valve 311 or 312. Each horizontal pipe 309 or 310 is connected to a gas discharging pipe 315 or 316 through a branch pipe 313 or 314. Each pipe 307 or 308 has a cap 317 or 318 and catalyst is supplied into the catalyst cell 300 by opening the cap 317 or 318.

The root portion 320 of the pipe 307 or 308 is, as shown in FIG. 21, open to the upper portion above the surface c.s of the catalyst, and a shield plate 321 is disposed at the lower portion of its root portion 320 so as not to close the root portion 320. The shield plate 321 is provided with a plurality of openings 322 for dropping easily therethrough a part of the catalyst jumped up on the shield plate 321, and has also a function as a guide plate at the time of supply of the catalyst.

Further, one of other embodiments will now be explained. In FIG. 22, a hydrogen generating apparatus $M_3$ has a catalyst unit $U_5$ which is installed with an adiabatic casing 441 in which catalyst cells 442 are piled up in three steps, and a heating plate 443 is attached to the bottom of each catalyst cell 442. A predetermined amount of water is fed into each catalyst cell 442 from a water tank 444 through a flowmeter 445 and a plurality of water pipes 447 extended from the bottom of an auxiliary tank 446.

A predetermined pressure is exerted on the water surface of the water tank 444 by a compressor 448 so that water is supplied smoothly into each catalyst cell 442 against the pressure of steam produced in the cell 442. On the walls of the catalyst cells 442, opposed to the walls connected to the water pipes 447 is formed a hydrogen line 449 which is connected to a steam elimination device 450 comprising a water tank in which the hydrogen line 449 is extended below the water surface so that the remaining steam and small particles of the catalyst discharged from the cell 442 together with hydrogen can be eliminated. The water tank 450 is cooled by a chiller 451, and the hydrogen having passed through the water tank 450 is once stored in a hydrogen tank 453 from which the hydrogen is supplied to a burner 454. In addition, the hydrogen having a high purity is supplied to a fuel cell 456 to generate electricity through a purity increasing device 455 comprising a palladium film for increasing the purity of hydrogen.

Figure 23:
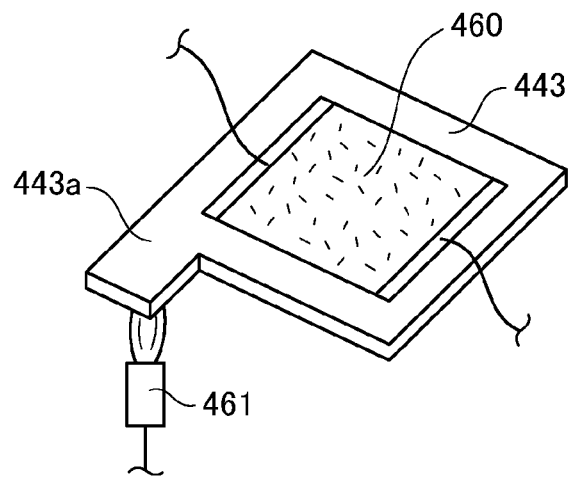
FIG. 23 shows a perspective view of a plate-shaped heater which is used in a catalyst unit $U_5$ of the hydrogen generating apparatus $M_3$.

A part of hydrogen in the hydrogen tank 453 is used for heating each heating plate 443 comprising a plate made of e.g. aluminum alloy and heating paste mainly comprising carbon, and the uppermost heating plate 443 has a heated portion 443a, projected from one side thereof, which is heated by a hydrogen burner 461. FIG. 23 shows the upper heating plate 443, and the center heating plate 443 and the lower heating plate 443 have heated portions 443b and 443c at their positions different from each other, respectively. The heated portions 443b and 443c are heated by hydrogen burners 462 and 463, respectively. The hydrogen is supplied to each hydrogen burner 461, 462 or 463 through each valve 464, 465 or 466 and a back fire prevention device (not shown).

Figure 24:
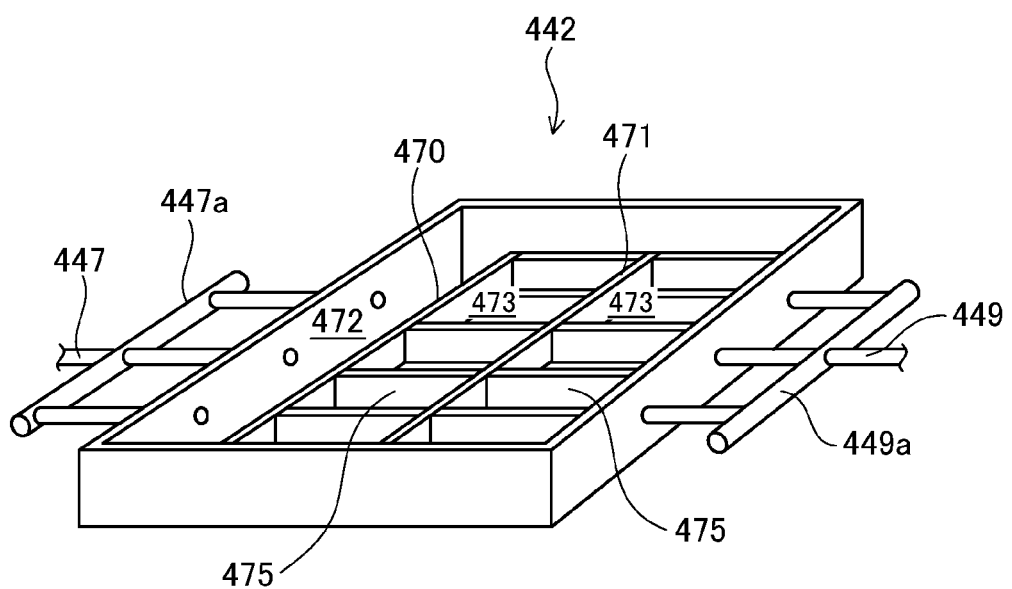
FIG. 24 shows a perspective view of a catalyst cassette which is a member of the catalyst unit $U_5$ shown in FIG. 22.

The catalyst cell 442 is made of stainless steel plates as a whole, and is partitioned by a plurality of partition walls 470 and 471 as shown in FIG. 24. A steam room 472 is formed between one side wall of the catalyst cell 442 and the partition wall 470, and water drops are fed separately into the steam room 470 through a plurality of branch pipes 447a disposed at the end of the water pipe 447 to generate steam of a temperature of 120° C. to 150° C. Adjacent to the steam room 472 is formed a catalyst room 473 in which a plurality of fins of stainless steel are accommodated together with liquid or solid catalyst. Hydrogen produced in the catalyst room 473 flows into a branch pipe 449a disposed on the side wall opposite to the steam room 472 and is collected in a collective pipe 449 to be fed into the steam elimination device 450.

A controller 490 controls a pump 452 for compressing hydrogen and a closing valve V on the basis of data from the flowmeter 445.

Next, one of other embodiments will now be explained.

Figure 25:
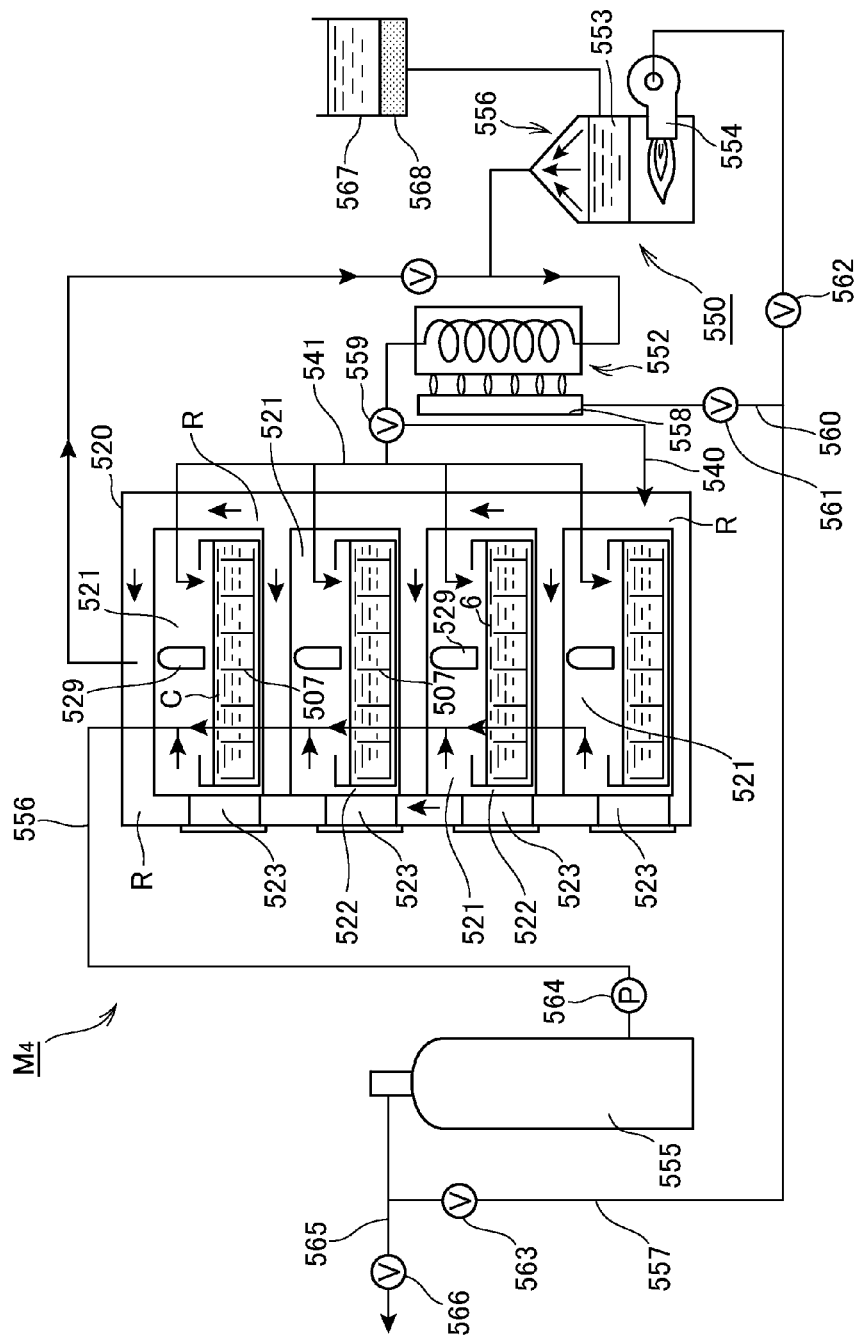
FIG. 25 shows a systematic view of a fourth hydrogen generating apparatus $M_4$ which is one of other embodiments.
Figure 26:
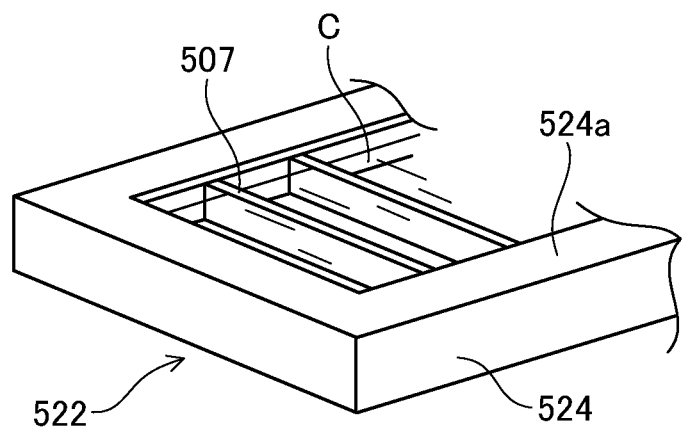
FIG. 26 shows a perspective view of a catalyst cassette which is used in the fourth hydrogen generating apparatus $M_4$.
Figure 27:
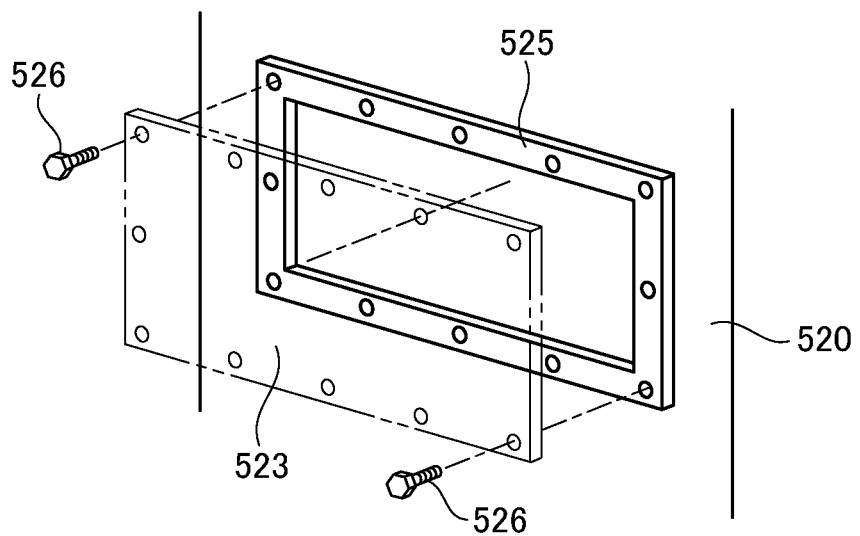
FIG. 27 shows a perspective view of the front surface of a sealed casing of the fourth hydrogen generating apparatus $M_4$.

In FIG. 25, a hydrogen generating apparatus $M_4$ has a sealed casing 520 in which a plurality of sealed rooms 521 are formed. Each sealed room 521 has a catalyst cassette 522 detachably as shown in FIG. 26 and a closing plate 523 for closing the sealed room 521. The catalyst cassette 522 is put into and taken out of the sealed room 521 in a state wherein the closing plate 523 is opened. The closing plate 523 can be fixed to an inlet frame 525 mounted on the front surface of the sealed casing 520 by means of a plurality of screws 526 as shown in FIG. 27. The catalyst cassette 522 has a flat and rectangular casing 524, on the upper surface of which an inner flange 524a is formed to prevent the catalyst C from dispersing outward, and a metal element supply body 507 is accommodated in the casing 524 as shown in FIG. 26. Around the sealed rooms 521 is formed a steam path R for making the superheated steam pass therethrough by which each sealed room 521 and the catalyst therein are heated at a temperature of 300° C. to 600° C.

Figure 28:
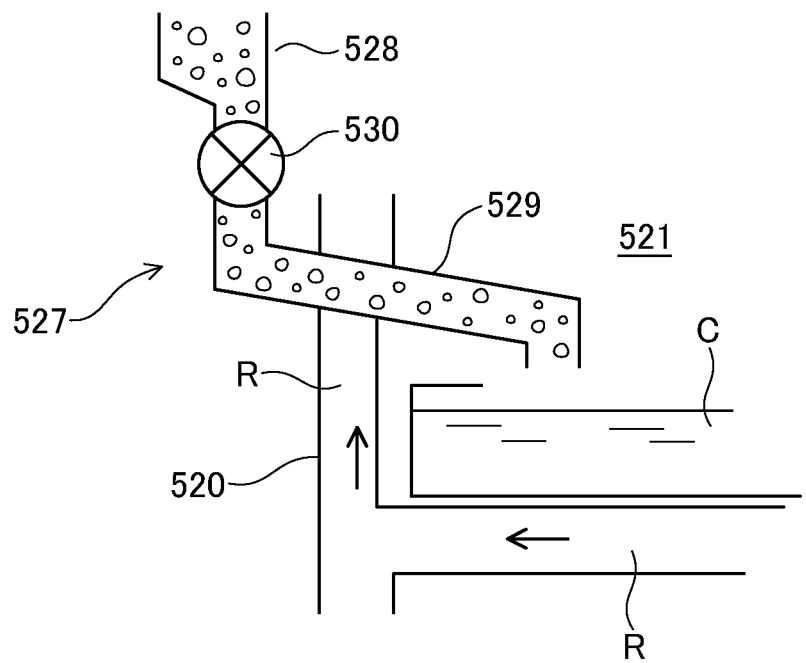
FIG. 28 shows a structural view of a catalyst supplementing device mounted on the sealed casing shown in FIG. 25.

A catalyst supplementing device 527 is mounted on the side wall of the sealed casing 501 to supplement alkaline metal hydroxide to the catalyst cassette and comprises a hopper 528, a supplementing cylinder 529 and a closing valve 530 disposed between the hopper 528 and the cylinder 529 as shown in FIG. 28. The distal end of the cylinder 529 is positioned over the catalyst cassette 522, and the catalyst is supplied into the catalyst cassette 522 one after another by opening the closing valve 530. In this manner, the decrease of alkaline metal as the catalyst can be supplemented to extend remarkably the life span of the catalyst.

Figure 29:
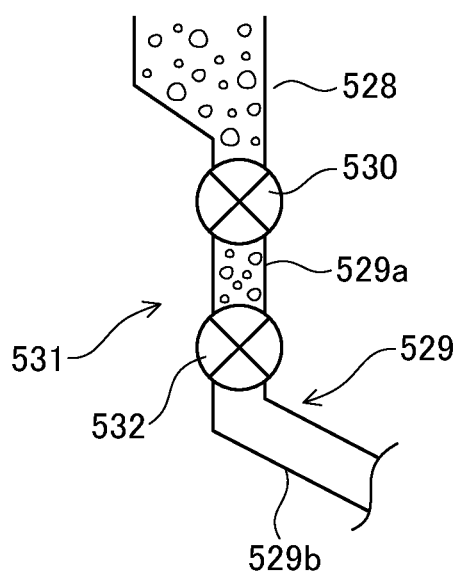
FIG. 29 shows a structural view of a catalyst supplementing device which is one of other embodiments.

When the catalyst is supplemented to the catalyst cassette 522, if oxygen in air enters the sealed room 521, the catalyst is abnormally oxidized to shorten the life span of the catalyst by generating much oxide. Therefore, it is preferable to provide a supplementing device 531 as shown in FIG. 29. That is, the device 531 has the hopper 528 and the supply cylinder 529 comprising an intermediate cylinder 529a and a final cylinder 529b, and two closing valves 530 and 532 are disposed at the both ends of the intermediate cylinder 529a. When the catalyst is supplied thereto, the closing valve 530 is opened while the closing valve 532 is closed to remain once the catalyst in the intermediate cylinder 529a, and, thereafter, the closing valve 530 is closed. Further, the closing valve 532 is opened to feed the catalyst in the intermediate cylinder 529a into the catalyst cassette 522.

In FIG. 25, superheated steam is fed into the steam path R of the sealed casing 520 through a steam line 540 while superheated steam is fed over the catalyst cassette 522 through a steam line 541. The superheated steam is produced by a superheated steam producing device 550 which has a boiler 551 for changing water into steam at 100° C. and a heat exchanger 552 for superheating the steam at a temperature of 200° C. to 300° C. The boiler 551 comprises a water tank 553 and a hydrogen burner 554 disposed under the lower portion of the water tank 553, and hydrogen is fed into the hydrogen burner 554 through a line 557 connected to a hydrogen cylinder 555 for storing hydrogen fed from each catalyst cassette 522 through a line 556.

The heat exchanger 552 is also operated by the hydrogen burner 558 to produce superheated steam at a temperature of 200° C. to 300° C. which is divided into the line 540 and 541 at a predetermined ratio through the valve 559 so that a predetermined amount of the steam is fed into the path R and the catalyst cassette 552, respectively. The hydrogen burner 558 is connected with a line 560 separated from a line 557, and the line 560 has a valve 561, and further, the line 557 has a valve 562 near the hydrogen burner 554 and a valve 563 near the hydrogen cylinder 555. A line 565 is extended form the hydrogen cylinder 555 to be connected to a hydrogen driven device (not shown) and has a valve 566. The water tank 553 for the boiler 551 is connected to an outer tank 567 having ion exchange resin 568 for eliminating chlorine (Cl) in city water. The chlorine (Cl) makes catalyst inactive.

Figure 30:
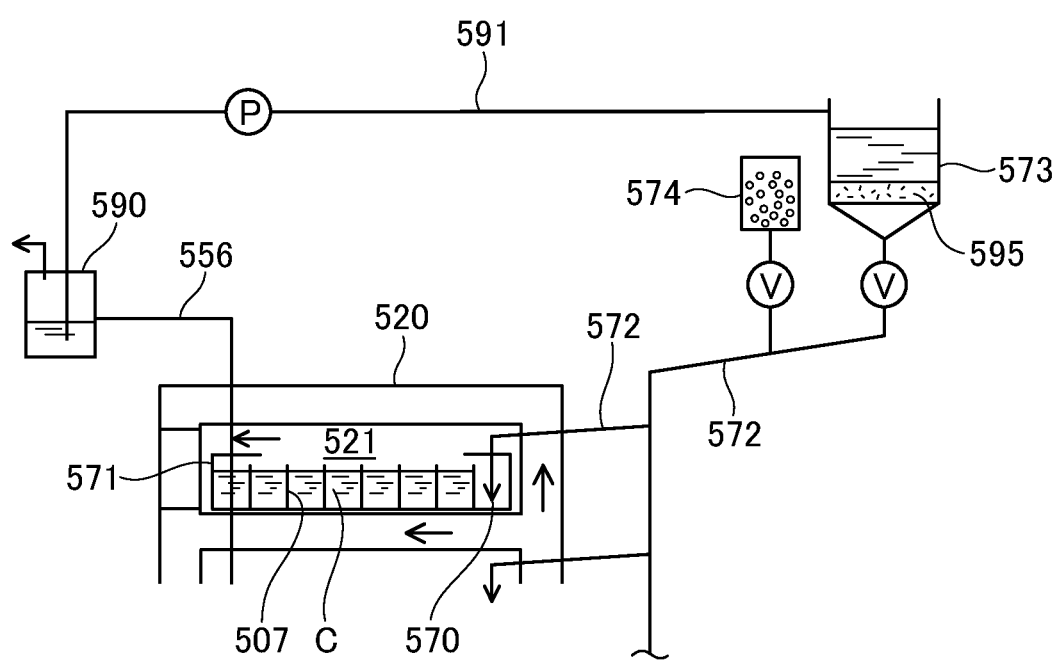
FIG. 30 shows a structural view of a catalyst supplementing system which is one of other embodiments.

In FIG. 30, a catalyst tank 574 may be disposed in addition to a water tank 573 having ion exchange resin 595 therein, and the catalyst in the tank 574 is fed into the steam room 570 of a catalyst cassette 571 through a line 572 in which the catalyst is dissolved in water from the water tank 573.

Hydrogen, fine particles of catalyst, those oxides and the remaining steam not having been divided into hydrogen and oxygen pass through the line 556 to be caught by water in a steam elimination device 590 to produce sodium hydroxide solution (NaOH) which is fed into the water tank 573 through a return line 591 to supplement the catalyst. The steam elimination device 590 and the return line 591 form a catalyst supplementing device.

A hydrogen system in case that a catalyst unit is adapted to a ship will now be explained.

In the case of a ship, pitching and rolling must be considered.

Figure 31:
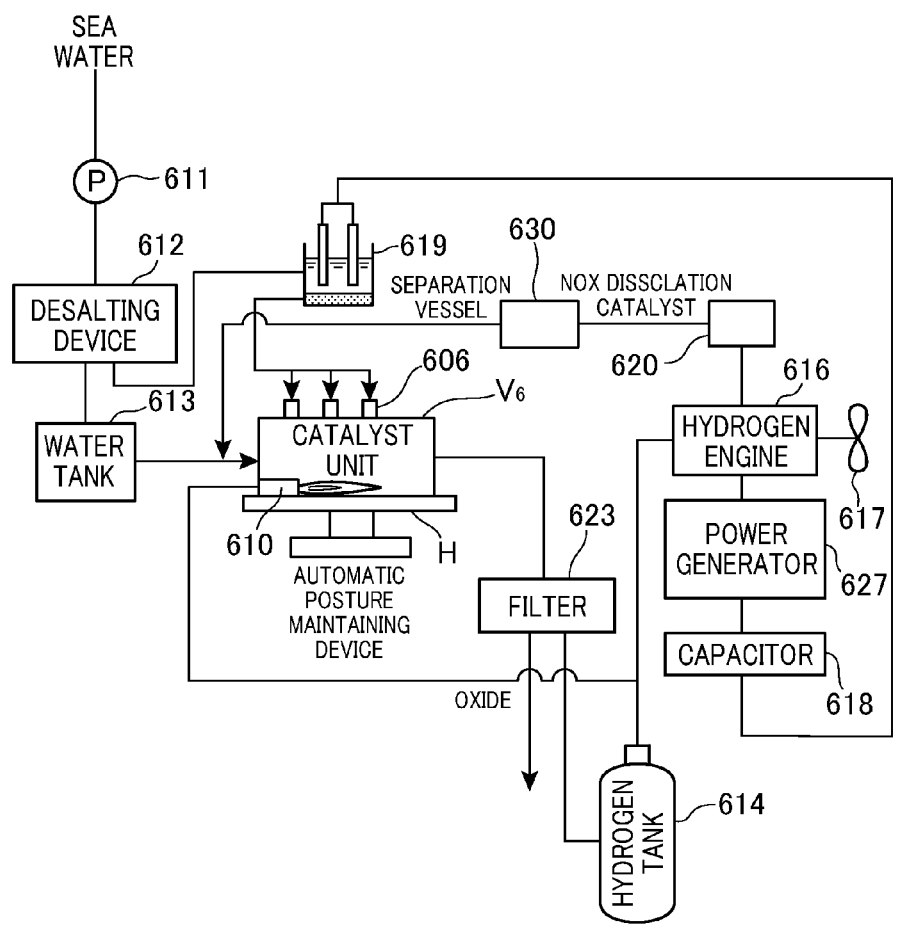
FIG. 31 shows a systematic view in case that a hydrogen generating apparatus is applied to a ship.
Figure 32:
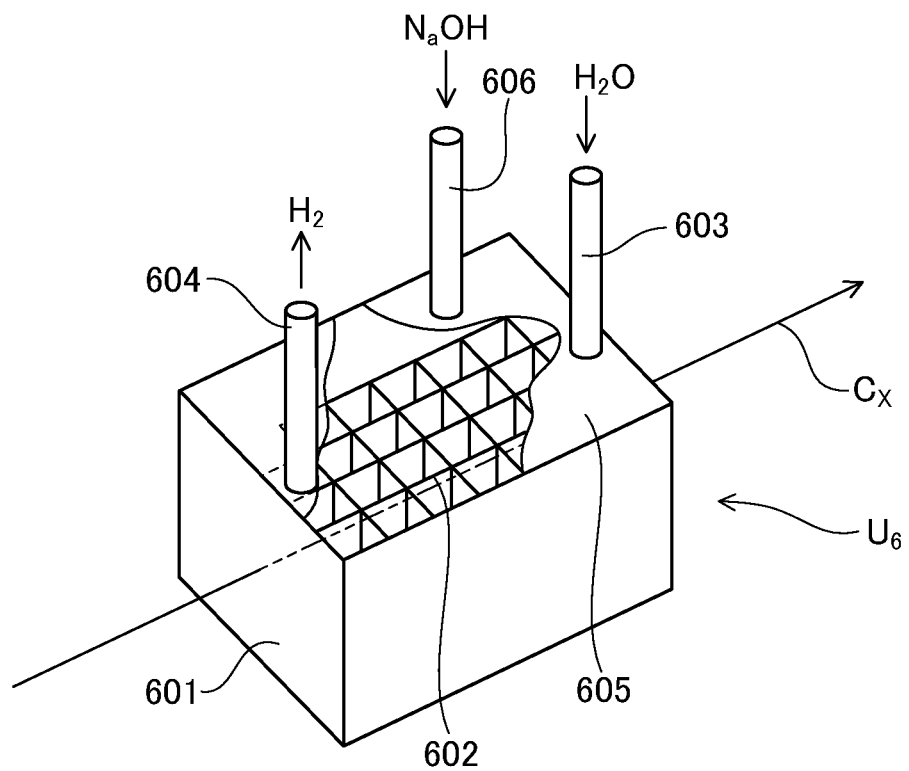
FIG. 32 shows a perspective view of a catalyst unit $U_6$ which is used in the hydrogen generating apparatus shown in FIG. 31.
Figure 33:
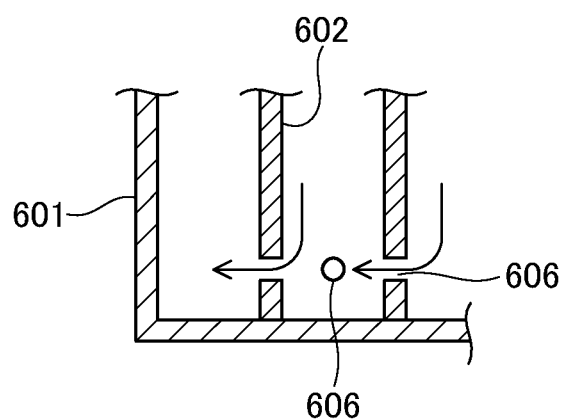
FIG. 33 shows a partial sectional view of the catalyst unit shown in FIG. 32.

In FIG. 31, a catalyst unit $U_6$ having liquid catalyst therein is supported on a horizon maintaining device H with a gyroscope. Instead of the device H, the catalyst unit $U_6$ may have a structure as shown in FIGS. 32 and 33. The catalyst unit $U_6$ has a casing 601 of stainless steel with a deep bottom and a plurality of partition walls in the shape of lattice therein. The partition walls divide the inner space of the unit $U_6$ into many rooms to prevent a steam supply pipe 60 and a hydrogen discharging pipe 604 from being clogged with the molten salt catalyst. It is preferable that the two pipes 603 and 604 are disposed on the upper plate 605 of the unit $U_6$ at the center in its lateral direction and the longitudinal center axis of the unit $U_6$ coincides with the longitudinal center axis $C_X$ of the ship. A supplementing cylinder 606 is mounted on the upper plate 605, and the liquid catalyst passes freely through a plurality of openings 606 formed near the lower end of each partition wall 602.

The catalyst unit $U_6$ is heated by a hydrogen burner 610 at a temperature of 300° C. to 600° C. Sea water is fed into a known desalting device 612 by a pump 611 to eliminate salt therefrom, then, to enter a water tank 613. A predetermined amount of fresh water is fed into the catalyst unit $U_6$ to be divided into hydrogen and oxygen. Hydrogen produced in the catalyst unit $U_6$ is stored in a hydrogen tank 614 after particles of oxide are eliminated by a filter 623, and the stored hydrogen is supplied into a hydrogen engine 616 to rotate a screw 617. A part of hydrogen is also fed to a hydrogen burner 610 for heating the catalyst. The hydrogen engine 616 is connected to a power generator 627, and the generated electricity is stored in a capacitor 618 which supplies the electricity to an electric dissolution furnace 619 for producing sodium hydroxide (NaOH). Salt separated from sea water in the desalting device 612 is fed into the furnace 619. The sodium hydroxide is fed into the catalyst unit $U_6$. The discharged gas (mainly hot steam) from the hydrogen engine 616 passes through a $NO_X$ dissolution catalyst 620 in which $NO_X$ is eliminated, and only steam is fed into the catalyst unit $U_6$ after air($N_2$, $O_2$) is eliminated through a separation vessel 630.

Figure 34:
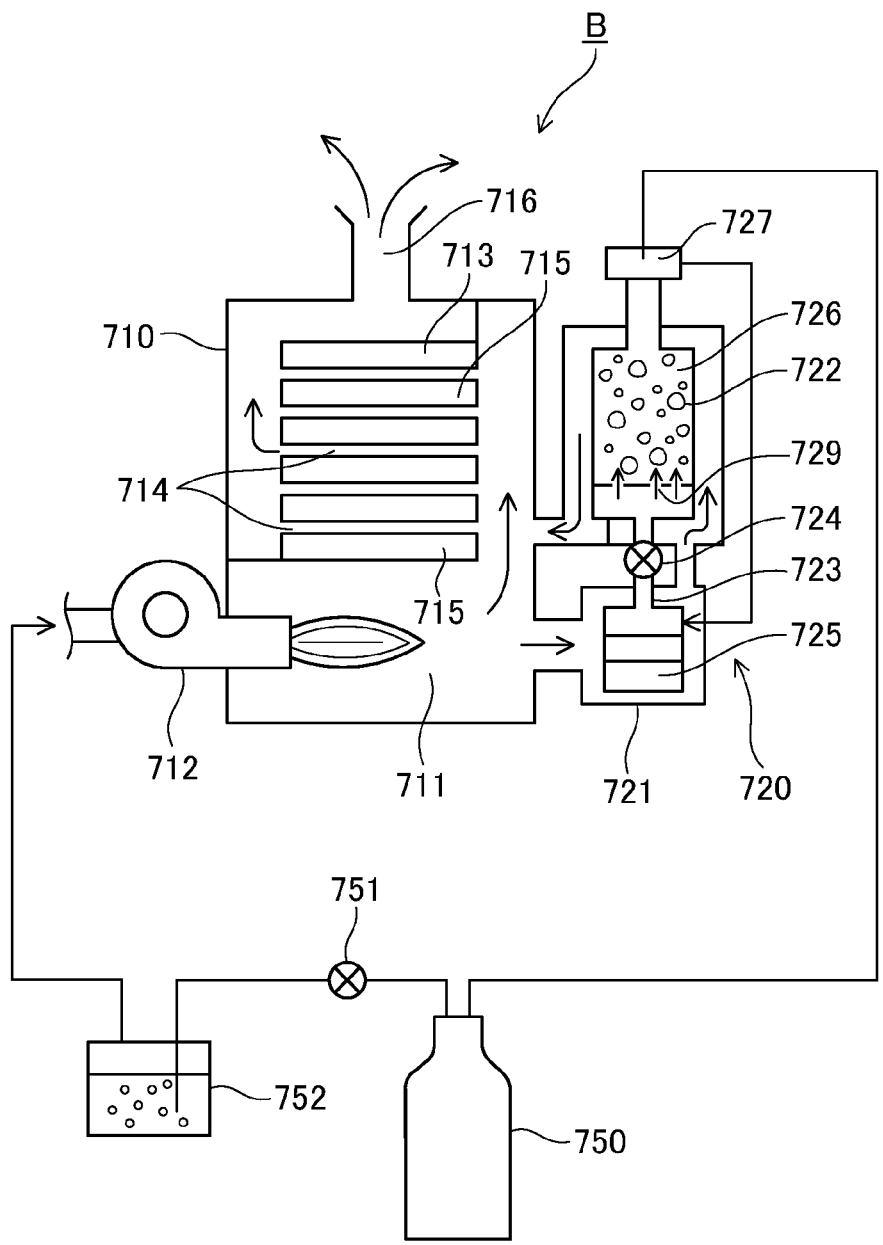
FIG. 34 shows a systematic view in case that a hydrogen generating apparatus is assembled in an air boiler.

FIG. 34 shows an embodiment in which a boiler B uses a solid catalyst in the shape of pellet. The main body 710 of the boiler has, its lower portion, a furnace cylinder 711 in which a hydrogen burner 712 is disposed. A heat exchanger 713 is mounted on the upper portion of the furnace cylinder 713, and a heat exchange operation is done between hot air fed from the hydrogen burner 712 through a passage 714 and air in an air path 715. The hot air is discharged from a flow outlet 716 formed on the upper wall of the main body 710.

Further, on the back surface of the main body 710 is formed a hydrogen generating portion 720 which comprises a steam room 721 and a catalyst room 722 and is provided with a connecting path between the two rooms 721 and 722. The steam room 721 has, therein, a steam cylinder 725 which is heated by hot air from the hydrogen burner 712 to produce steam at a temperature of 120° C. to 150° C. This steam is brought into contact with the pellet catalyst 726 in the catalyst room 722 to produce hydrogen.

A separation part 727 is formed at the upper portion of the catalyst room 722 to separate hydrogen from steam and comprises a filter of palladium alloy through which steam cannot pass but only hydrogen can pass. The steam separated by the part 727 returns to the catalyst room 722 which is provided, at its bottom, with a punched plate 729 for making steam pass therethrough and supporting the pellet catalyst thereon. The hydrogen separated from the steam is stored in a hydrogen tank 750 to be supplied to a hydrogen burner 712 through a valve 751 and a water sealing vessel 752.

Figure 35:
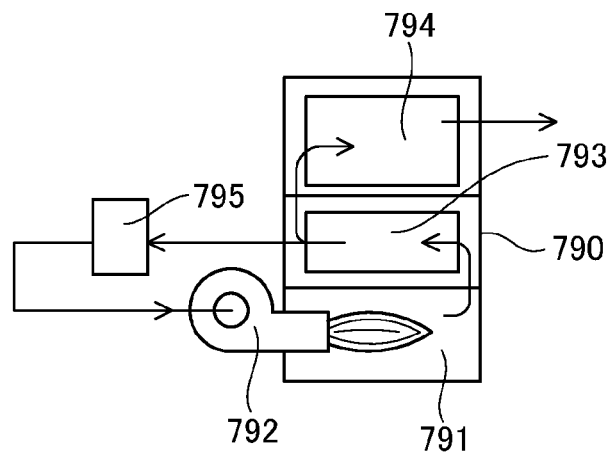
FIG. 35 shows a systematic view of a hydrogen burner which is provided with a catalyst unit.

FIG. 35 shows one of other hydrogen burner systems in which a burner is used for an air boiler. The boiler is provided with a furnace cylinder 791, at the lower portion of its casing 790, in which a hydrogen burner 792 is disposed. Hydrogen and air is supplied to the hydrogen burner 792, and the hot steam produced in the furnace cylinder 791 and hot air heated therein are separated from each other by a separator (not shown) to supply only the hot steam to a catalyst unit 793 thereby to obtain hydrogen. The separated hot air is discharged through a heat exchanger 794, and the hydrogen produced in the catalyst unit 793 is supplied to the burner 792 through a hydrogen tank 795.

Figure 36:
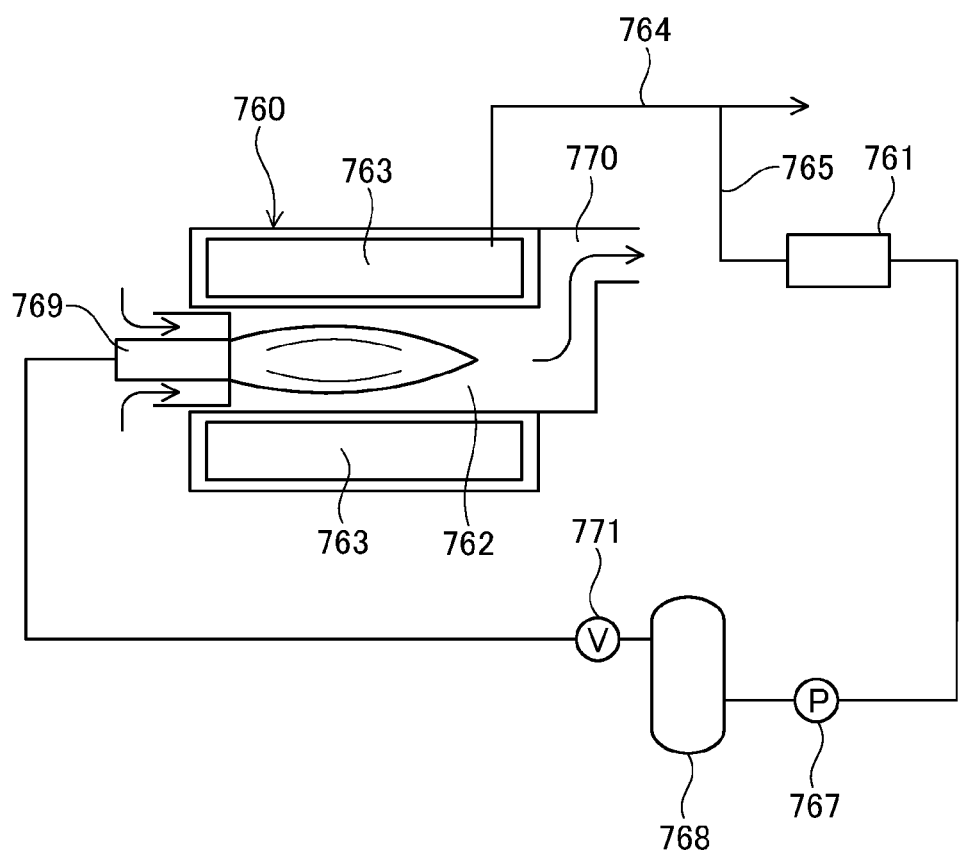
FIG. 36 shows a systematic view of a steam boiler which is provided with a catalyst unit.

FIG. 36 shows a hydrogen burner system in which a catalyst unit 761 is adapted to a steam boiler 760. A plurality of water pipes 763 are disposed along the circumferential portion of a furnace cylinder 762, and steam at a temperature of 300° C. to 600° C. can be taken out of the water pipes 763 through a steam pipe 764 from which a branch pipe 765 is separated to be connected with the catalyst unit 761 for producing hydrogen which is once stored in a hydrogen cylinder 768 through a pump 767 and then supplied to the hydrogen burner 769 via a valve 771. The gas produced in the furnace cylinder 762 is discharged outward from an outlet 770.

Figure 37:
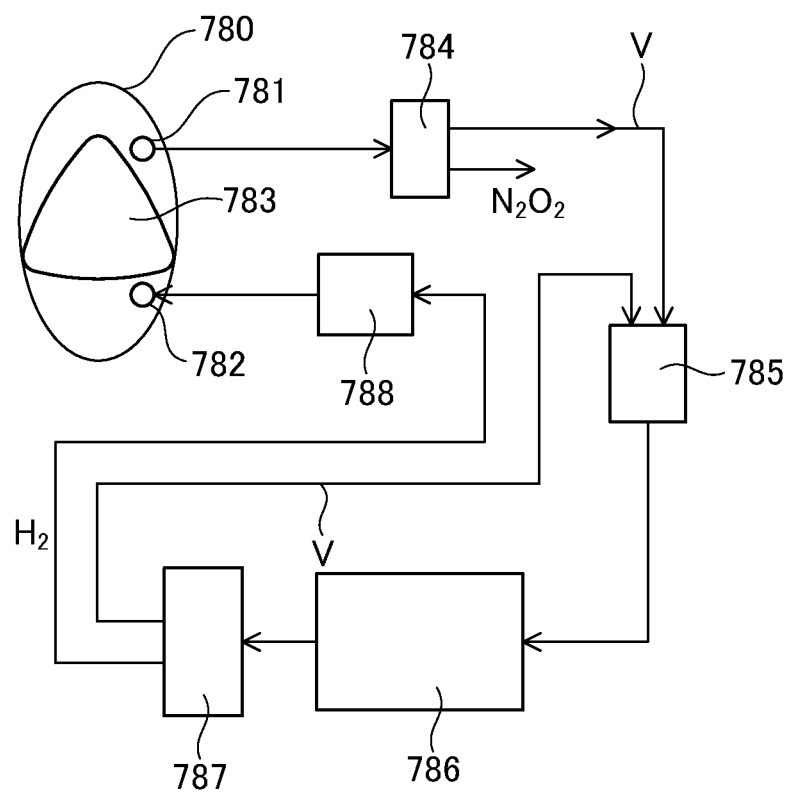
FIG. 37 shows a systematic view of a hydrogen engine which is provided with a catalyst unit.

FIG. 37 shows a hydrogen engine system in which a hydrogen generating apparatus is adapted to a car engine 780. The hydrogen engine 780 can be adapted to cars, power generation machines, airplanes and so forth. A rotary engine 780 has a suction hole 782 and an exhaust hole 781, and hydrogen sucked through the suction hole 782 is exhausted from the exhaust hole 781. This exhaust gas comprises hot steam, nitrogen and oxygen and, thereafter, the hot steam (V) is separated from the nitrogen ($N_2$) and the oxygen ($O_2$) by a filter 784 of palladium alloy. The hot steam is heated at a temperature above 300° C. through a heating device 785. Thereafter, hydrogen gas is collected through a catalyst unit 786, and, if necessary, the remaining steam is eliminated by a separator 787. The remaining steam is returned to the heating device 785 and then to the catalyst unit 786. The hydrogen from the separator 787 is supplied to the engine 780 through a pump 788. Generally, the exhaust gas from the hydrogen engine has a temperature of 400° C. to 500° C. and, therefore, the heating device 785 is not necessary if heat insulation for the system is good.

Figure 38:
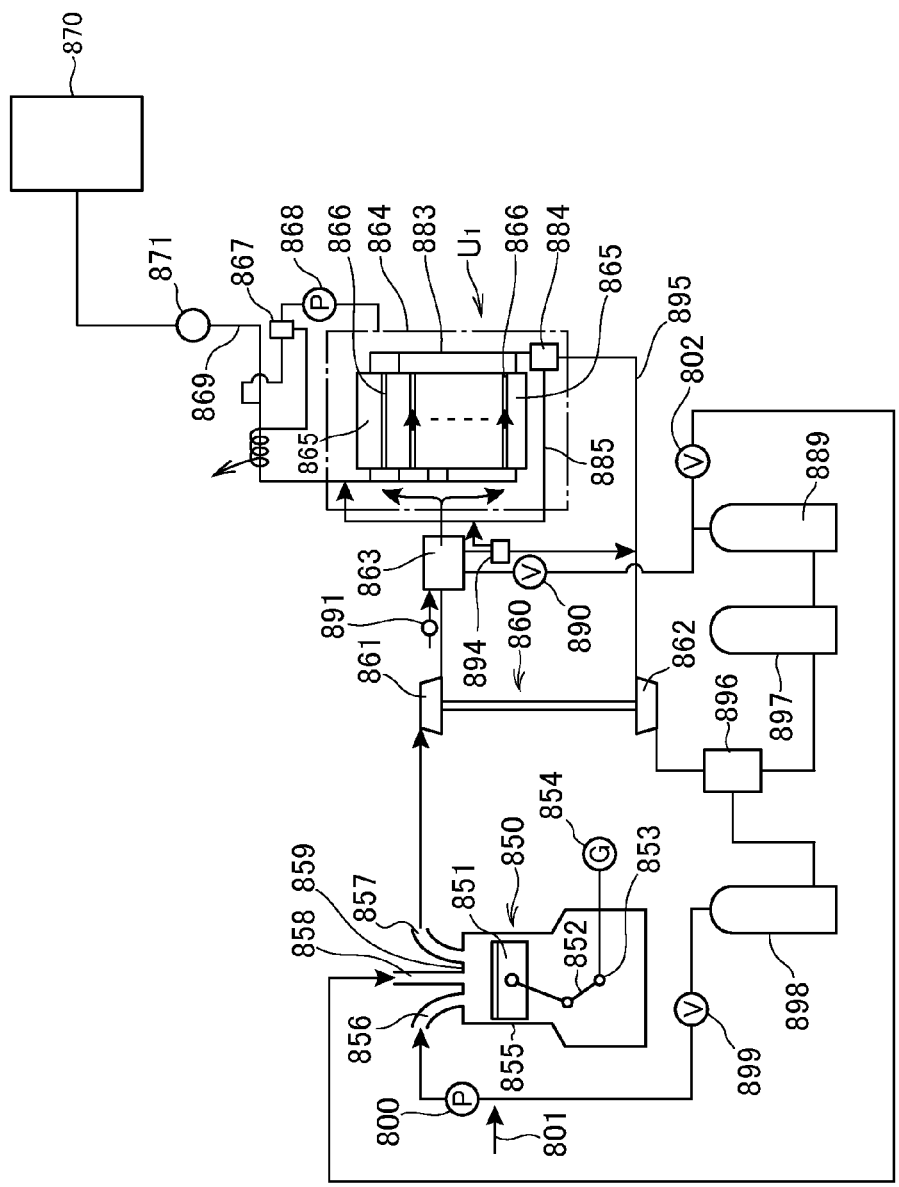
FIG. 38 shows a systematic view of a hydrogen engine which is provided with the catalyst unit $U_1$ shown in FIG. 15.

In FIG. 38, a hydrogen engine 850 has a piston 851 to rotate a rotary axis 853 through a crunk bar 852. The rotary axis 853 is connected to a power generation machine 854 which is used for the ignition of the engine 850. A cylinder 855 has, on its upper surface, a suction hole 856, exhaust hole 857, a hydrogen ejecting valve 858 disposed therebetween and an ignition plug 859. An exhaust turbine 861 for an exhaust turbo supercharger 860 drives a compressor 862 disposed on its opposite side. The exhaust gas (steam and air) having come out of the exhaust turbine 861 is heated by an auxiliary heating vessel 863 thereafter to enter the catalyst unit $U_1$ (FIG. 14). The auxiliary heating vessel 863 is used in the case that the temperature of the exhaust gas is not high enough to heat the catalyst unit $U_1$. The catalyst unit $U_1$ has a sealed casing 864 in which a lot of catalyst cells 865 are piled up, and a plurality of flowing paths are horizontally formed between the adjacent two catalyst cells 865 through which hot exhaust gas flows to heat the catalyst cells 865. The exhaust gas having heated the catalyst cells 865 in the sealed casing 864 is compressed by a compressor 868 to be divided into steam and air by a separator 867, and the separated steam is supplied to a water supply pipe 869 which supplies water to the catalyst cells 865. The water supply pipe 869 has a flow meter 871, and the separated air in the separator 867 passes around the water supply pipe 869 to heat the water flowing in the pipe 869. On the contrary, the exhaust gas collected in the catalyst cells 865 is divided into hydrogen and steam by a separator 884, and the separated hydrogen is supplied to the compressor 862 of the supercharger 860 through a line 895 while the separated steam is supplied to the water supply pipe 869 through a steam line 885.

Figure 40:
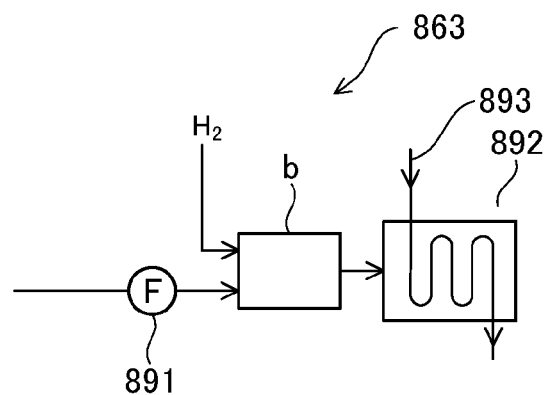
FIG. 40 shows a structural view of an auxiliary heating device in the system shown in FIG. 38.

The auxiliary heating vessel 863 has, as shown in FIG. 40, a hydrogen burner b to which the hydrogen from a hydrogen cylinder 889 mentioned after through a closing valve 890 and air is supplied through a fan 891. The combustion gas (steam and air) in the burner b is fed into a heat exchanger 892 for heating the exhaust gas from the hydrogen engine 850 to heat the exhaust gas in an exhaust pipe 893. The exhaust gas is supplied into the sealed casing 864 to heat the catalyst cells 865. The combustion gas in the exhaust pipe 893 is divided into steam, nitrogen and oxygen by a separator 894, and the separated steam is supplied to the steam line 885 to flow into the catalyst cells 865. The nitrogen is thrown away.

The oxygen separated in the separator 894 flows into the hydrogen line 895 then to be supplied to the compressor 862 of the supercharger 860 together with the hydrogen, and the mixed gas compressed by the compressor 862 is divided into the hydrogen and the oxygen. The separated hydrogen is supplied to the hydrogen cylinder 889 via an accumulator 897, and the hydrogen in the hydrogen cylinder 889 is supplied to both of the hydrogen burner b in the auxiliary heating vessel 863 and a hydrogen ejecting valve 858 via a closing valve 802. In the meantime, the separated oxygen is fed into an oxygen tank 898 and, then, atmospheric air is sucked through a pump 800 and a pipe 801. In this manner, the supply of oxygen to the suction hole 856 can decrease the amount of air put into the suction hole 856 thereby to reduce the amount of $NO_X$ discharged from the hydrogen engine (FIG. 38).

In the hydrogen engine system shown in FIG. 38, the separator 896 separates the hydrogen supplied from the catalyst unit $U_1$ from the oxygen supplied from the auxiliary heating vessel 863, and, however, the mixture of hydrogen and oxygen itself can be used.

Figure 39:
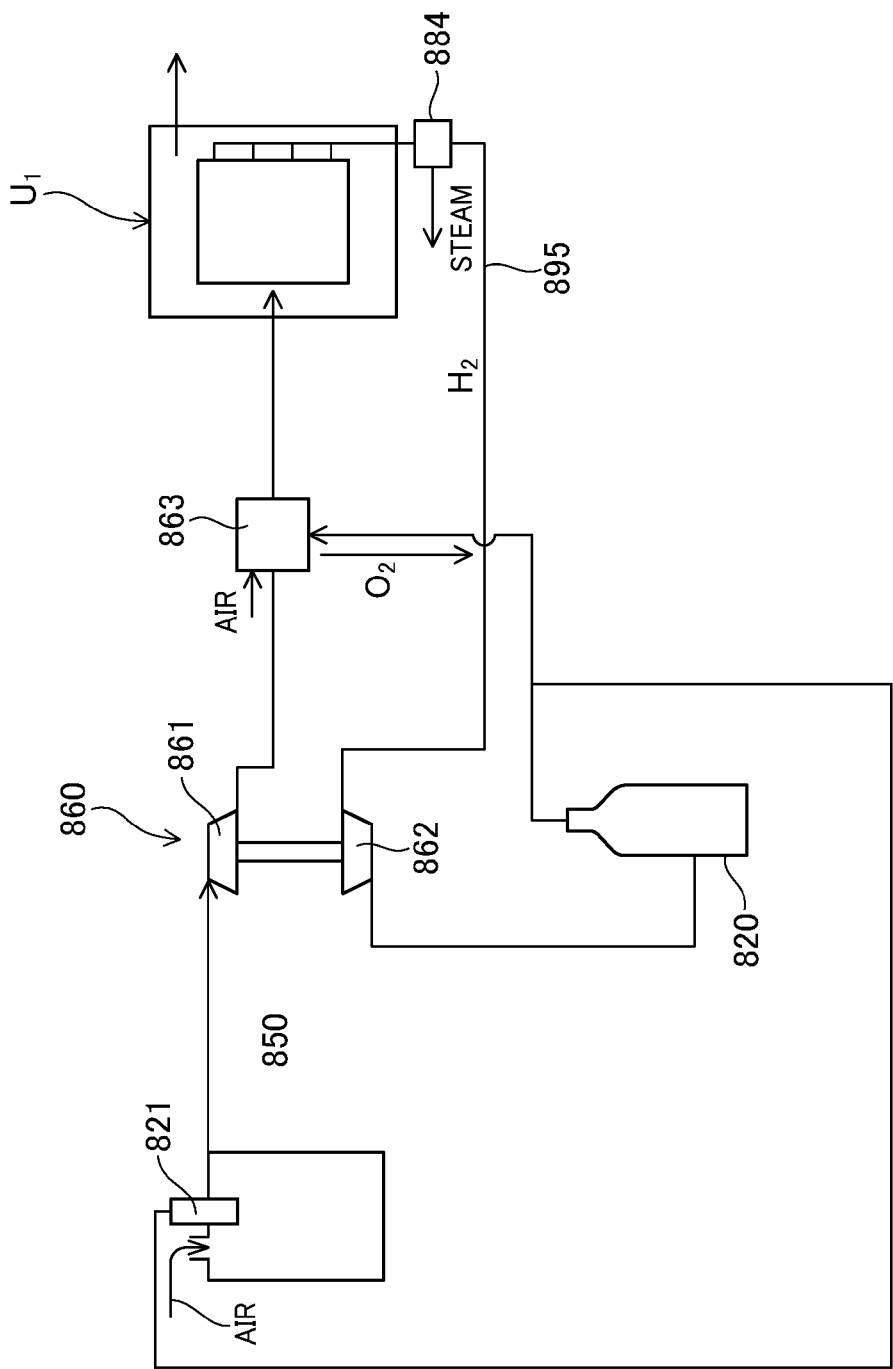
FIG. 39 shows a systematic view of another embodiment of the system shown in FIG. 38.

That is, the system is provided, as shown in FIG. 39, with a mixture gas cylinder 820, and the mixture gas may be supplied to the auxiliary heating vessel 863 and a mixture gas ejecting valve 821.

Figure 41:
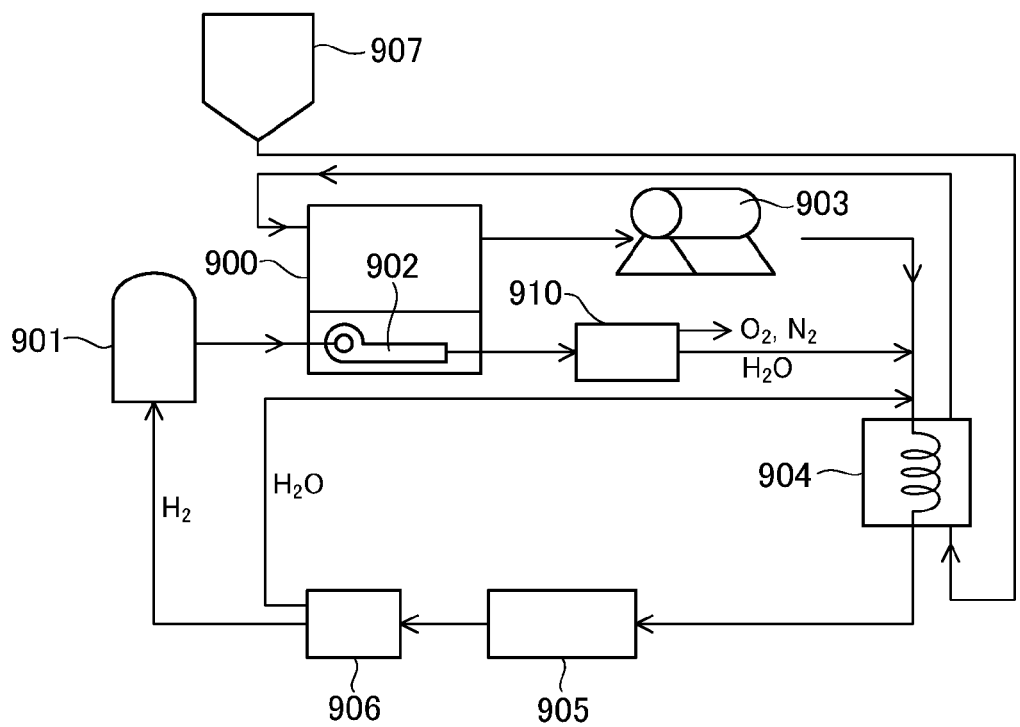
FIG. 41 shows a systematic view of thermal power generation in which a hydrogen generating apparatus is assembled.

FIG. 41 shows a power generation system in which a catalyst unit is assembled in a conventional heat power generation system. The system has a boiler 900 to which the water from a water tank 907 is supplied via a heat exchanger 904 and which has a hydrogen burner 902. This boiler 900 can produce steam at a temperature of 1000° C. to 1500° C. which is supplied to a power generator 903 to rotate its rotor and which exchanges heat with the water supplied from a water tank 907 through a heat exchanger 904, so that its temperature goes down at a temperature of 300° C. to 600° C. while the water heated by the heat exchanger 904 is supplied to the boiler 900.

The steam cooled down is supplied to the catalyst unit 905 to produce hydrogen which is separated from the remaining steam by a separator 906, and the separated hydrogen is supplied to the hydrogen tank 901 while the remaining steam is returned to the heat exchanger 904 to increase its temperature and thereafter to be supplied again to the catalyst unit 905. The exhaust gas from the hydrogen burner 902 is divided into hot steam and hot air ($O_2$ and $N_2$) by a separator 910, and the hot steam is mixed with the steam from the power generator 903 to be supplied to the heat exchanger 904 while the hot air divided by the separator 910 is used for, e.g., an air conditioner.

Figure 42:
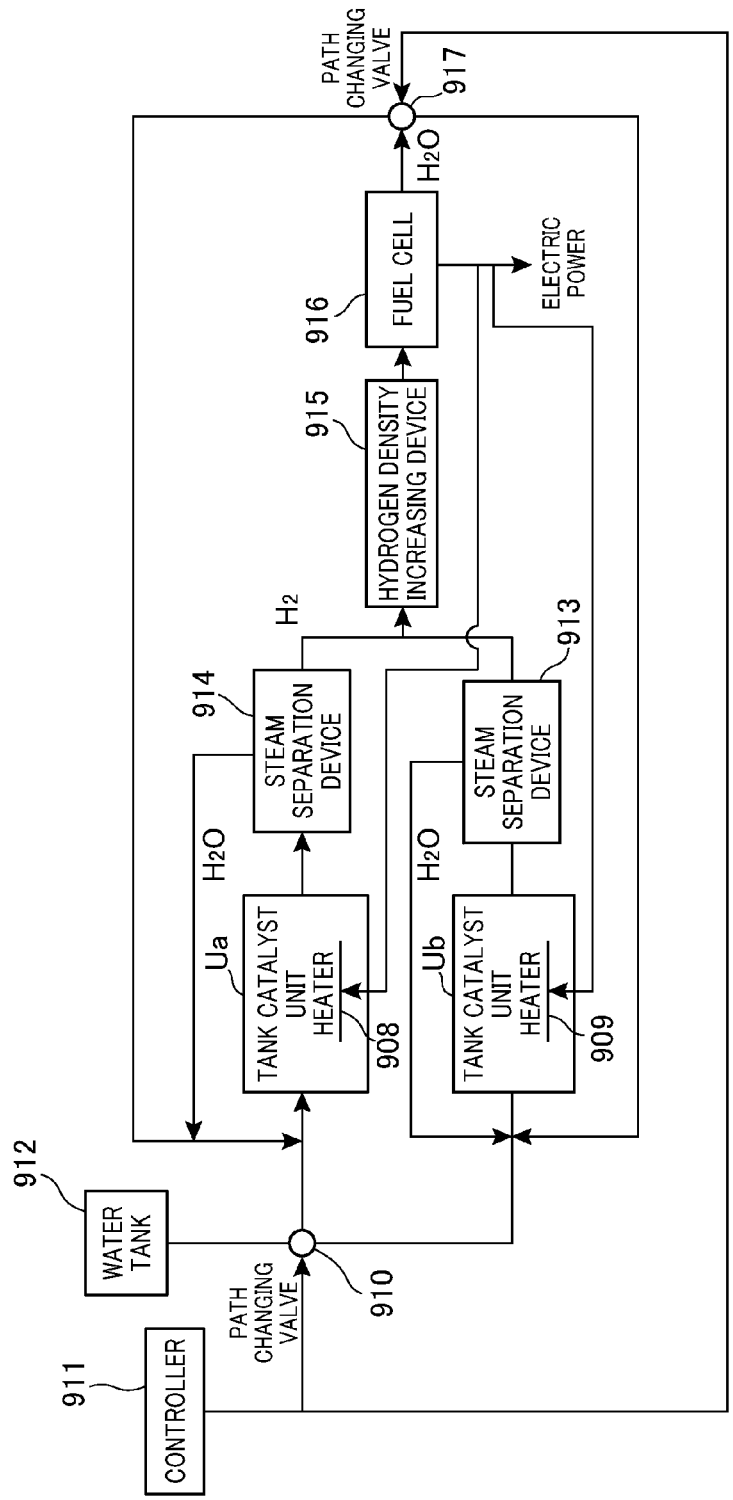
FIG. 42 shows a systematic view of a fuel cell which is combined with a catalyst unit.

Next, a power generation system in which a catalyst unit is combined with a fuel cell will now be explained. In FIG. 42, the system has two catalyst units $U_a$ and $U_b$ which are alternately operated in accordance with the path changing action of a path changing value 910 which is changed, e.g., every five minutes by a controller 911 to change the flow of water from a water tank 912. This intermittent water supply can extend the life span of the catalyst.

The catalyst units $U_a$ and $U_b$ have steam separation devices 913 and 914, respectively, for separating hydrogen from steam which is returned to each catalyst unit to produce hydrogen again in each catalyst unit, and the separated hydrogen is supplied to a fuel cell 916 through a hydrogen density increasing device 915 for increasing the density of hydrogen. The fuel cell 916 produces steam by the combination of hydrogen and oxygen, and this steam is supplied to the catalyst units $U_a$ and $U_b$ through a path changing valve 917 for changing the flow of the steam.

A part of electricity obtained by the fuel cell 916 is supplied to the heaters 908 and 909 of the catalyst units $U_a$ and $U_b$, respectively.

Figure 43:
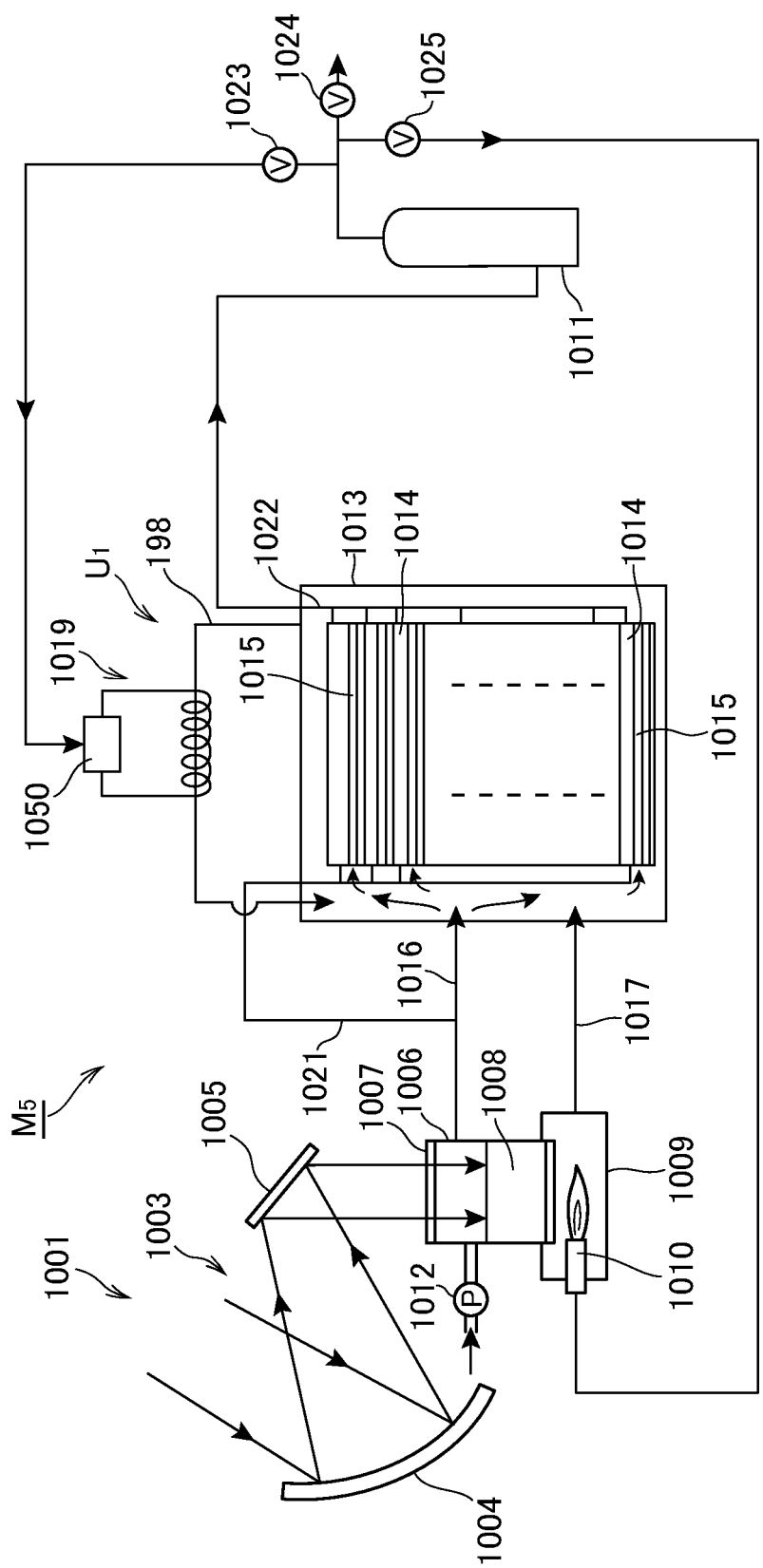
FIG. 43 shows a systematic view of a fifth hydrogen generating apparatus $M_5$ which is one of other embodiments.

FIG. 43 shows one of other embodiments according to this invention. A hydrogen generation apparatus $M_5$ has a steam production device 1001 for producing superheated steam at a temperature of 120° C. to 150° C. and the catalyst unit $U_1$ mentioned above (FIGS. 14 and 15) for producing hydrogen from the superheated steam. The steam production device $U_1$ is provided with a light concentration device 1003 for concentrating sunlight, which has a concave mirror 1004 for concentrating sunlight and a reflecting mirror 1005 for receiving sunlight from the mirror 1005 and directing the sunlight toward a water surface in a water tank 1006 which has a transparent plate 1007 of glass at its upper surface. Thus, the water in the tank 1006 is heated by the sunlight. The water tank 1006 is mounted on a furnace cylinder 1009 having a hydrogen burner 1010 to which hydrogen is supplied. The hydrogen produced in the catalyst unit $U_1$ is stored in a hydrogen cylinder 1011 to supply the hydrogen to the hydrogen burner 1010. The water tank 1006 is equipped with a pump 1012 for supplying a predetermined amount of water thereto.

The catalyst unit $U_1$ is accommodated in a sealed casing 1013 and has a plurality of catalyst cells 1014 therein each of which has a plurality of pipes 1015 for making hot gas pass therethrough, and the hot gas comprises a part of steam supplied from the water tank 1006 through a line 1016 and mixture gas of steam and hot air supplied from the hydrogen burner 1009 through a line 1017.

The hot gas heats the catalyst cells 1014 and thereafter returns to the inlet side of the sealed casing 1013 through a return line 1018 which has a heat exchanger 1019 comprising a burner 1020 in which hydrogen supplied from the hydrogen cylinder 1011 is burned to produce hot gas which is supplied along the return pipe 1018 to control the temperature of the hot gas in the return line 1018. The superheated steam produced in the water tank 1006 is supplied into each catalyst cell 1014 through a steam line 1021 to produce hydrogen which flows into the hydrogen cylinder 1011 through an outlet pipe 1022 to be stored therein. The stored hydrogen therein is supplied to the heat exchanger 1019, hydrogen driven machines (not shown) and the burner 1009 in accordance with the operation of the valves 1023, 1024 and 1025, respectively.

The light concentrating device 1001 and the burner 1010 may be selectively used. That is, only the burner 1010 is operated at night time or during cloudy days, and only the light concentrating device 1001 can be used during fine days. Further, both devices can be used during fine days.

Figure 44:
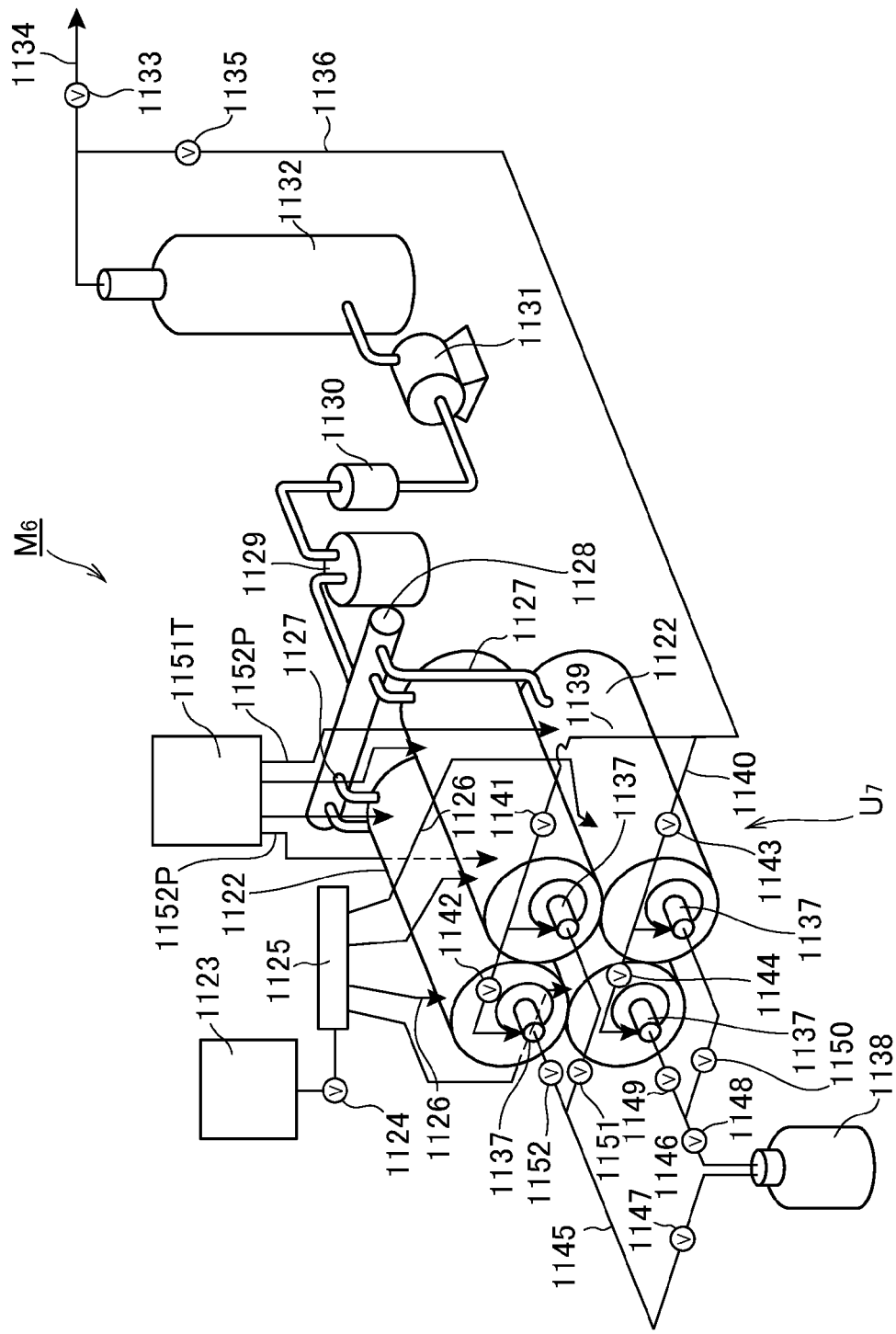
FIG. 44 shows a systematic view of a sixth hydrogen generating apparatus $M_6$ which is one of other embodiments.

Next, FIG. 44 shows one of other embodiments according to this invention.

In FIG. 44, a hydrogen generating apparatus $M_6$ has a catalyst unit $U_7$ which is equipped with four cylindrical catalyst cells 1122. Two cells 1122 are disposed at its lower portion and the remaining two cells 1122 are disposed at its upper portion. The unit $U_7$ has a water tank 1123 from which water is supplied to a distribution pipe 1125 through a valve 1124, and a predetermined amount of water is supplied into the front portion of each catalyst cell 1122 through a water pipe 1126. At the rear end portion of each cell 1122 is disposed a hydrogen pipe 1127 which is connected with a collective hydrogen pipe 1128 which is further connected with a steam elimination tank 1129 having water therein for catching steam and a lot of fine particles of catalyst flowing out of the cells 1122. The fine particles are eliminated by a filter 1130 also, and hydrogen gas having passed through the filter 1130 is stored in a hydrogen tank 1132 at a predetermined pressure through a compressor 1131. The hydrogen in the hydrogen tank 1132 is supplied to a boiler or a hydrogen engine through a pipe line 1134 having a valve 1133 and to a burner 1137 disposed at the front end surface of each cell 1122 through a pipe line 1136 having a valve 1135. Each burner receives propane gas from a propane cylinder 1138 to mix it with the hydrogen. The pipe line 1136 is divided into two branch pipes 1139 and 1140, and the branch pipe 1139 has two valves 1141 and 1142 while the branch pipe 1140 has two valves 1143 and 1144. A pipe line 1145 for propane gas has three valves 1147, 1151 and 1152 while a pipe line 1146 for propane gas has three valves 1148, 1149 and 1150.

Since the fine particles are partially discharged from each cell 1122, the apparatus $M_6$ has a catalyst tank 1151T for supplementing the catalyst in each cell 1122, and the catalyst tank 1151T supplies gradually the catalyst to each cell through a pipe 1152P.

Figure 45:
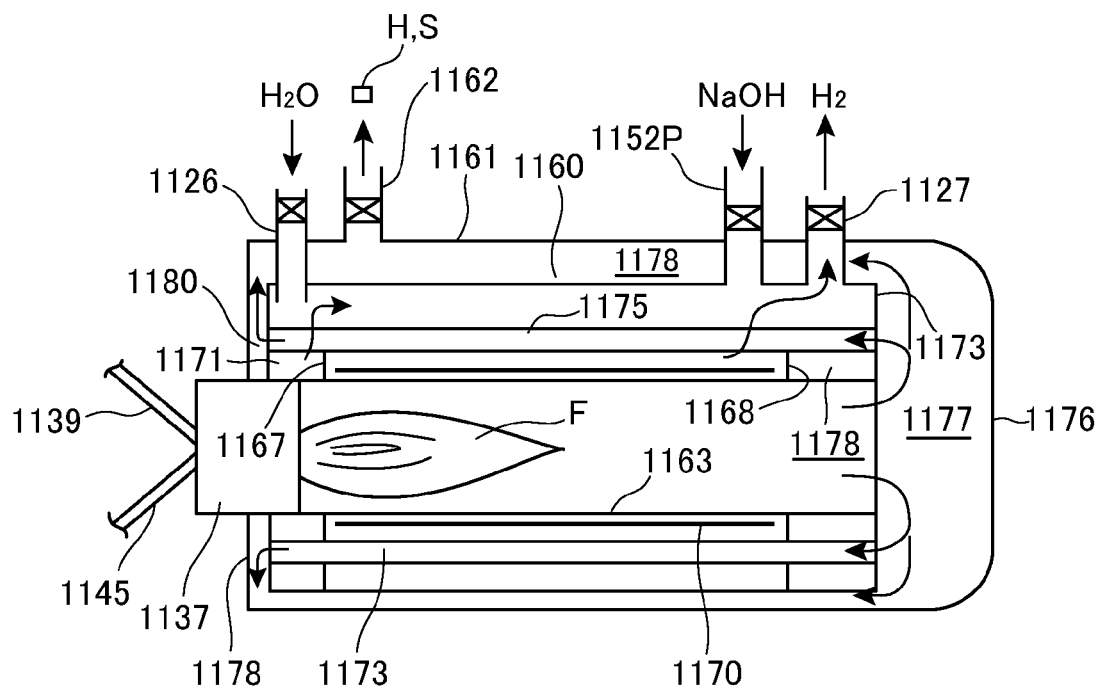
FIG. 45 shows a schematic structural view of a lateral type of a catalyst cell disposed in the sixth hydrogen generating apparatus $M_6$ shown in FIG. 44.
Figure 46:
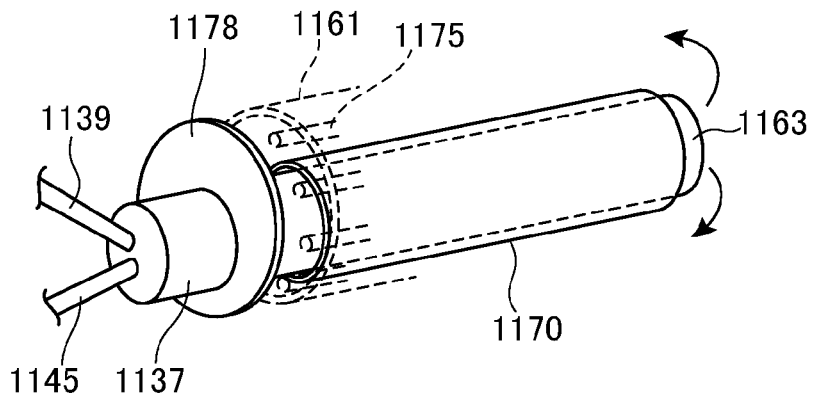
FIG. 46 shows a broken perspective view of the catalyst cell shown in FIG. 45.

Each catalyst cell 1122 has, as shown in FIGS. 45 and 46, an inner cylinder 1160 and an outer cylinder 1161 for receiving the inner catalyst cylinder therein, and hot air flows between the inner and outer cylinders 1160 and 1161 to flow out of a discharging pipe 1162. The water pipe 1126 is extended upward from the upper portion of the front end of the inner cylinder 1160 while the hydrogen pipe 1127 is extended upward from the upper portion of the rear end of the inner cylinder 1160, and the pipe 1152P connected to the catalyst tank 1151T is disposed near the hydrogen pipe 1127.

The inner cylinder 1160 has a furnace cylinder 1163 disposed slightly eccentrically in a downward direction, and the burner 1137 is engaged with the front end surface of the furnace cylinder 1163. One of the branch pipes 1139 and 1140 is connected to the burner 1137 together with one of the propane pipes 1145 and 1146 so that the mixture gas of hydrogen and propane is supplied to the burner 1137. However, oil can be used instead of propane. Generally, when the inner cylinder 1160 is heated at 500° C. at the time of start of operation, the mixture gas is used, and only hydrogen gas is used after the catalyst cylinder is heated at a predetermined temperature. The front and rear end portions of the inner cylinder 1160 are partitioned by walls 1167 and 1168 to form a catalyst room 1169 between the two walls 1167 and 1168, and a cylindrical body 1170 of SUS304 as a metal element supply body is disposed around the circumferential surface of the furnace cylinder 1163. A steam room 1171 is formed between the front portion wall 1167 and the front end wall 1174, and the produced steam here flows into the catalyst room 1169 while passing over the upper side of the partition wall 1167. A hydrogen room 1172 is formed between the rear portion wall 1168 and the rear end wall 1173 of the inner cylinder 1160, and the hydrogen produced in the catalyst room 1169 passes over the upper side of the rear portion wall 1168 and through the upper portion of the hydrogen room 1172 to enter the hydrogen pipe 1127. A plurality of hot air pipes 1175 for making hot air pass therethrough are horizontally formed in a hollow circular space in section partitioned by the outer circumferential wall of the inner cylinder, the circumferential wall of the furnace cylinder 1163 and the front and rear end walls 1174 and 1173, and a part of the hot air pipes 1175 are disposed in the fine particles of the catalyst to cope with endothermic reaction. The hot air produced by the burner 1137 flows toward the rear end wall 1176 of the outer cylinder 1161 and passes through a hot air room 1177 between the two rear end walls 1173 and 1176 to enter the hot air pipes 1175 and hot air path 1178 between the inner and outer cylinders 1160 and 1161. Then, it comes out of the front end wall 1174 to enter a room 1180 between the two front end walls 1174 and 1178, and is discharged from the discharging pipe 1162. A hydrogen sensor H.S may be disposed at a certain position of the discharging pipe 1162 to detect hydrogen in the discharged hot air. The burner 1164 stops burning when the sensor H.S detects the leak of hydrogen.

A vertical type of hydrogen generating apparatus $M_7$ as one of other embodiments will be explained.

Figure 47:
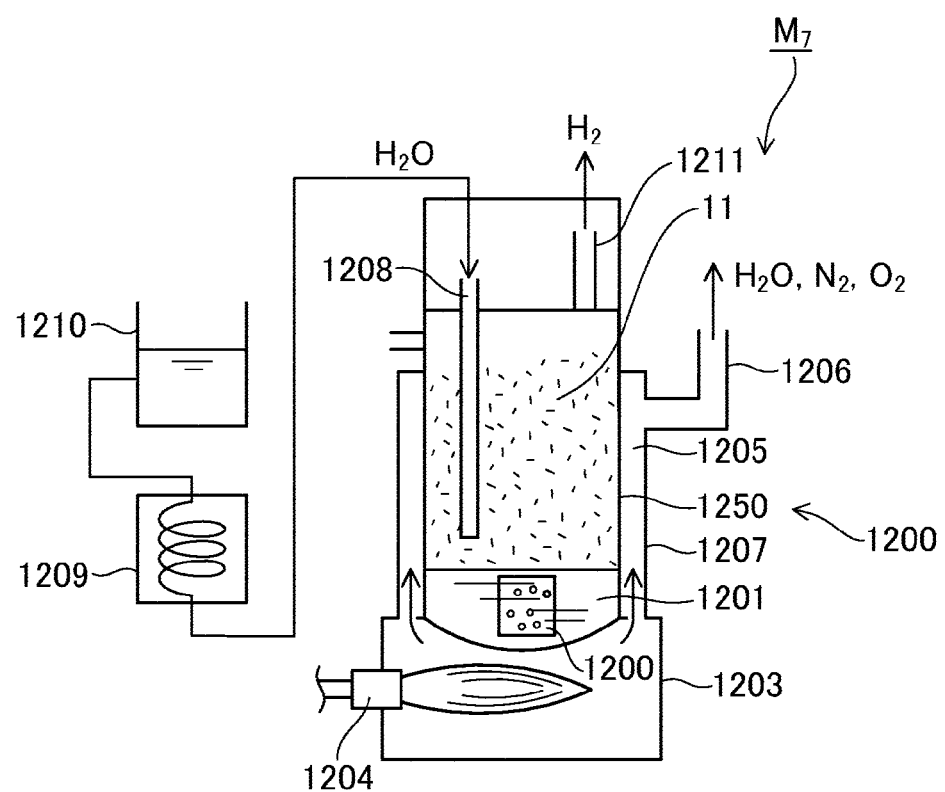
FIG. 47 shows a schematic structural view of a seventh hydrogen generating apparatus $M_7$ having a vertical type of catalyst cell which is one of other embodiments.

FIG. 47 shows a basic structure of a vertical type of catalyst cell 1200 which has a catalyst cylinder 1250 functioning as a catalyst room in which molten salt 1201 is accommodated. A metal element supply body 1202 of SUS304 or SUS316L (18% Cr-12%Ni-2.5%Mo-Low%C-remains Fe) is put into the molten salt 1201. The body 1202 is in the shape of cylinder having a lot of holes. The catalyst cell 1200 is mounted on a furnace cylinder 1203 having a burner 1204 for producing hot air which passes through a hot air space 1205 formed between the catalyst cylinder 1250 and a cylindrical outer cylinder 1207 to be discharged from a discharging body 1206.

A reaction space is formed above the molten salt in the catalyst cylinder 1250 and is full of a fine particle group 11 to which steam is supplied through a steam pipe 1208 connected to a heat exchanger 1209 for producing steam, and water is supplied to the heat exchanger 1209 from a water tank 1210. Hydrogen produced in the reaction space is discharged from a hydrogen pipe 1211 fixed to the upper wall of the catalyst cylinder 1250.

The concrete structure of the hydrogen generating apparatus $M_7$ will be further explained.

Figure 48:
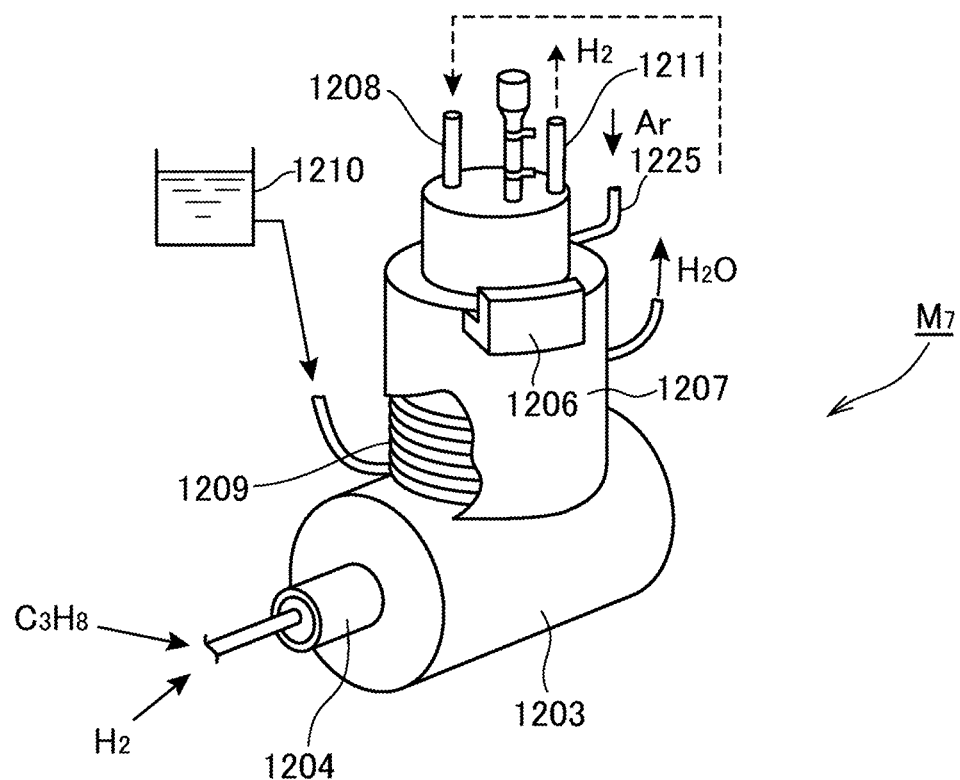
FIG. 48 shows a partially broken perspective view of the vertical type of catalyst cell shown in FIG. 47.
Figure 49:
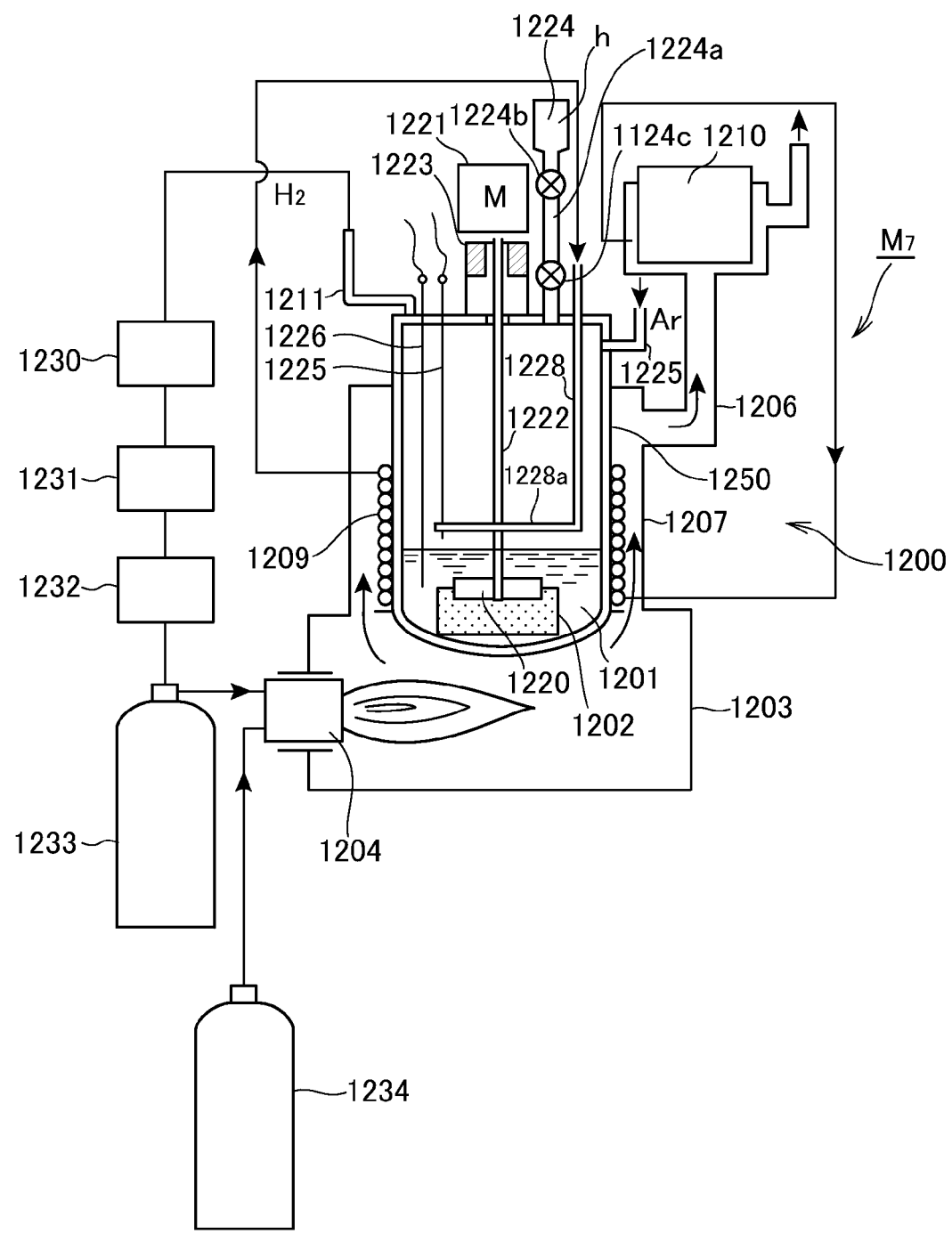
FIG. 49 shows a concrete structural view of a seventh hydrogen generating apparatus $M_7$ which is provided with the vertical type of catalyst cell.

In FIGS. 48 and 49, the catalyst cylinder 1250 has a stirring blade 1220 at its bottom portion for stirring the molten salt 1201, and the stirring blade 1220 is rotated by a motor 1221 mounted on the upper wall of the catalyst cylinder 1250. The rotation of the motor 1221 is transmitted to the blade 1220 through an axis 1222, the upper portion of which is sealed by a sealing member 1223 at a position separated upward from the upper wall of the catalyst cylinder. The reason why the sealing member 1223 is positioned above the upper wall of the catalyst cylinder is that the sealing member 1223 must be disposed at a position where it is not heated.

The upper wall is provided with a catalyst supplementing device 1224 for making up for the molten salt 1201, and the device 1224 has a hopper h, a supplementing cylinder 1224a for supporting the hopper h. The supplementing cylinder 1224a is provided with two upper and lower valves 1224b and 1224c disposed at an interval. When the catalyst is supplied, the upper valve 1224b is first opened to drop a predetermined amount of catalyst into a space between the two valves 1224b and 1224c, and, then, the lower valve 1224c is opened after the upper valve 1224b is closed to drop the catalyst into the catalyst cylinder 1250. If argon gas is supplied into the catalyst cylinder 1250 before the catalyst supply operation, atmospheric air is effectively prevented from flowing into the catalyst cylinder 1250.

Figure 50:
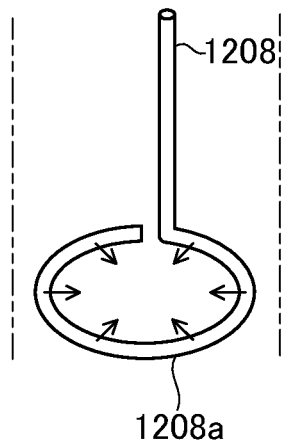
FIG. 50 shows a perspective view of a steam pipe which is used in the vertical type of catalyst cell.

The discharging body 1206 is extended to a water tank 1210, and the exhaust air heats water therein to be discharged outward. The water in the water tank 1210 is supplied to a heat coil 1209 wound around the lower circumferential wall to produce steam which is supplied to the steam pipe 1208 which is provided, at its lower end, with a circular portion 1208a having a lot of ejecting openings so that steam is dispersed all over the whole area of the liquid surface of the catalyst (FIG. 50).

The upper wall of the catalyst cylinder 1250 supports two thermocouples 1225 and 1226, one of which is extended into the molten salt and the other of which is extended into the reaction space above the liquid surface of the molten salt thereby to detect the position of the liquid surface of the molten salt.

The hydrogen pipe 1211 has a steam elimination device 1230, a filter 1231 for eliminating the fine particles coming out of the catalyst cylinder 1250 together with the hydrogen, and a compressor 1232 for compressing hydrogen in this order. The hydrogen is stored in a hydrogen cylinder 1233, and the hydrogen gas in the cylinder 1233 and propane gas in a cylinder 1234 are supplied to the burner 1234 selectively or together.

The Vertical type of apparatus has the following features. Welding portions which are weak in strength can be disposed at a position far from the molten salt, and the reaction space full of fine particles can be sufficiently secured. In addition, an installation area for the apparatus is smaller than that for a lateral type of apparatus.

Next, another vertical type of hydrogen generating apparatus $M_8$ will be explained.

Figure 51:
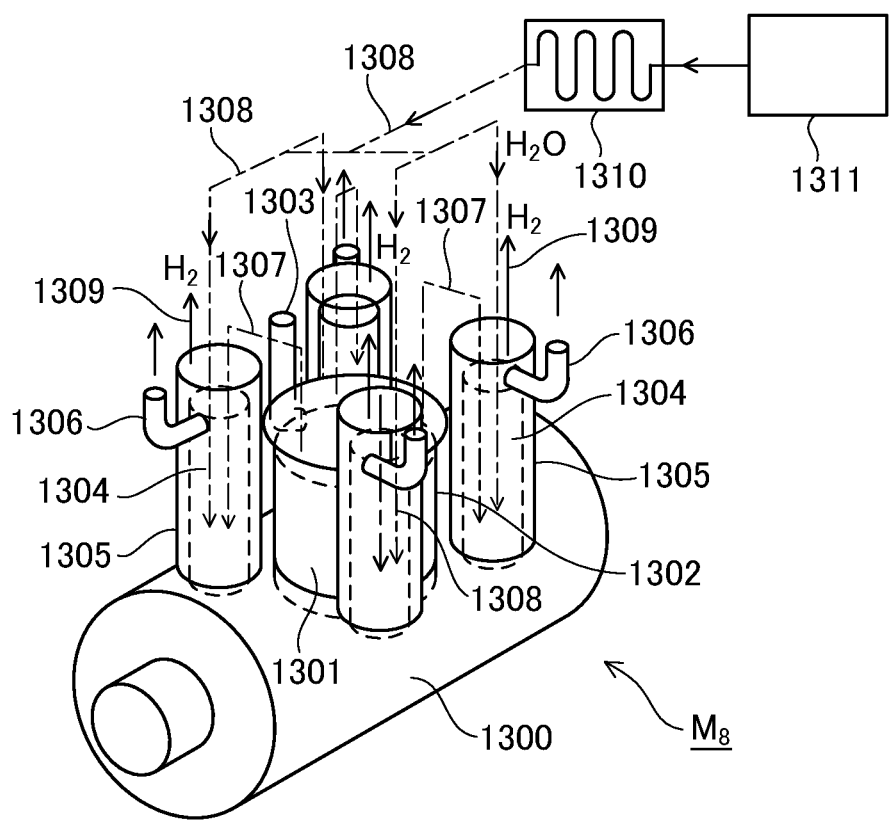
FIG. 51 shows a perspective view of an eighth hydrogen generating apparatus $M_8$ which is one of other embodiments.
Figure 52:
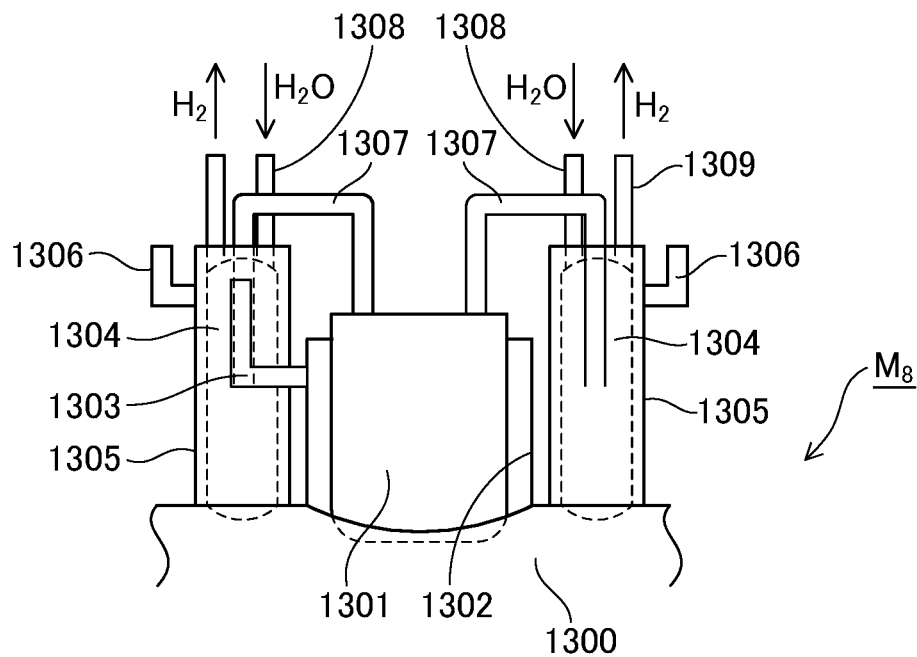
FIG. 52 shows an essential part explanatory view of the eighth hydrogen generating apparatus $M_8$ shown in FIG. 51.

In FIGS. 51 and 52, a fine particle generation cylinder 1301 is mounted on a furnace cylinder 1300 and has catalyst and metal element supply bodies therein. An outer cylinder 1302 is formed around the fine particle generation cylinder 1301 and has a hot air discharging pipe 1303 at its upper portion.

Four reaction cylinders 1304 each having a reaction space therein are installed around the cylinder 1301, and each cylinder 1304 has an outer cylinder 1305 for forming a hot air passing space. The outer cylinder is provided with a hot air discharging pipe 1306. The fine particles produced in the cylinder 1301 are supplied into each reaction cylinder 1304 thorough a supply pipe 1307, and steam is also supplied into each reaction cylinder 1304 to react on the fine particles thereby to produce hydrogen coming out of the hydrogen pipe 1309. The steam pipe 1308 has a heat exchanger 1310 for producing superheated steam at a temperature of 120° C. to 140° C., and water is supplied to the heat exchanger 1310 from a water tank 1311. The superheated steam is supplied intermittently to each reaction cylinder 1304 at the time when each reaction cylinder 1304 is filled with the fine particles. There must be a certain interval of time between one reaction in the reaction cylinder 1304 and next reaction therein because some seconds are needed until the reaction space is filled with the fine particles after one reaction. Accordingly, a plurality of reaction cylinders 1304 are necessary to produce successively hydrogen, and they are operated in order.

Figure 53:
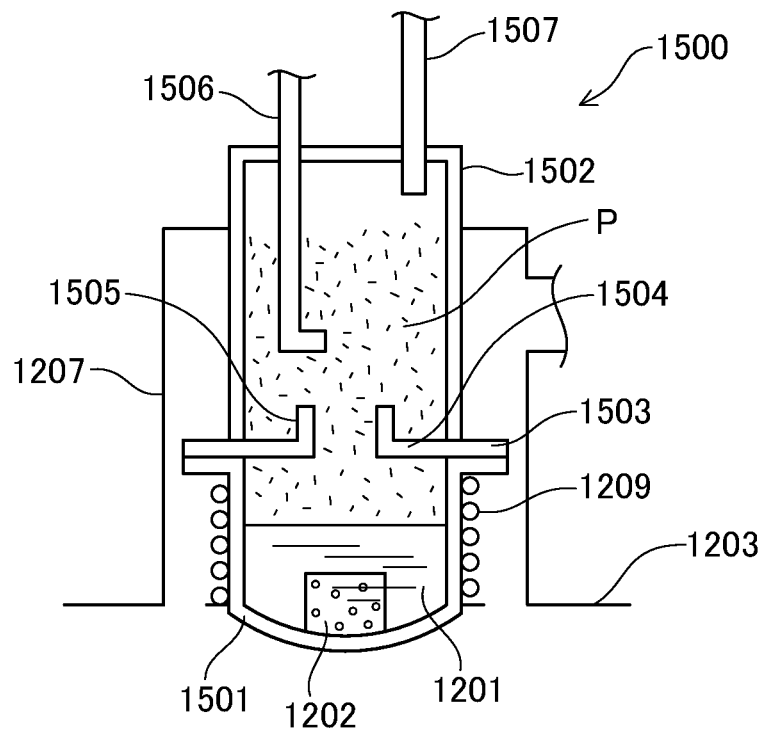
FIG. 53 shows an explanatory view of a vertical type of catalyst cell which is one of other embodiments.

FIG. 53 shows one of other embodiments of hydrogen generating apparatuses according to this invention.

In order to dispose a reaction space at a position separated from the liquid surface of the molten salt so as to avoid corrosion, a catalyst cylinder 1500 is divided into two parts one of which is a catalyst accommodating part (lower part) 1501 disposed at its lower part and the other of which is an upper reaction part (upper part) 1502 mounted on the lower part 1501. There is a flange portion 1503 between the lower and upper parts 1501 and 1502, and a partition plate 1504 is disposed at the lower surface of the upper part 1502. The partition plate 1504 has a passing hole 1505, at its center portion, for making fine particles P pass therethrough. A steam is supplied into the reaction space through a steam pipe 1506, and the hydrogen produced is discharged from a hydrogen pipe 1507.

Figure 54:
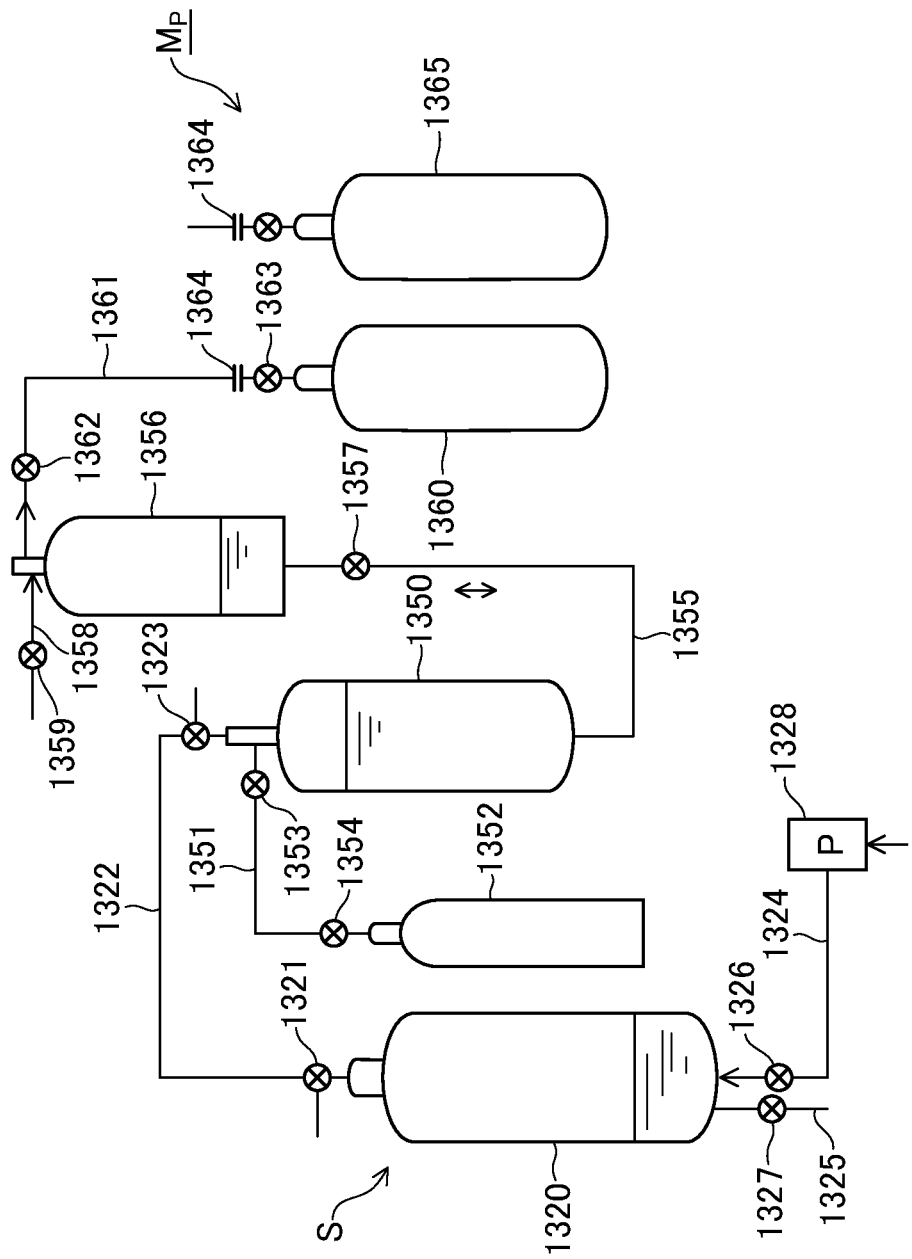
FIG. 54 shows a systematic view of a hydrogen compressing device for compressing and storing hydrogen.

A compressing device for compressing hydrogen, operated by hand will now be explained with reference to FIG. 54.

A compressing device MP has a water tank 1350 to store water for compressing hydrogen, and a nitrogen tank 1352 is connected to the water tank 1350 through a nitrogen pipe 1351. The nitrogen tank 1352 stores nitrogen at a pressure over ten atmospheric pressure. Other inactive gases may be used instead of nitrogen gas. The nitrogen pipe 1351 has two closing valves 1353 and 1354. A compressing tank 1356 is connected to the water tank 1350 through a water pipe 1355 which is disposed between the lower walls of the two tanks 1350 and 1356 and which has a flow rate adjusting valve 1357. The compressing tank 1356 is disposed at a higher position than the water tank 1350 so that the water in the compressing tank 1356 returns into the water tank 1350 when the pressure in the water tank 1350 is released. The compressing tank 1356 receives the hydrogen produced in a catalyst unit through a gas pipe 1358 having a closing valve 1359. The compressing tank 1356 is connected to a first gas cylinder 1360 for storing the hydrogen through a gas pipe 1361 having a closing valve 1362 while the gas cylinder 1360 has a closing valve 1363, and a detachable connecting member 1364 is disposed at the end of the gas pipe 1361. A second gas cylinder 1365 is prepared. After a first certain amount of hydrogen is stored in the first gas cylinder 1360, the hydrogen is supplied into the second gas cylinder 1365 via the connecting member 1364.

Next, an auxiliary device S for saving nitrogen in the nitrogen cylinder 1352 will now be explained.

The device S has a large nitrogen tank 1320 with a sufficient volume, and its head is provided with a path changing valve 1321 which is connected to one end of a nitrogen line 1322 and a path changing valve 1323 is connected to the other end of the nitrogen line 1322. The operation of these valves 1321 and 1323 can connect the water tank 1350 to the nitrogen tank 1320 and can release nitrogen to the atmosphere. The nitrogen tank 1320 has, at its lower surface, a water line 1324 and a drain pipe 1325, and the water line 1324 has a check valve 1326 while the drain pipe 1325 has a closing valve 1327. The water line 1324 is provided with a manual pump 1328 to which city water is supplied. The water tank 1350, the compressing tank 1356 and nitrogen tank 1320 have pressure gauges and water level gauges (not shown), respectively, and the nitrogen tank 1352 and the gas cylinders 1360 and 1365 have pressure gauges, respectively.

The compressing device MP is operated in the following manner.

The produced hydrogen is first stored in the compressing tank 1356 through the gas pipe 1358 while the closing valve 1359 is opened. Further, the flow rate adjusting valve 1357 on the water pipe 1355 is opened corresponding to the amount of hydrogen gas supplied into the compressing tank 1356, so that the water in the compressing tank 1356 flows into the water tank 1350 under the influence of difference in height. At this time, the path changing valves 1321 and 1323 on the nitrogen pipe 1322 are communicated with each other so that nitrogen gas at the upper space of the water tank 1350 flows into the nitrogen tank 1320 through the nitrogen gas line 1322. When a predetermined amount of nitrogen gas flows into the compressing tank 1356, the closing valve 1359 on the gas pipe 1358 is closed. At this time, the closing valves 1362 and 1363 are closed. Thereafter, the closing valves 1353 and 1354 are opened while the closing valves 1321 and 1323 on the nitrogen gas line 1322 are closed so that the nitrogen gas in the nitrogen tank 1352 is supplied at a pressure of nine to ten atmospheric pressures, to the upper space of the water tank 1350 thereby to press its water surface downward. Thus, the water in the water tank 1350 is supplied into the compressing tank 1356 to compress the hydrogen gas in the compressing tank 1356 at a pressure of 9 to 10 atmospheric pressures, and, thereafter, the closing valves 1362 and 1363 are opened to supply the hydrogen gas into the gas cylinder 1360. Then, the path changing valves 1321 and 1323 on the nitrogen gas line 1322 are communicated with each other to release the pressure at the upper space of the water tank 1350 so that the water in the compressing tank 1356 is returned to the water tank 1350 through the flow rate adjusting valve 1357 on the water pipe 1355 because of the difference in height between two tanks 1350 and 1356 while the closing valve 1359 on the hydrogen gas pipe 1358 is opened to supply the hydrogen gas into the compressing tank 1356. When a predetermined amount of hydrogen gas has been stored in the compressing tank 1356, a high pressure of nitrogen in the nitrogen cylinder 1352 flows into the upper space of the water tank 1350 to push the water therein toward the compressing tank 1356 thereby to compress the hydrogen gas in the compressing tank 1356 at a pressure of nine to ten atmospheric pressure. Then, the hydrogen gas is supplied into the gas cylinder 1360. This cycle is repeated several times until the gas cylinder 1360 is compressed at a pressure of nine to ten atmospheric pressures. And the second gas cylinder 1365 is connected with the connecting member 1364 after the first gas cylinder 1360 is full of hydrogen and is once separated from the connecting member 1364. Nitrogen having flown out of the nitrogen tank 1352 is stored once in the nitrogen tank 1320, and, however, when the pressure of nitrogen gas at the upper space of the water tank 1350 has become higher than the pressure corresponding to the difference in height between two tanks 1350 and 1356, the path changing valve 1323 is so operated that the pressure of nitrogen gas at the upper space of the water tank 1350 is released to make the water in the compressing tank 1356 smoothly flow into the water tank 1350. Nitrogen gas stored in the nitrogen tank 1320 can be used to push the water in the water tank 1350 instead of that stored in the nitrogen tank 1352. That is, the path changing valve 1321 is so operated as to close the path, and the pump 1328 is driven to supply water into the nitrogen tank 1320 thereby to compress the nitrogen gas therein at a pressure of nine to ten atmospheric pressure. Thereafter, the nitrogen gas is supplied into the water tank 1350. When the nitrogen tank 1320 receives the nitrogen gas from the water tank after the compressing operation, the closing valve 1327 on the drain pipe 1325 is opened to discharge the water.

In this manner, if the water is used to compress the hydrogen produced in the catalyst unit, the hydrogen can be compressed safely without electricity.

Figure 55:
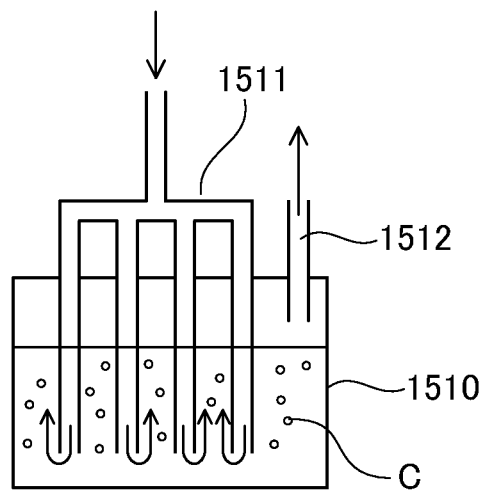
FIG. 55 shows an explanatory view of another method of supplying steam into catalyst.

In the above embodiments, the steam is supplied to the reaction space above the liquid surface of the molten salt. However, the lower end of a steam supply pipe 1511 may be dipped in molten salt C accommodated in a catalyst cell 1510 to supply steam into the molten salt C thereby to increase the amount of collective hydrogen through a hydrogen pipe 1512 as shown in FIG. 55.

Next, a kind of special catalyst accommodated in a catalyst cell will be explained.

Figure 56:
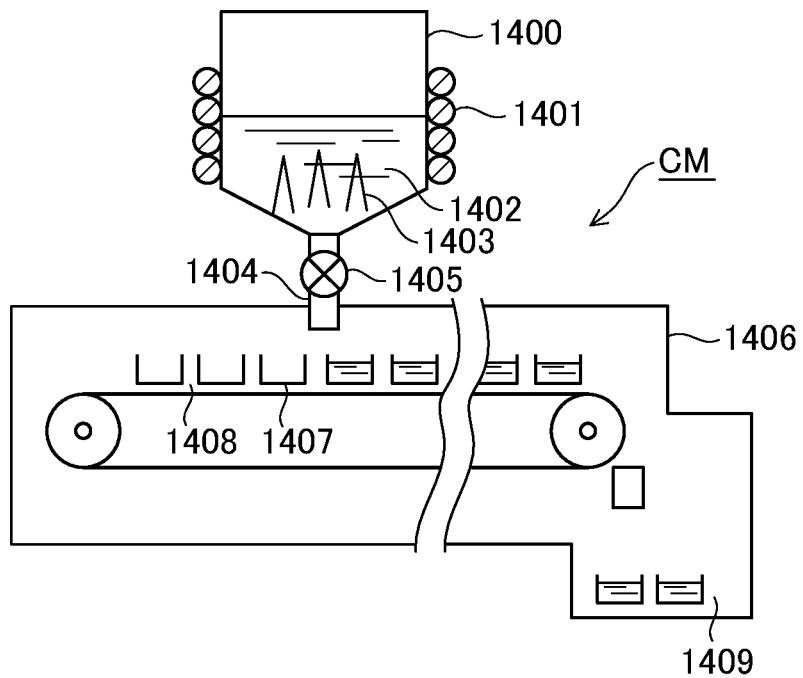
FIG. 56 shows a schematic structural view of a catalyst producing device.

In FIG. 56, a catalyst producing machine CM has a molten kiln 1400 which is heated at a temperature of 400° C. to 600° C. by an electric heater 1401 and in which sodium hydroxide (NaOH) as catalyst and a plurality of fins 1403 of SUS304 or SUS316L are accommodated. When the catalyst and fins 1403 are heated for a predetermined time, a valve 1405 on a catalyst supply pipe 1404 is opened to supply the heated catalyst into a plurality of cases 1407 on a conveyor 1408 driven in a sealed housing 1406. The liquid catalyst is cooled in each case 1407 to be changed into solid catalyst and each case 1407 with solid catalyst therein is stored at a storing area 1409. The sealed housing is full of inactive gas to avoid the oxidation of the catalyst.

Figure 57:
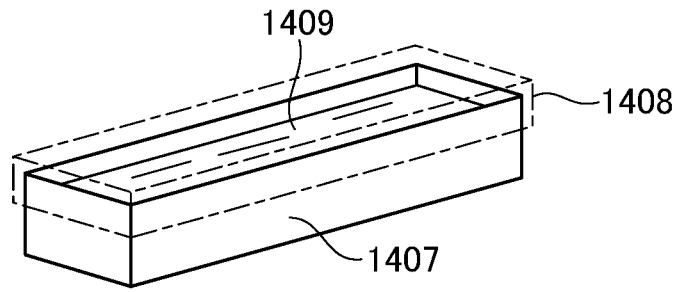
FIG. 57 shows a perspective view of a case for accommodating catalyst.
Figure 58:
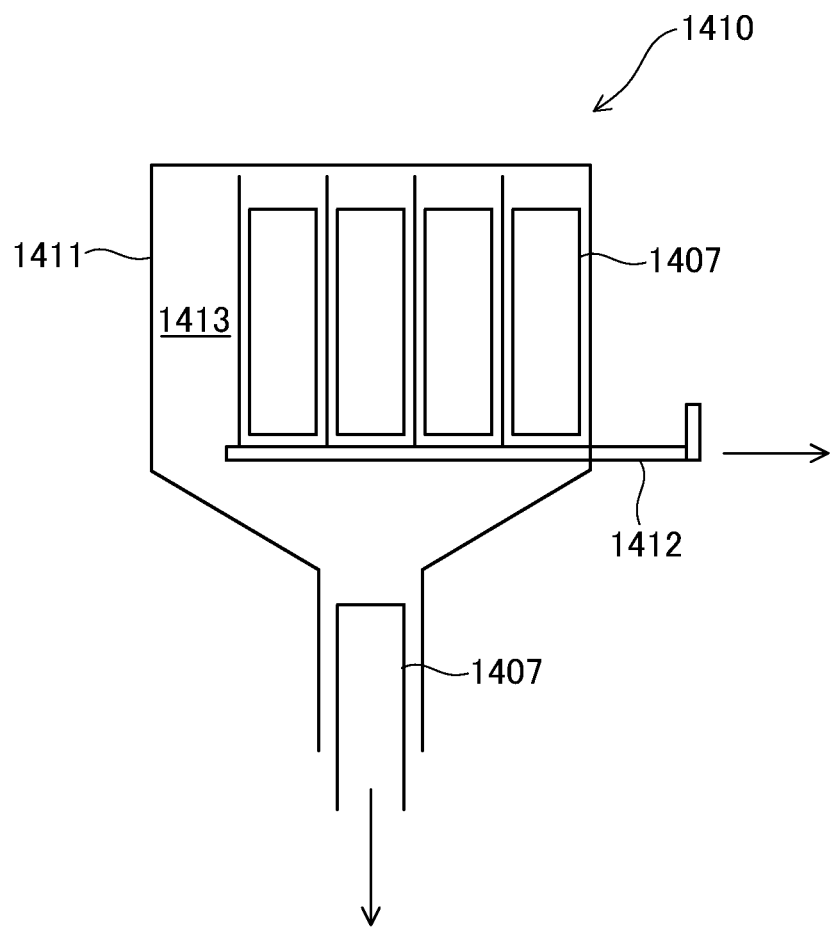
FIG. 58 shows a structural view of a catalyst supplementing device.

Each case 1407 is made of SUS304 or SUS316L so as to have a function as a fin. The case has, e.g., a thickness below 1 mm and holds the catalyst therein in FIG. 57. The case 1407 is covered, at its upper surface, with a cap 1408 to prevent the catalyst therein from coming into contact with air. The case 1407 is, as shown in FIG. 58, put longitudinally into a hopper 1410 as a catalyst supplementary device, having a plurality of partition rooms 1413 after the cap 1408 is taken out of the case 1407 as shown in FIG. 58. The hopper 1410 has a sliding plate 1412 at the bottom of the partition rooms 1413, and the sliding plate 1412 is drawn out of the hopper 1410 to supply the case 1407 into a catalyst cell. The use of the case 1407 having the catalyst therein can make the fins unnecessary.

Figure 59:
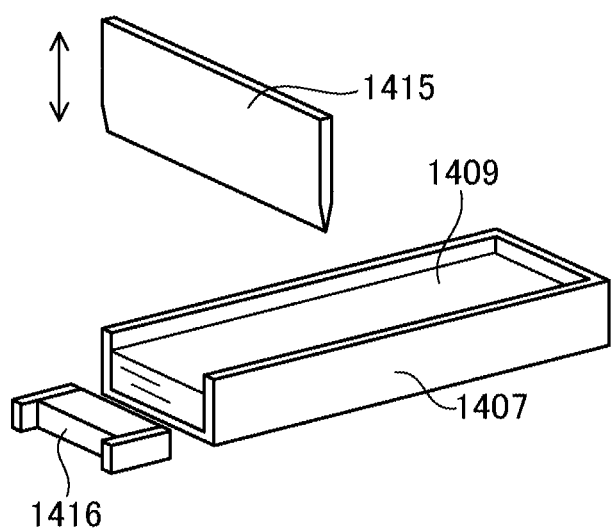
FIG. 59 shows an operational view in case that catalyst pieces are manufactured.

In FIG. 59, the case 1407 having the catalyst 1409 therein is cut by a cutter 1415 into pieces 1416 at a predetermined thickness, and the pieces 1416 may be wrapped in plastic in a vacuum to be supplied into the hopper 1410 instead of the case 1407.

What is claimed is:

1. A method of generating hydrogen from water which comprises the steps of:
   a) accommodating an alkaline metal hydroxide and a metal element supply body in a sealable case so as to form a reaction space above the alkaline metal hydroxide;
   b) heating the case to a temperature above a melting point of the alkaline metal hydroxide so as to make a molten salt;
   c) melting each element of the metal element supply body into the molten salt;
   d) ejecting a large number of fine particles including elements of the metal element supply body from a surface of the molten salt into the reaction space; and
   e) supplying steam into the reaction space without passing through the molten salt to react with the fine particles while airflow into the reaction space is prevented.

2. The method according to claim 1, wherein the alkaline metal hydroxide comprises sodium hydroxide (NaOH) or potassium hydroxide (KOH).

3. The method according to claim 1, wherein the case is made of stainless steel.

4. The method according to claim 1, wherein the metal element supply body comprises at least one of nickel (Ni), palladium (Pd) and platinum (Pt) as a first metal element with a function for breaking the O—H bond of water, and at least one of chromium (Cr), molybdenum (Mo), cobalt (Co), copper (Cu), rhodium (Rh) and tungsten (W) as a second metal element for promoting the function of the first metal element.

5. The method according to claim 1, wherein the metal element supply body further comprises iron (Fe) as a metal element.

6. The method according to claim 1, wherein the steam is superheated.

7. The method according to claim 1, wherein the metal element supply body comprises SUS304.

* * * * *